US009976947B1

(12) United States Patent
Hoffer, Jr.

(10) Patent No.: US 9,976,947 B1
(45) Date of Patent: May 22, 2018

(54) POSITION MEASUREMENT DEVICE

(71) Applicant: John M Hoffer, Jr., Columbia, MD (US)

(72) Inventor: John M Hoffer, Jr., Columbia, MD (US)

(73) Assignee: TVS Holdings, LLC, Columbia, MD (US)

( * ) Notice: Subject to any disclaimer, the term of this patent is extended or adjusted under 35 U.S.C. 154(b) by 245 days.

(21) Appl. No.: 14/950,531

(22) Filed: Nov. 24, 2015

Related U.S. Application Data

(60) Provisional application No. 62/083,507, filed on Nov. 24, 2014.

(51) Int. Cl.
G01B 5/008 (2006.01)
G01N 21/21 (2006.01)
G01B 11/14 (2006.01)

(52) U.S. Cl.
CPC .............. G01N 21/21 (2013.01); G01B 5/008 (2013.01); G01B 11/14 (2013.01)

(58) Field of Classification Search
CPC ...................................................... G01B 5/008
See application file for complete search history.

(56) References Cited

U.S. PATENT DOCUMENTS

| | | | |
|---|---|---|---|
| 4,707,836 A * | 11/1987 | Travis | G01J 1/4257 372/29.021 |
| 4,714,339 A | 12/1987 | Lau et al. | |
| 4,790,651 A | 12/1988 | Brown et al. | |
| 5,151,749 A * | 9/1992 | Tanimoto | G01B 11/005 250/548 |
| 5,179,463 A * | 1/1993 | Kramer | G02B 26/106 359/17 |
| 5,305,091 A | 4/1994 | Gelbart et al. | |
| 5,371,587 A | 12/1994 | de Groot et al. | |
| 5,412,474 A | 5/1995 | Resenberg et al. | |
| 5,530,549 A | 6/1996 | Brown et al. | |
| 6,049,377 A | 4/2000 | Lau et al. | |
| 6,359,692 B1 | 3/2002 | de Groot | |
| 6,675,122 B1 | 1/2004 | Markendorf et al. | |
| 7,230,689 B2 | 6/2007 | Lau et al. | |

(Continued)

FOREIGN PATENT DOCUMENTS

EP 0880674 A1 12/1998

Primary Examiner — Charlie Y Peng
(74) Attorney, Agent, or Firm — Invention To Patent Services; Alex Hobson

(57) ABSTRACT

A device capable of measuring one or more degrees of freedom with respect to a beam of light is described. The angle of rotation around the beam is obtained with a polarized beam of light and a polarizing optic and a sensor. A control system holds a sensor reading to a predetermined value. Therefore as the device is rotated around the beam, the optic will be rotated to maintain the sensor reading and an encoder provides the measurement of the amount of rotation. A position sensing device provides transverse information about the location of the beam and rotation of the device around two other axes. A second position sensing device at a difference distance from the light transmitter allows for the separation of transverse and rotational measurements. Alternately, the transverse measurement can be obtained by a light transmitter capable of making the measurement on a reflected beam.

26 Claims, 50 Drawing Sheets

(56) References Cited

U.S. PATENT DOCUMENTS

| | | |
|---|---|---|
| 7,312,862 B2 | 12/2007 | Zumbrunn et al. |
| 7,576,836 B2 | 4/2009 | Bridges |
| 8,670,114 B2 | 3/2014 | Bridges et al. |
| 8,773,667 B2 | 7/2014 | Edmonds et al. |
| 2003/0234936 A1 | 12/2003 | Marron |
| 2004/0066520 A1 | 4/2004 | Marron |
| 2004/0075843 A1 | 4/2004 | Marron et al. |
| 2004/0075844 A1 | 4/2004 | Marron et al. |
| 2006/0061773 A1 | 3/2006 | Lee et al. |
| 2006/0274325 A1* | 12/2006 | Hetzler ............... G01B 11/2441 356/521 |
| 2007/0206200 A1 | 9/2007 | Lindner et al. |
| 2009/0091767 A1 | 4/2009 | Liang |
| 2010/0053633 A1 | 3/2010 | Jansen |
| 2010/0134786 A1 | 6/2010 | De Lega et al. |
| 2011/0292405 A1 | 12/2011 | Dunn et al. |
| 2013/0097882 A1* | 4/2013 | Bridges ................ G01B 11/005 33/503 |
| 2013/0148129 A1 | 6/2013 | Warden et al. |
| 2013/0155413 A1 | 6/2013 | Liesener et al. |
| 2013/0170010 A1 | 7/2013 | Parker |

* cited by examiner

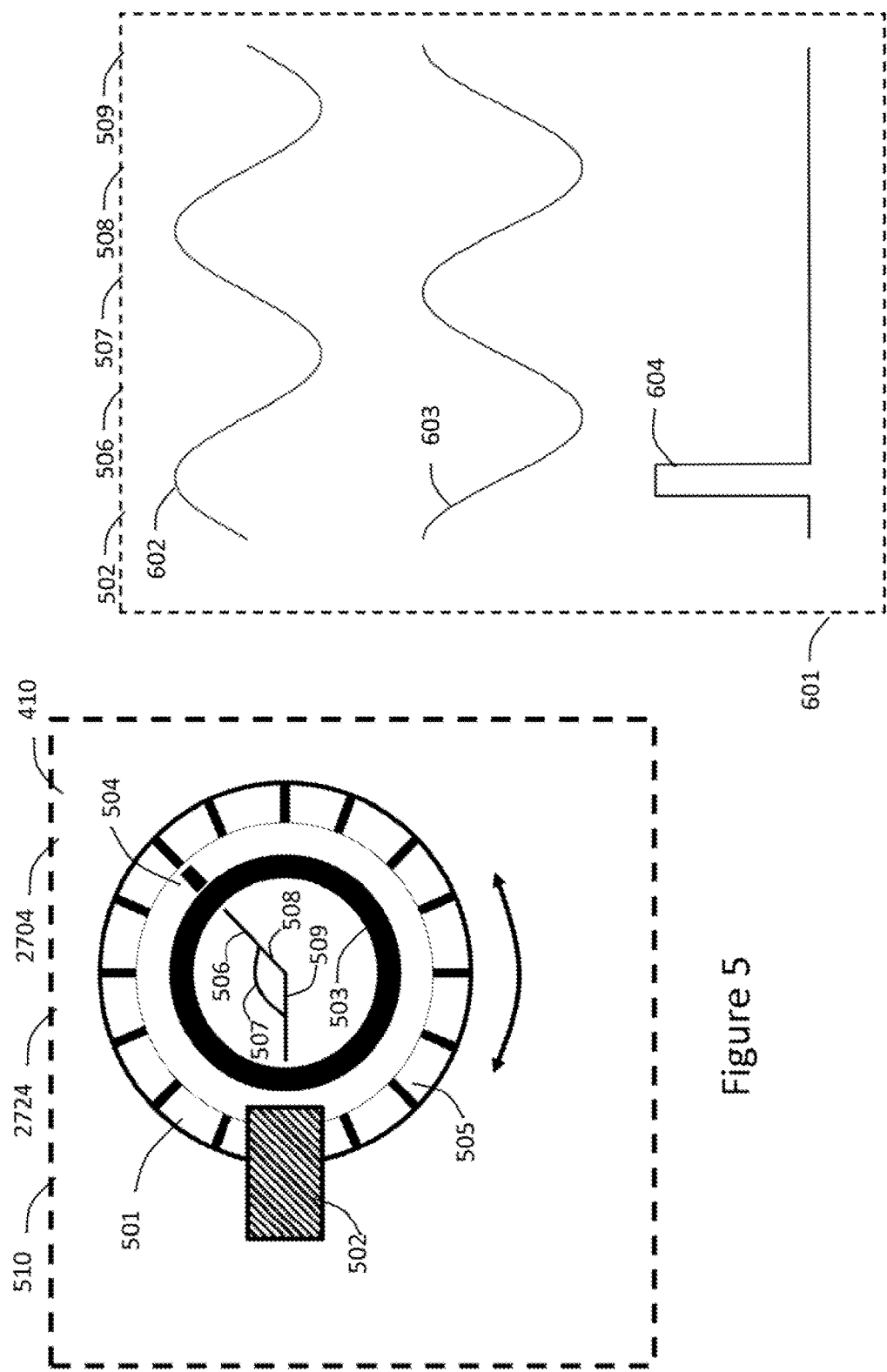

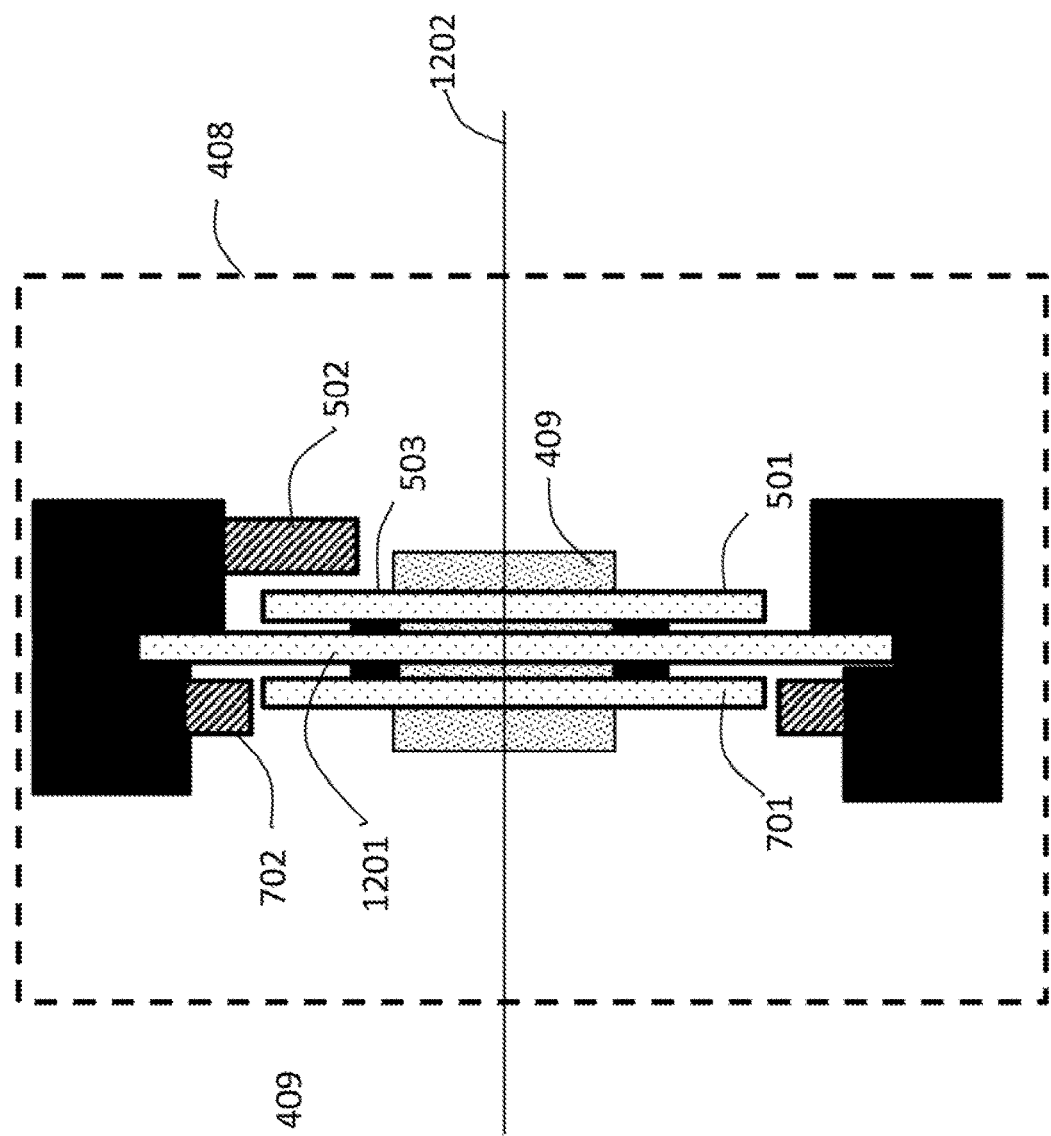
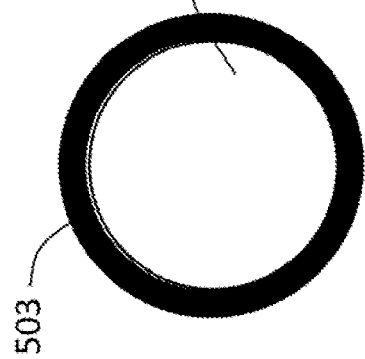
Figure 12
Figure 11

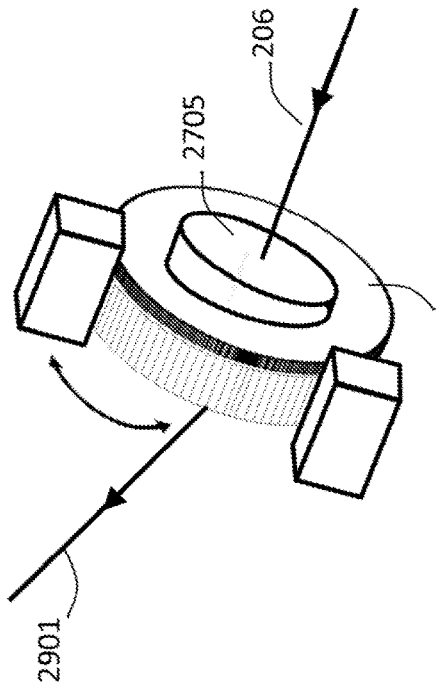
Figure 31
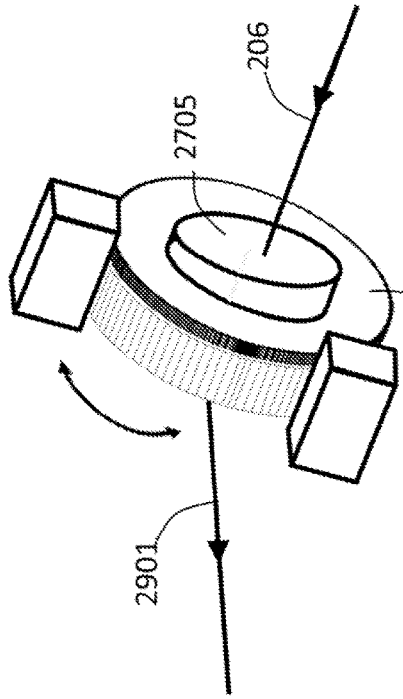
Figure 32
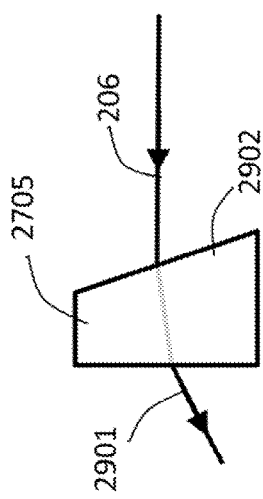
Figure 29
Figure 30

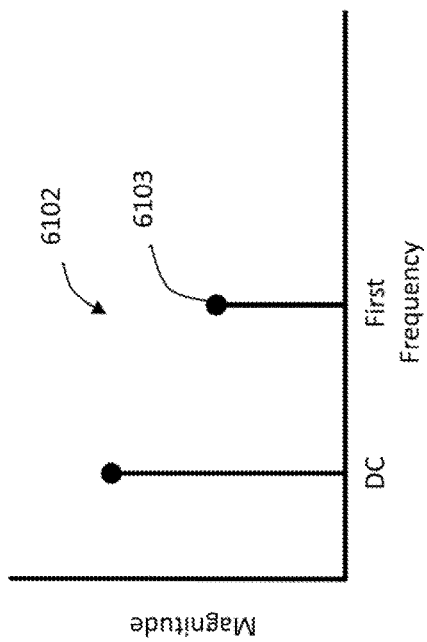
Figure 61B
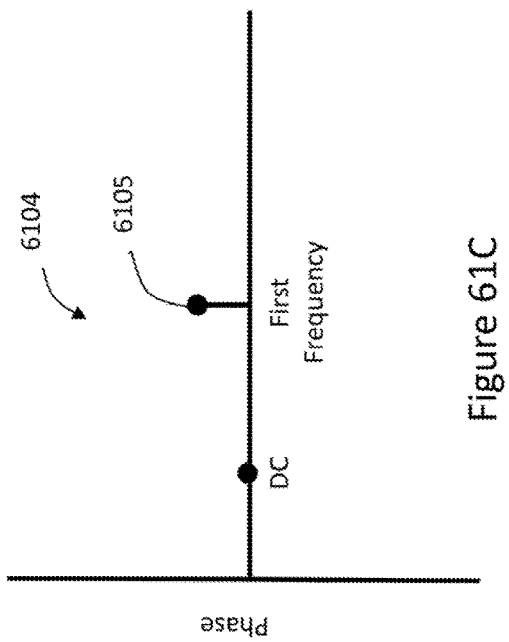
Figure 61C
Figure 61A

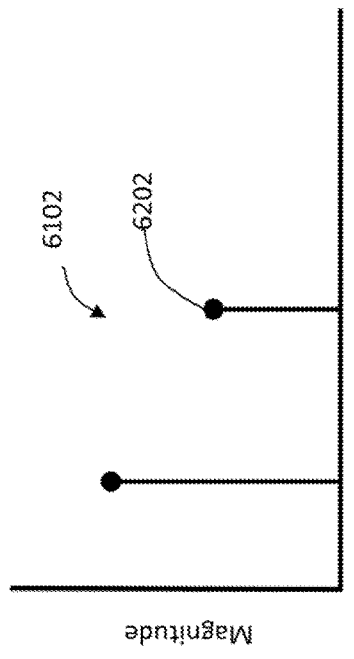
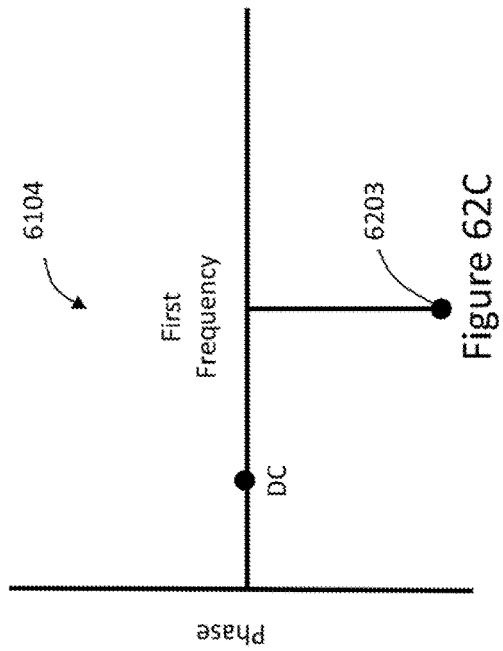
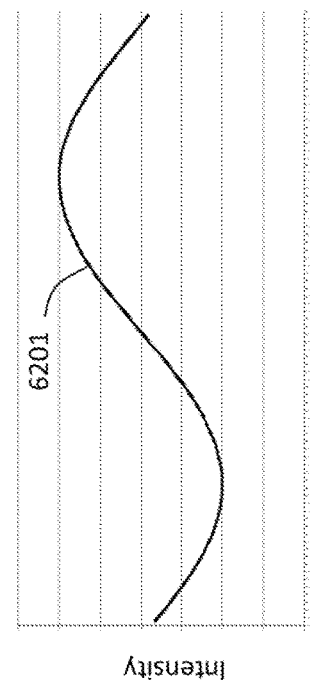
Figure 62B
Figure 62C
Figure 62A

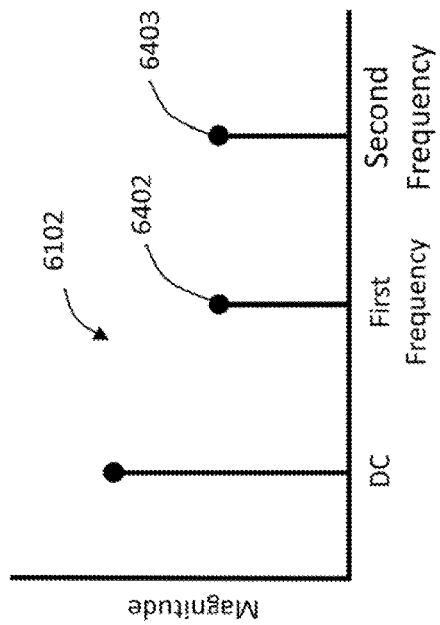
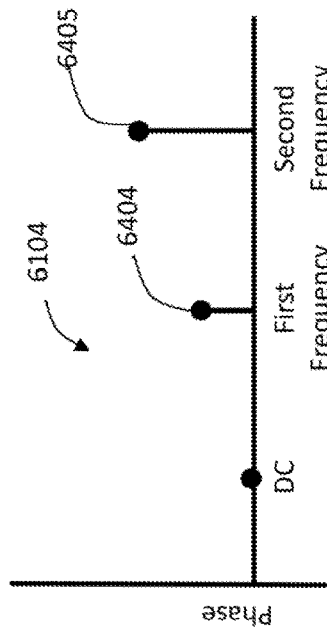
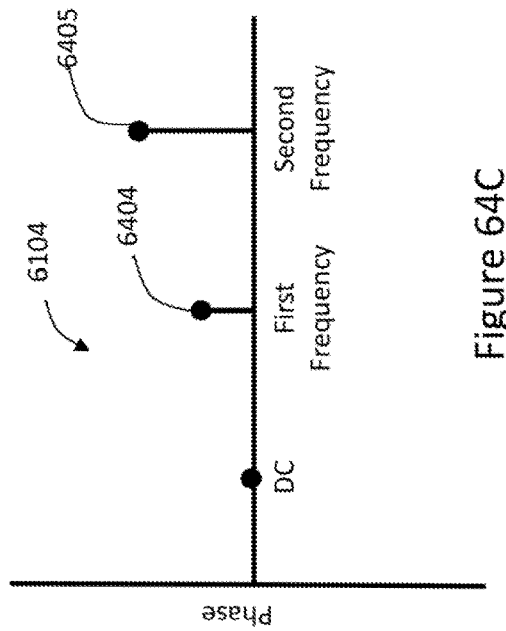

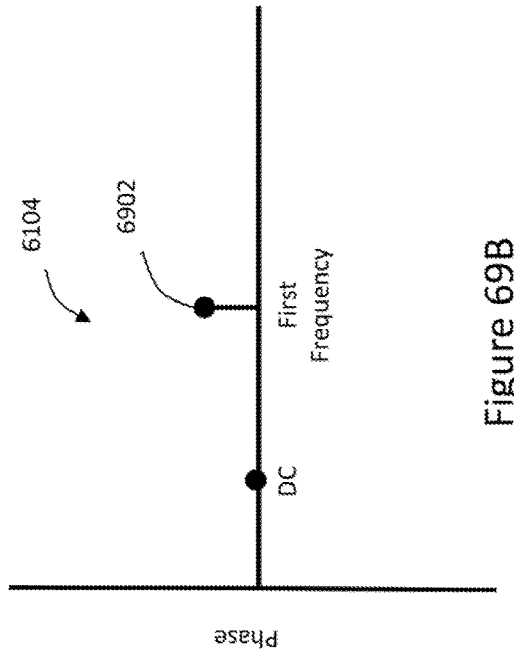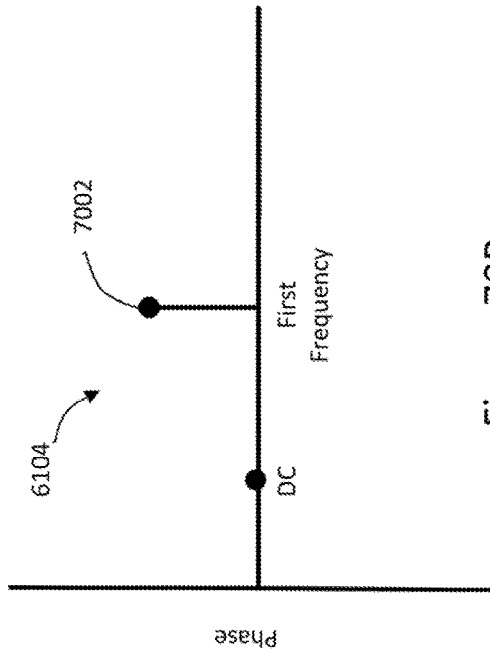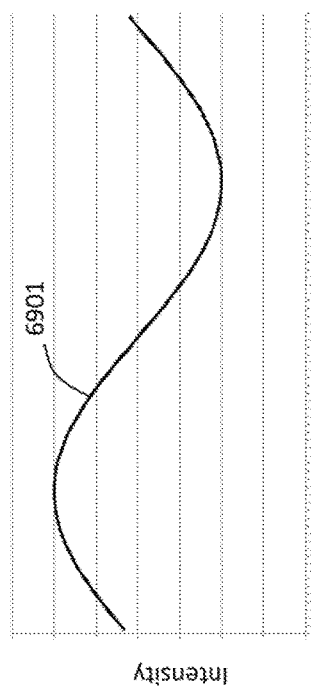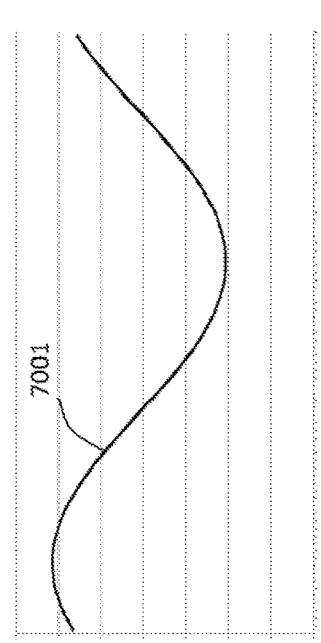
Figure 69B
Figure 70B
Figure 69A
Figure 70A

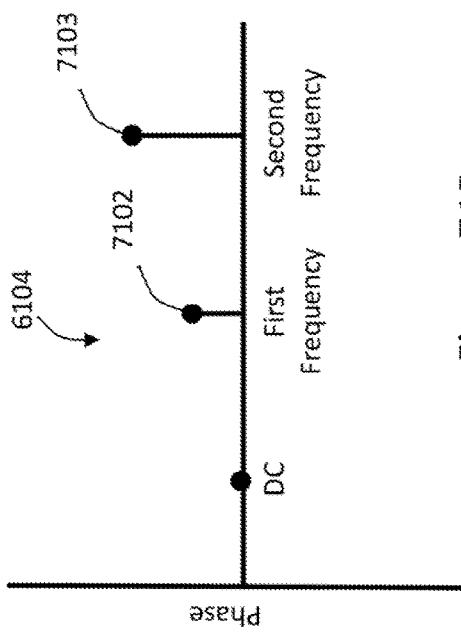
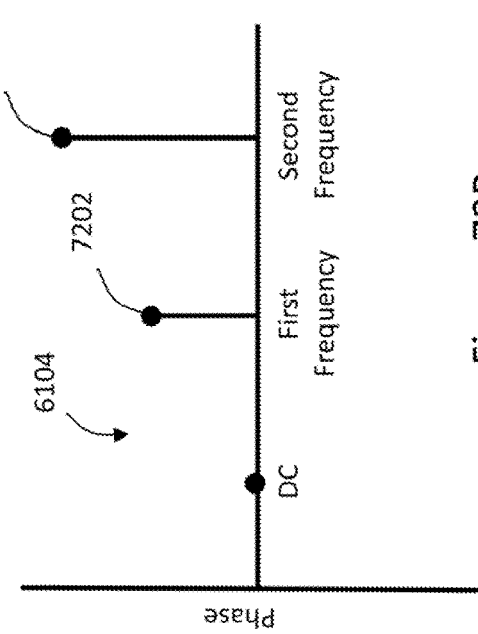
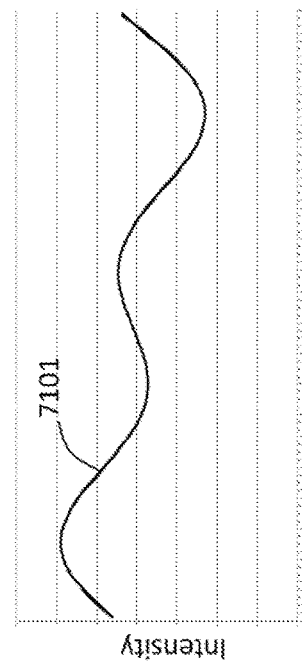
Figure 71A
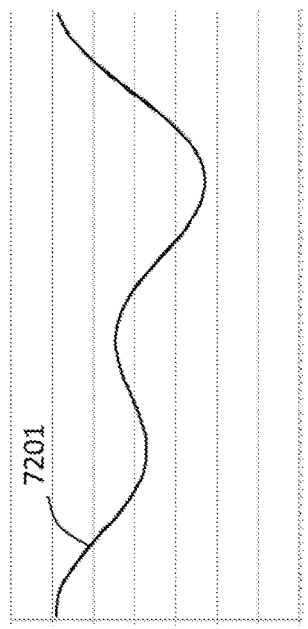
Figure 72A

POSITION MEASUREMENT DEVICE

CROSS REFERENCE TO RELATED APPLICATIONS

This application claims the benefit and priority to U.S. provisional patent application No. 62/083,507, filed on Nov. 24, 2014 and entitled Position Measurement Device; the entirety of each is incorporated by reference herein.

BACKGROUND OF THE INVENTION

Field of the Invention

The present invention relates to a device capable of measuring a rotational position around a beam of light.

Background

Light is often a means of performing dimensional measurements of objects and for positioning objects. Often, light is transmitted by a device to a reflective target that directs the light back to be processed by one or more sensors to determine position and orientation in up to six degrees of freedom, which includes 3-D position with respect to a defined coordinate system and rotation about the three axes of the coordinate system. The reflective targets are coupled to the object being measured in some way that the target information can be translated to a measurement of the object.

A system for performing 3-D measurements as defined in U.S. Pat. No. 4,790,651 Tracking Laser Interferometer, Brown et al. This device follows a reflective target using an interferometer to provide the distance to the target and angular encoders in combination with a position-sensing device to provide the transverse measurements. In this system, rotation of the target about the axes of the coordinate system is not available. Often, the reflector is mounted in a sphere that has a known radius from the center of the target to the surface of the sphere such that the target measurements can be projected to the location where the surface of the sphere touches the object being measured.

A limitation of this device is that the measured target being must be in the line of site of the device. To overcome this, U.S. Pat. No. 5,530,549 Probing Retroreflector and Methods of Measuring Surfaces, Brown therewith discloses a device that uses a mirror to redirect the beam to a retroreflector that is mounted in a way that makes it appear as if the retroreflector is at the location of the probe tip of the device. The probe tip can extend outside the field of view of the tracking laser since the mirror and the retroreflector are in the field view. However, this measurement still only provides 3-D information regarding the location being measured. The device is simply redirecting the beam to make it appear as if it is measuring the probe tip.

A method to obtain the three additional degrees of freedom are disclosed in U.S. Pat. No. 6,675,122 Indirect Position Determination with the Aid of a Tracker, Markendorf et al. Here is disclosed a system that uses a moving target that moves along a known track with respect to a probe tip. Since the movement is known, the individual 3-D measurements of the target at various locations can be combined to calculate the three angle of rotation about the axes of the coordinate system, and that information can be used to project down to the probe tip. However, given the mechanical motion required, the device will have limited ability for performing measurements while the probe is moving. In addition, it requires a large enough field of view to accommodate the movement of the target as it moves along the known path.

An alternate method of measuring more degrees of freedom are disclosed in U.S. Pat. No. 4,714,339 Three and Five Axis Laser Tracking Systems, Lau et al. Described is a target with a beam splitter and a position-sensing device, which can provide two rotation angles and two linear displacements. The shortcoming of this invention is the field of view for determining the pitch and yaw angles is limited to the field of view of the position sensing device. In addition, there is no measurement of rotation about the axis of the beam.

U.S. Pat. No. 6,049,377 Five-Axis/Six-Axis Laser Measuring System, Lau et al. extends the concept by adding the capability to measure rotation about the beam using the polarization property of light. Disclosed is the concept of using a polarizing beam splitter in combination with sensors and a differential amplifier that allow the device to determine its roll angle with respect to a laser head emitting polarized light. This method has a challenge in achieving fine resolution since the measurement covers a range of 180 degrees. In addition, polarization is impacted by the angle at which the beam impinges on the various optical surfaces, which can have a negative impact on the overall accuracy.

U.S. Pat. No. 8,670,114 Device and Method For Measuring Six Degrees of Freedom, Bridges, et. al. discuses an alternate concept of using light emitted in a pattern and sensors oriented on a receive in a way that the rotation about the beam. This design requires expensive optics to generate the pattern. In addition, the pattern must be of a large enough size to obtain necessary resolution, which can be prohibitive in applications where the beam path is restricted.

Each of these demonstrate methods to measure one or more degrees of freedom, but have limitations that keep it from achieving a high level of accuracy and ease of use.

SUMMARY OF THE INVENTION

The invention is directed to a device capable of measuring one or more degrees of freedom with respect to a beam of light. The angle of rotation around the beam is obtained with a polarized beam of light, linear or a modulated polarization is preferred, and a polarizing optic, linear polarizer is preferred, and a sensor. A control system holds a sensor reading to a predetermined value. Therefore, as the device is rotated around the beam, the optic will be rotated to maintain the sensor reading and an encoder provides the measurement of the amount of rotation the device it rotated about the beam. A position-sensing device provides information with respect to the two remaining rotational degrees of freedom and two translation degrees of freedom.

The invention has the advantage of being able to work over long ranges unlike some other optical solutions and is not impacted by acceleration of the probe like other solutions that rely on accelerometers.

The invention comprises two main components, which are a light transmitter and a light receiver.

In an exemplary embodiment, the light transmitter is a laser coupled with optics and modulating electronic that emits a modulate beam of light such that its polarization changes between linear and circular. The light transmitter has a defined coordinate system with a defined origin and three axes, a radial measurement axis also referred to as the X-axis, a transverse measurement axis also referred to as a Y-axis, and second transvers axis that is mutually perpendicular to the X and Y axes, which can also be referred to as the Z axis. The light transmitter transmits a laser beam with an approximate diameter of 5 mm along its defined X-axis. As the source modulates its polarization, it will periodically emit linear vertical polarized light. The orientation of the linear vertical polarization defines the Z-axis of the light transmitter. The Y-axis is then defined as the line perpendicular to the X-axis and Z-axis. The polarization is modulated by an electrical signal with two mixed frequencies of equal amplitude where the higher frequency is a multiple of the lower frequency. Those skilled in the art will recognize that the orientation of the coordinate system is arbitrary. Those skilled in the art will also recognize that the first modulation frequency, the number of mixed frequencies, and amplitude are also arbitrary but are limited by the components selected to implement the invention. Those skilled in the art will recognize that the light transmitter can use light sources other than lasers.

In an exemplary embodiment, the light receiver couples two beam steering platforms, a non-polarizing beam splitter, a retroreflector, a rotating polarizing optic platform, a focusing lens and a position sensing device such that when the light receiver is moved, all of the components move with it. However, the two beam steering platforms and the rotating polarizing optic platform can rotate about an optical axis independently of each other and independently from the beam splitter, retroreflector, focusing lens, and the position sensing device inside the light receiver. A processor converts signals from the various devices to useful measurements using a combination of algorithms such as a beam intensity calculation algorithm, a beam position calculation algorithm, a polarization control algorithm, ad device position calculation algorithm, a beam steering control algorithm, and a temperature compensation algorithm. A communication interface then allows access to these measurements either through a display or electronic communication to a remote computing device.

In an exemplary embodiment, the beam steering platforms each consist of a wedge prism with identical beam divergence angles coupled with a rotatory encoder to provide position feedback, and a motor to rotate the platform. The wedge prism is aligned with the encoder such that the narrowest part of the wedge is aligned with where the encoder reads 0 degrees. Those skilled in the art will recognize that the orientation selection is arbitrary as long as it is consistent and known to the processor. Those skilled in the art will also recognize that the accuracy of the measurement is impacted by the accuracy of the encoders and the accuracy of the wedge mounting with respect to the encoder. Those skilled in the art will also recognize that these errors can be measured and compensated mathematically.

In an exemplary embodiment, the rotating polarizing optical platform consists of a linear polarizing optic coupled with a rotary encoder to provide position feedback, and a motor to rotate the platform. The linear polarizing optic is mounted such that polarization is aligned to the 0 degree and 180 degree positions of the encoder disc. Those skilled in the art will recognize that the orientation selection is arbitrary as long as it is consistent and known to the processor. Those skilled in the art will also recognize that the accuracy of the measurement is impacted by the accuracy of the encoders, and the accuracy of the linear polarizing optic mounting with respect to the encoder. Those skilled in the art will also recognize that these errors can be measured and compensated mathematically.

In an exemplary embodiment, the components for the receiver are mounted around a defined optical axis such that a line can be drawn from the center of the wedge prism of the first beam steering platform, through the center of the wedge prism on the second beam steering platform through the center of the non-polarizing beam splitter, through the center of the polarizing optic on the rotating polarizing optic platform, through the center of the focusing lens, and to the center of the position sensing device. This line defines the X-axis for the receiver with positive X moving in the direction from the first wedge prism toward the position sensing device. If the light beam from the light transmitter is collinear with the optical axis of the receiver, then the X axis of the light transmitter is collinear with the X axis of the light receiver. Those skilled the art will recognize that the naming of the optical axis is arbitrary. In addition, those skilled in the art will recognize that measurement accuracy is impacted by the alignment of the light receiver components with respect to the optical axis. Those skilled in the art will recognize that these errors can be measured and compensated mathematically.

In an exemplary embodiment, the beam steering platforms are mounted such that the faces of the wedge prisms are separate by the smallest distance possible. The beam steering platforms are aligned around the optical axis such that when both encoders have an identical angular reading, the beam passing through the optics deviates by the maximum angle possible after exiting the second wedge prism, which is the sum of the maximum deviation angles of the two prisms. This also means that if the encoder readings differ from each other by 180 degrees, the beam emitted from the second wedge prism has no angular deviation. The Y-axis for the receiver is defined by line that is perpendicular to the plane formed by the X-axis and the direction of the beam emitted by the wedge prism on the second beam steam platform when a beam impinging on the wedge prism on the first platform is coaxial with the X-Axis. Those skilled in the art will recognize that errors in the orientation of the rotating platform about the optical axis will impact the accuracy of the measurement. However, those skilled in the art will recognize that these errors can be measured and compensated mathematically. Those skilled in the art will recognize that the spacing between the prism impacts the field of view of the light receiver.

The Z-axis for the receiver is defined by the line that is perpendicular to both the X-axis and Y-axis of the receiver.

In an exemplary embodiment, the non-polarizing beam splitter is mounted on the optical axis such that a beam traveling along the optical axis will enter the cube and be split so that a portion of the light is reflected at an angle approximately 90 degrees to the optical axis and the remaining portion of the beam continues on the optical axis. The front face of the beam splitter is mounted as close as possible to the face of the wedge prism on the second beam steering platform. Those skilled in the art will recognize that the orientation of the non-polarizing beam splitter about the optical axis is arbitrary.

In an exemplary embodiment, a retroreflector is coupled with the non-polarizing beam splitter such that the apex of the retroreflector is aligned with the center of the splitter, thus appearing to be centered on the X-axis of the receiver. Therefore, a beam of light that enters the non-polarizing beam splitter that is coaxial with the X-axis, will reflect a portion of the beam that will impinge on the center of the retroreflector causing it to be reflected back along the same path and then a portion of that reflected beam will again be reflected by the non-polarizing beam splitter along the negative X-Axis of the receiver. This distance of the apex of the retroreflector to the center of the beam splitter is as close as possible. The origin of the receiver is then defined as the distance of the retroreflector apex from the center of the non-polarizing beam splitter along the positive X-Axis, since this is where the apex of the retro reflector appears to be. Those skilled in the art will recognize that the spacing of the retroreflector is somewhat arbitrary and mostly limited by size constraints of the light receiver. Those skilled in the art will also recognize that errors in the apparent centering of the retro reflector on the will impact the accuracy of the measurement if the position of the measured beam is measured by the light transmitter.

In an exemplary embodiment, the rotating polarizing optic platform is oriented about the center axis such that a reading of 0 degrees corresponds to the linear polarization of the polarizing optic being rotated about X axis such that is 45 degrees to the Z-axis of the receiver. The face of the polarizing optic is positioned as close as possible to the face of the beam splitter. Those skilled in the art will recognize that the spacing between the rotating polarizing optic and the non-polarizing beam splitter impact the field of view of the device.

In an exemplary embodiment, a focusing lens is piano-convex with a known focal length and centered on the optical axis of the receiver and perpendicular to it. The face of the lens is positioned as close as possible from the face of the polarizing optic on the rotating polarizing optic platform. Those skilled in the art will recognize that the spacing between the rotating polarizing optic and the non-polarizing beam splitter impact the field of view of the device. The rotation of the focusing lens about the optical axis is arbitrary, but other deviations from the optical axis will impact accuracy. Those skilled in the art will recognize that these errors can be measured and compensated mathematically.

In an exemplary embodiment, the position sensing device is a lateral photo diode, also centered on the optical axis of the light receiver and is oriented such that the horizontal axis of the position sensing device is parallel to the Y-axis of the light receiver and the vertical axis of the position sensing device is parallel to the Z-axis of the light receiver. The face of the position sensing device is one focal length away from the lens. Those skilled in the art will recognize that errors in positioning the position sensing device in any degree of freedom will create errors in the measurement, which can be compensated mathematically.

In an exemplary embodiment, the light emitted from the source will enter the receiver impinging first upon the wedge optic in the first beam steering platform, passing through that optic and continue through the second wedge prism on the second beam steering platform and impinge on the non-polarizing beam splitter. A portion of the light will pass through the non-polarizing beam splitter, through the polarizing optic on the rotating polarizing optic platform, through the focusing lens and finally impinge on the position sensing device.

In an exemplary embodiment, the position sensing device generates a beam measure signal consisting of PSD signals A, B, C, and D. The signals are digitized by the processor to create a first measurement intensity signal and a first measurement position signal.

The processor executes the beam position calculation algorithm with the first measurement position signal as the measure beam position data input.

A and C represent the horizontal position of the beam on the sensor, so the horizontal position calculated by the beam position calculation algorithm as follows:

$$Hz = \left(\frac{A-C}{A+C}\right) scale \qquad (1)$$

B and D represent the vertical position of the beam on the sensor, so the vertical position calculated by the beam position calculation algorithm as follows:

$$Vt = \left(\frac{B-D}{B+D}\right) scale \qquad (2)$$

Given that the lens is mounted one focal length from the sensor, the scale factor will produce values that correspond to an angles which is the measure beam position output.

The processor executes the beam intensity calculation algorithm with the first measurement intensity signal as the measurement intensity input.

The beam intensity calculation algorithm first calculates the intensity as follows:

$$I = A+B+C+D \qquad (3)$$

The beam intensity algorithm collects an appropriate number of calculated intensities such that the number of samples covers one period of the lowest polarization modulation frequency. Therefore, if the polarization is modulated with a mixed signal of 100 Hz and 200 Hz and is sampled at 1 KHz, 10 samples are required. The beam intensity calculation algorithm calculates the intensity by first calculating the real and imaginary portions as follows (note sine and cosine angles are in radians):

$$X_1 = \frac{1}{10}\sum_{n=0}^{9} I_n \cos\left(\frac{2\pi n}{10}\right) \qquad (4)$$

$$Y_1 = \frac{1}{10}\sum_{n=0}^{9} I_n \sin\left(\frac{2\pi n}{10}\right) \qquad (5)$$

$$X_2 = \frac{1}{10}\sum_{n=0}^{9} I_n \cos\left(\frac{4\pi n}{10}\right) \qquad (6)$$

$$Y_2 = \frac{1}{10}\sum_{n=0}^{9} I_n \sin\left(\frac{4\pi n}{10}\right) \qquad (7)$$

From these calculated values, the magnitude of the modulated signal is calculated as follows:

$$M = scale\sqrt{(X_1^2+Y_1^2)+(X_2^2+Y_2^2)} \qquad (8)$$

The scale converts the calculation to a unit of measure W/m².

The phases for each frequency are calculated as follows (note arctangent results are in degrees):

$$\theta_1 = \tan 2^{-1}\left(\frac{Y_1}{X_1}\right) \qquad (9)$$

$$\theta_2 = \tan 2^{-1}\left(\frac{Y_2}{X_2}\right) \qquad (10)$$

If either phase is less than 0, 360 degrees is added so that the phase is between 0 and 360 degrees. A phase difference is calculated as follows:

$$\Delta = |mod\,[(\theta_1 * 2), 360] - \theta_2| \quad (11)$$

The value $\Delta$ with be either a value near 0 degrees of a value near 180 degrees. If $\Delta$ is near 0, then the polarization intensity output from the beam intensity calculation algorithm is +M. If $\Delta$ is near 180, then the polarization intensity output from the beam intensity calculation algorithm is −M.

The processor executes the polarization control algorithm using the polarization intensity output as the polarization beam intensity feedback. The feedback is compared against a polarization control reference, which is set to 0. The compared values are processed through a PI control loop generating a polarization output signal. The polarization output signal is then used as motor input data to change the orientation of the rotating polarizing optical platform. The control system will drive the orientation of the polarizing optic so that M equals 0.

The processor executes a beam steering control algorithm using measure beam position output as the beam steering position feedback, which is compared to a beam steering command position, which is set to 0. The compared values are processed through a PI control loop generating a beam steering motor output. The beam steering motor output is converted to motor input data to drive the motors and change the orientation of the two beam steering platforms. The goal of the loops is to drive the position of the beam on the position sensing device to the center.

The processor executes a device position calculation algorithm that has a polarization rotation measurement position input from the measured rotation position of the rotating polarizing optical platform, a beam position input from the first measurement position signal, a beam steering position input from the measured rotation position of the two beam steering platforms, and a beam intensity input from the polarization intensity output.

When the beam intensity input is zero, the rotation of the light receiver about the X axis ($RX_{Receiver}$) is calculated as follows:

$$RX_{Receiver} = Encoder_P \quad (12)$$

$Encoder_P$ is the measured rotation position of the rotating polarizing optical platform.

When the beam steering position input is 0, meaning the beam is centered on the position sensing device, the rotation of the receiver about its Y-axis ($RY_{Receiver}$) and Z-axis ($RZ_{Receiver}$) are given as follows:

$$Angle_\Delta = Encoder_1 - Encoder_2 \quad (13)$$

$$Angle_{Pos} = Encoder_1 + Encoder_2 \quad (14)$$

$$Displacement_{Total} = Displacement_{Wedge}\left[\cos\left(\frac{Angle_\Delta}{2}\right)\right] \quad (15)$$

$$RY_{Receiver} = Displacement_{Total}[\cos(Angle_{Pos})] \quad (16)$$

$$RZ_{Receiver} = Displacement_{Total}[\sin(Angle_{Pos})] \quad (17)$$

A coordinate transformation function translates the $RX_{Receiver}$, $RY_{Receiver}$, and $RZ_{Receiver}$ values to position output values RX, RY, RZ as follows:

$$RX = RX_{Receiver} \quad (18)$$

$$RY = RY_{Receiver}[\cos(RX)] - RZ_{Receiver}[\sin(RX)] \quad (19)$$

$$RZ = RZ_{Receiver}[\cos(RX)] - RY_{Receiver}[\sin(RX)] \quad (20)$$

In another embodiment, the polarization is modulated by rotating the linear polarization. The range of polarization rotation is 360 degrees. The polarization is modulated by an electrical signal with two mixed frequencies of equal amplitude where the higher frequency is a multiple of the lower frequency. In this embodiment, the resulting intensity modulation at the position sensor will be twice the polarization modulation frequency. The inputs to the beam intensity calculation algorithm are the same, and the calculations for magnitude and phase are identical. However, the polarization intensity output is now a phase difference measurement that is calculated as follows:

$$\Delta = \theta_2 - \theta_1 \quad (21)$$

The polarization control reference in the polarization control algorithm is 0 degrees causing the rotating polarizing optical platform to an orientation where the polarization orientation feedback will be 0.

In another embodiment, the modulated polarization is eliminated from the source and replaced with a simple horizontal linear polarization. In this embodiment, the Z axis of the light transmitter now defined as the line perpendicular to the horizontal polarization. In this embodiment, the beam intensity calculation algorithm requires only one sample of the measurement intensity input. The polarization intensity output is then calculated as follows $$I_{Meas} = scale(A+B+C+D) \quad (22)$$

Scale converts the value to a unit of measure W/m².

The polarization control reference in the polarization control algorithm is 0 W/m² causing the rotating polarizing optical platform to an orientation where the polarization orientation feedback will be 0.

In another embodiment, an input beam reference sensor is coupled with the non-polarizing beam splitter to measure the intensity of the beam reflected from the beam reflector. The input beam reference sensor produces a current that is proportional to the intensity of the reference beam spot impinging on the photo sensor active area. The processor converts the current to a voltage and digitizes it to create a reference intensity signal that is the reference intensity input to the beam intensity calculation algorithm. The beam intensity calculation algorithm calculates the reference intensity as follows:

$$I_{Ref} = (scale)(A) - offet \quad (23)$$

A is the reference intensity signal and scale convert the value to a unit of measure W/m². The offset accounts for differences in intensity losses with respect to the measurement intensity input. The polarization intensity output is then calculated as follows:

$$I_{Out} = \frac{I_{Meas}}{I_{Ref}} \quad (24)$$

The polarization intensity output is therefore normalized to the intensity of the input beam of light 206, so any intensity fluctuations created by the light transmitter are not interpreted as changes in the polarization.

The polarization control reference in the polarization control algorithm is 0 causing the rotating polarizing optical platform to an orientation where the polarization orientation feedback will be 0.

In another embodiment, a reference position sensing device is coupled with the non-polarizing beam splitter to measure the position of the beam reflected y the beam reflector.

The reference position sensing device generates a beam measure signal consisting of PSD signals A, B, C, and D. The signals are digitized by the processor to create a second measurement input position signal.

The processor executes the beam position calculation algorithm with the second measurement input position signal as the second measure beam position data input.

A and C represent the horizontal position of the beam on the sensor, so the horizontal position calculated by the beam position calculation algorithm as follows:

$$Hz = \left(\frac{A-C}{A+C}\right) scale \quad (25)$$

B and D represent the vertical position of the beam on the sensor, so the vertical position calculated by the beam position calculation algorithm as follows:

$$Vt = \left(\frac{B-D}{B+D}\right) scale \quad (26)$$

The scale factor will produce values that correspond to a linear distance which is the second measure beam position output.

The processor executes the device position calculation algorithm with the second measure beam position output as the second measurement beam input. Whn the beam intensity input is zero, the distances along the Y axis and Z axis are calculated as follows:

$$DY_{Receiver} = Hz \quad (27)$$

$$DZ_{Receiver} = Vt \quad (28)$$

A coordinate transformation function is defined as follows:

$$M_{RotX} = \begin{bmatrix} 1 & 0 & 0 \\ 0 & \cos RX & -\sin RX \\ 0 & \sin RX & \cos RX \end{bmatrix} \quad (29)$$

$$M_{RotY} = \begin{bmatrix} \cos RY & 0 & \sin RY \\ 0 & 1 & 0 \\ -\sin RY & 0 & \cos RY \end{bmatrix} \quad (30)$$

$$M_{RotZ} = \begin{bmatrix} \cos RZ & -\sin RZ & 0 \\ \sin RZ & \cos RZ & 0 \\ 0 & 0 & 1 \end{bmatrix} \quad (31)$$

The coordinate transformation function is then applied to $DY_{Receiver}$, and $DZ_{Receiver}$ to add DX, DY, and DZ to the position output as follows:

$$\begin{bmatrix} DX \\ DY \\ DZ \end{bmatrix} = M_{RotZ} M_{RotY} M_{RotX} \begin{bmatrix} 0 \\ DY_{Receiver} \\ DZ_{Receiver} \end{bmatrix} \quad (32)$$

In another embodiment, a probe of is coupled to the light receiver such that the probe tip is at a known DX, DY, and DZ in the coordinate system of the light receivers. A coordinate transformation function is applied as follows to add DX, DY, and DZ to the position output as follows:

$$\begin{bmatrix} DX \\ DY \\ DZ \end{bmatrix} = M_{RotZ} M_{RotY} M_{RotX} \begin{bmatrix} DX_{ProbeTip} \\ DY_{ProbeTip} \\ DZ_{ProbeTip} \end{bmatrix} \quad (33)$$

In another embodiment, the polarizing optic on the rotating polarization optical platform is a polarizing beam splitter. The polarizing beam splitter is coupled with a measurement photo sensor. The beam of light from the light transmitter has a fixed vertical polarization. The measurement photo sensor produces a current that is proportional to the intensity of the reference beam spot impinging on the photo sensor active area. The processor converts the current to a voltage and digitizes it to create a secondary measurement intensity signal that is the secondary measurement intensity input to the beam intensity calculation algorithm. The beam intensity calculation algorithm calculates the reference intensity as follows:

$$I_{SecondaryMeasure} = (scale)(A) - offset \quad (34)$$

A is the secondary measurement intensity signal and scale converts the value to a unit of measure W/m². The offset accounts for differences in intensity losses with respect to the measurement intensity input. The polarization intensity output is then calculated as follows:

$$I_{Out} = I_{PrimaryMeasure} - I_{SecondaryMeasure} \quad (35)$$

In another embodiment, the beam steering optic on each beam steering platform is a reflective object. One beam steering platform is oriented such that the axis of rotation is parallel to the Y axis. A second beam steering platform is oriented such that the axis of rotation is parallel to the Z axis. The receiver RY and RZ are calculated directly from the encoder readings.

$$RY_{Receiver} = Encoder_1 \quad (36)$$

$$RZ_{Receiver} = Encoder_2 \quad (37)$$

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 5 shows an exemplary rotation measurement device.

FIG. 6 shows exemplary rotation signal produced by encoder read head.

FIG. 11 shows an exemplary polarization optic mounted on a shaft.

FIG. 12 shows an exemplary rotating polarizing optical platform mounted on bearings.

FIG. 29 shows an exemplary refractive optic.

FIG. 30 shows an exemplary wedge prism.

FIG. 31 shows an exemplary beam steering platform.

FIG. 32 shows an exemplary beam steering platform.

FIG. 61A shows an exemplary intensity as measured at a photo sensor.

FIG. 61B shows an exemplary stem plot of the magnitudes of interest.

FIG. 61C shows an exemplary stem plot of the phases of interest.

FIG. 62A shows an exemplary intensity as measured at a photo sensor.

FIG. 62B shows an exemplary stem plot of the magnitudes of interest.

FIG. 62C shows an exemplary stem plot of the phases of interest.

FIG. 64A shows an exemplary plot of intensity data.

FIG. 64B shows an exemplary stem plot of the magnitudes of interest.

FIG. 64C shows an exemplary stem plot of the phases of interest.

FIG. 69A shows an exemplary plot of intensity data as measured at a photo sensor.

FIG. 69B shows an exemplary stem plot of the phases of interest.

FIG. 70A shows an exemplary plot of intensity data.

FIG. 70B shows an exemplary stem plot of the phases of interest.

FIG. 71A shows an exemplary plot of intensity data as measured at a photo sensor.

FIG. 71B shows an exemplary stem plot of the phases of interest.

FIG. 72A shows an exemplary plot of intensity data.

FIG. 72B shows an exemplary stem plot of the phases of interest.

DETAILED DESCRIPTION OF THE ILLUSTRATED EMBODIMENTS

Figure 1:
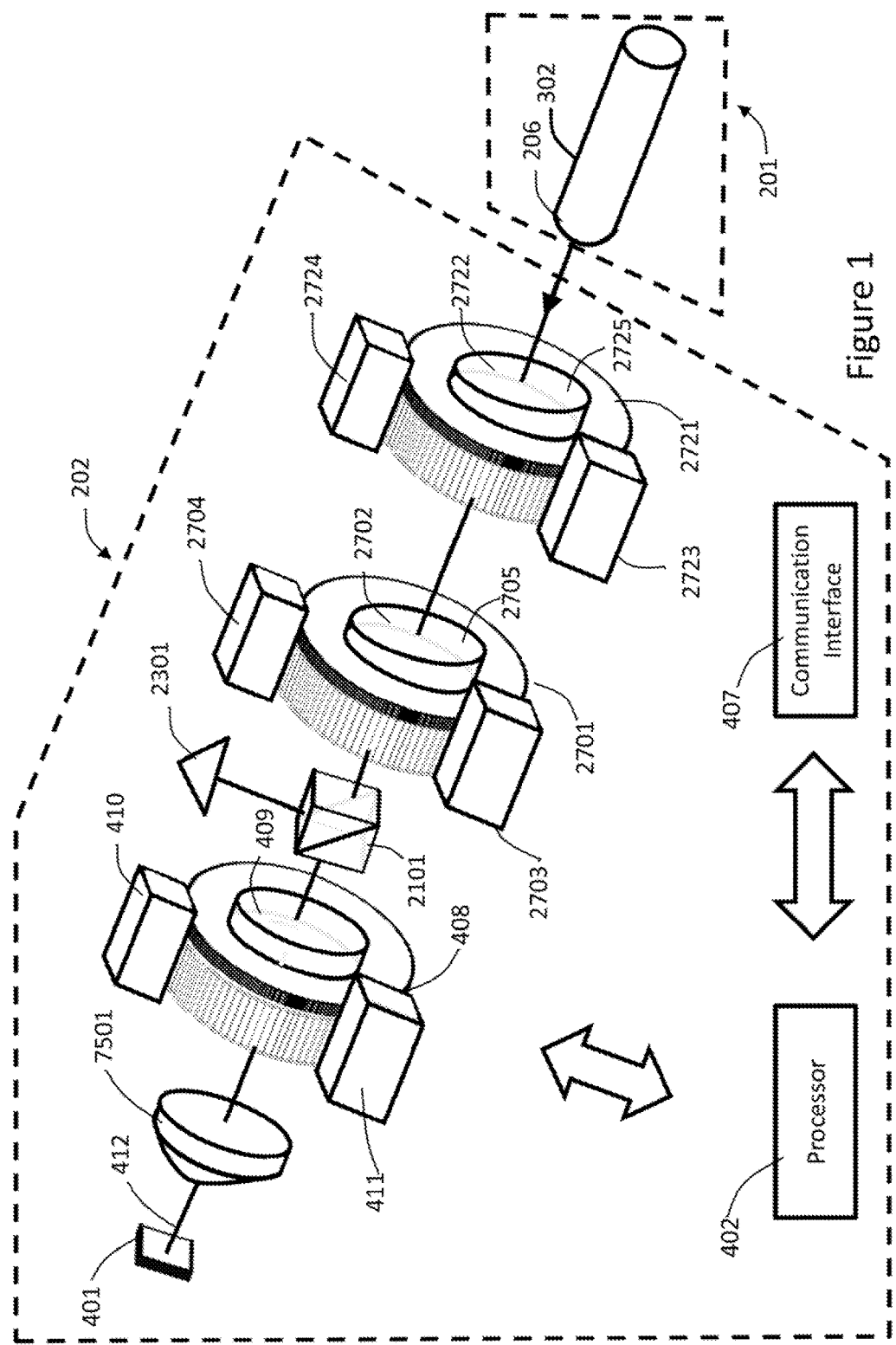
FIG. 1 shows an exemplary light transmitter.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

FIG. 1 shows an exemplary light transmitter 201 comprising a light source 302 that emits a beam of light 206 that is received by the light receiver 202 comprising a first beam steering platform 2721, a second beam steering platform 2701, a non-polarizing beam splitter 2101, a reflector 2301, a rotating polarizing optical platform 408, a focusing lens 7501 and a measurement position sensing detector 401. The components of the light receiver 202 are coupled such that when the light receiver 202 moves, all components move together and maintain their spacing with respect to each other. However the first beam steering platform 2721, the second beam steering platform 2701, and the rotating polarizing optical platform 408 are able to rotate independently from each other and from the receiver about measurement beam 412 that passes through all of the optics.

Figure 2:
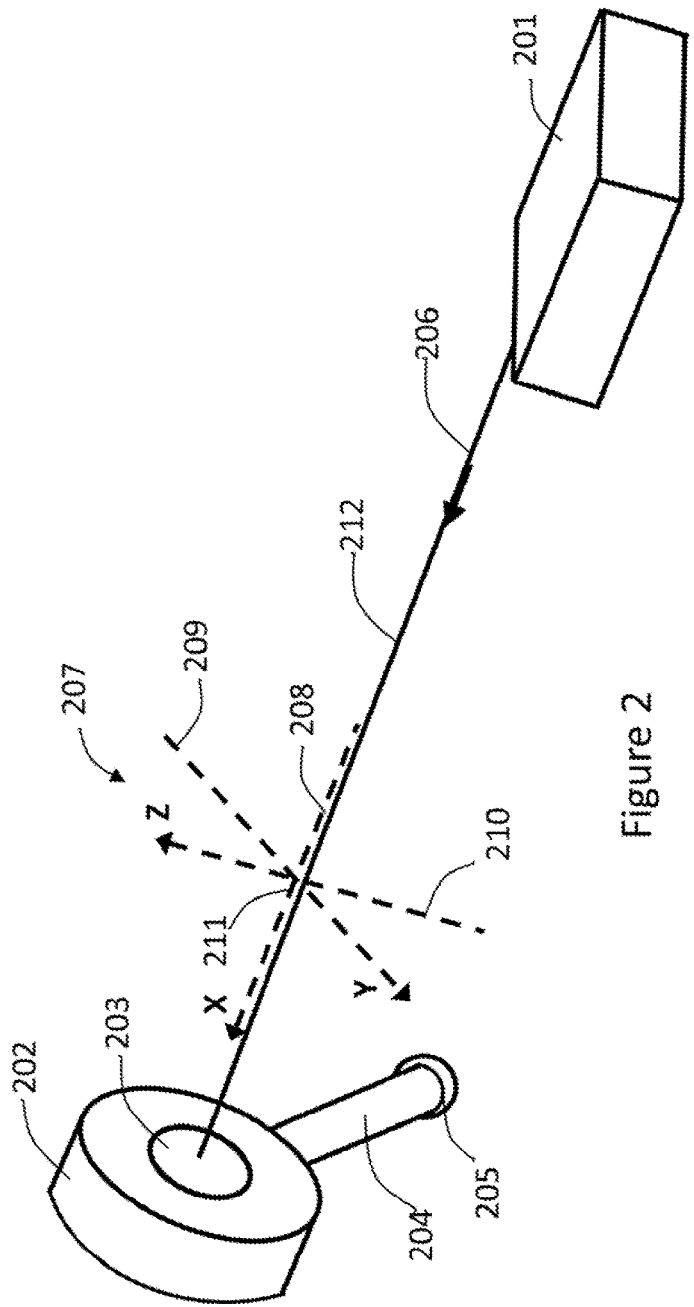
FIG. 2 shows an exemplary light transmitter.

FIG. 2 shows an exemplary light transmitter 201 emitting beam of light 206, which is a polarized beam of light, and light receiver 202 with an aperture for receiving light 203, a probe 204 with a known length and mounting orientation with respect to a defined measurement origin 211 such that the position of probe tip 205 can be calculated within reference coordinate system 207.

Figure 3:
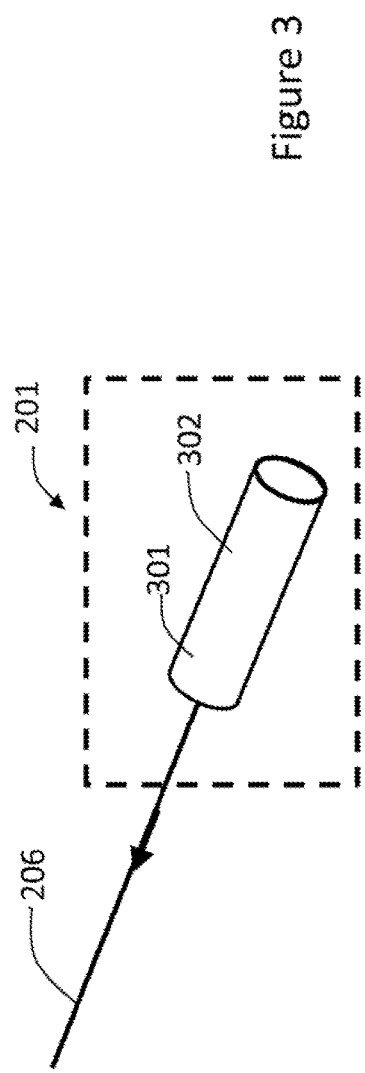
FIG. 3 shows an exemplary light source.

FIG. 3 shows an exemplary light source 302 which is a laser 301.

Figure 4:
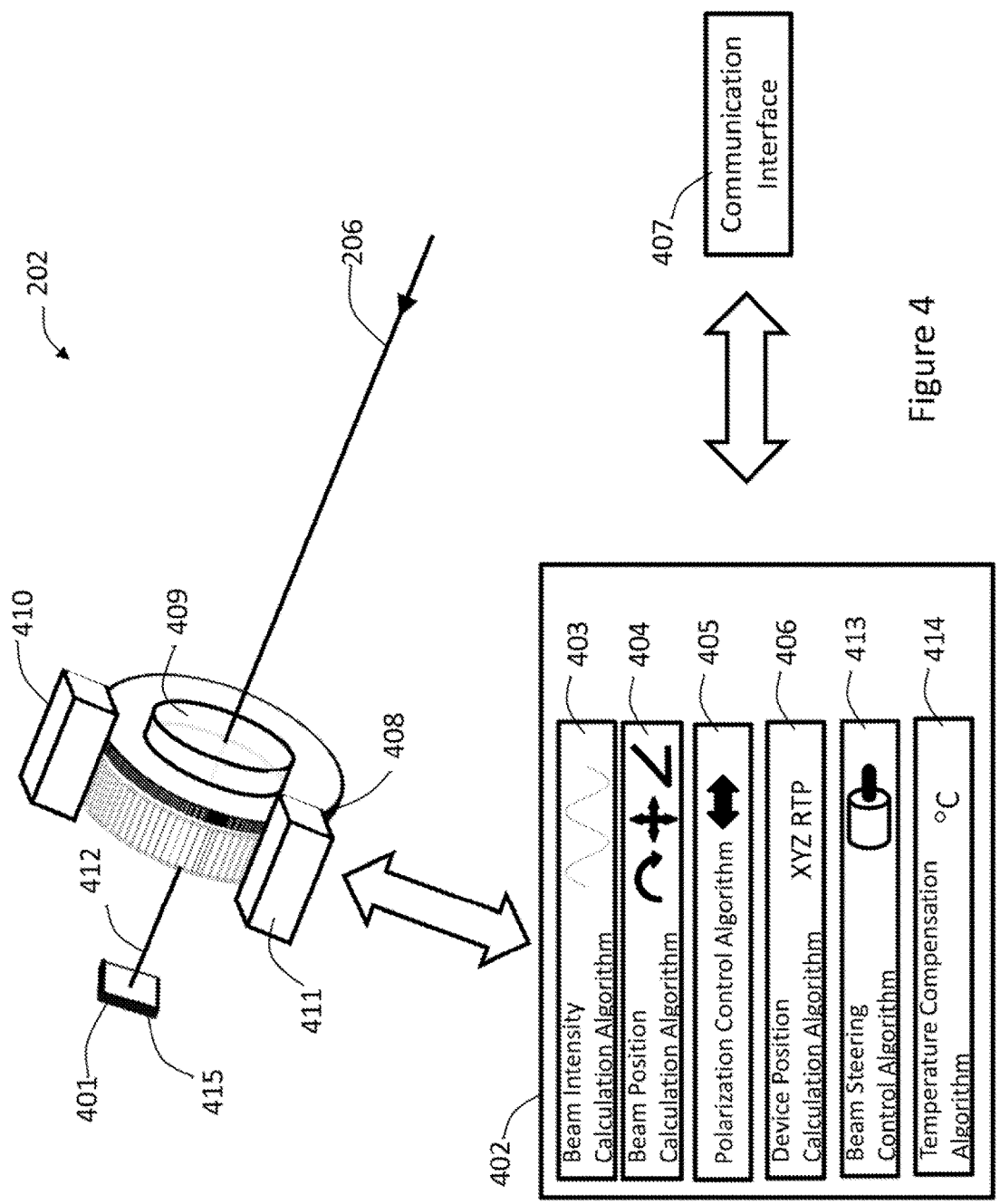
FIG. 4 shows an exemplary rotating polarizing optical platform.

FIG. 4 shows an exemplary rotating polarizing optical platform 408, polarizing optic 409, a measurement photo sensor 415, which is measurement position sensing device 401 that can measure data with respect to measurement beam 412. Polarization platform motor 411 can rotate the platform and polarization platform rotation measurement device 410 measures the rotational orientation of the platform. These components are coupled with a processor 402 that contains a beam intensity calculation algorithm 403, a beam position calculation algorithm 404, a polarization control algorithm 405, a device position calculation algorithm 406, a beam steering control algorithm 413, and a temperature compensation algorithm 414. The processor 402 receives electrical signals from the rotating polarizing optical platform 408 and digitizes the signals and then applies the algorithms to calculate a position. The processor is coupled with a communication interface 407 such that calculated data can be provided either through a display or communications with a remote computing device.

FIG. 5 shows an exemplary rotation measurement device 510 that can be used as a polarization platform rotation measurement device 410 or a beam steering position measurement device 2704 and 2724. Encoder disc 501 has a known number of encoder lines 505 that pass under encoder read head 502. The encoder disc is coupled to a shaft 503 such that the measured encoder position 506 corresponds to a polarization rotation measurement angle 507 or beam steering encoder rotation position 508, 509. Index marker 504 provides a reference point to one specific line on the encoder disc.

FIG. 6 shows exemplary rotation signal 601 produced by encoder read head 502. Encoder sine signal 602 and encoder cosine signal 603 provide measurement of the rotation position 506 such that each full 360 degree cycle of these signals represents one encoder line 505 passing under the read head 502. Since the number of lines on the encoder disc is known, the position can easily be converted from a line count to an angle. Encoder index signal 604 provides a pulse on one specific line and can be used to create a reference location. Typically this is used to indicate a position of 0 degrees.

Figure 7:
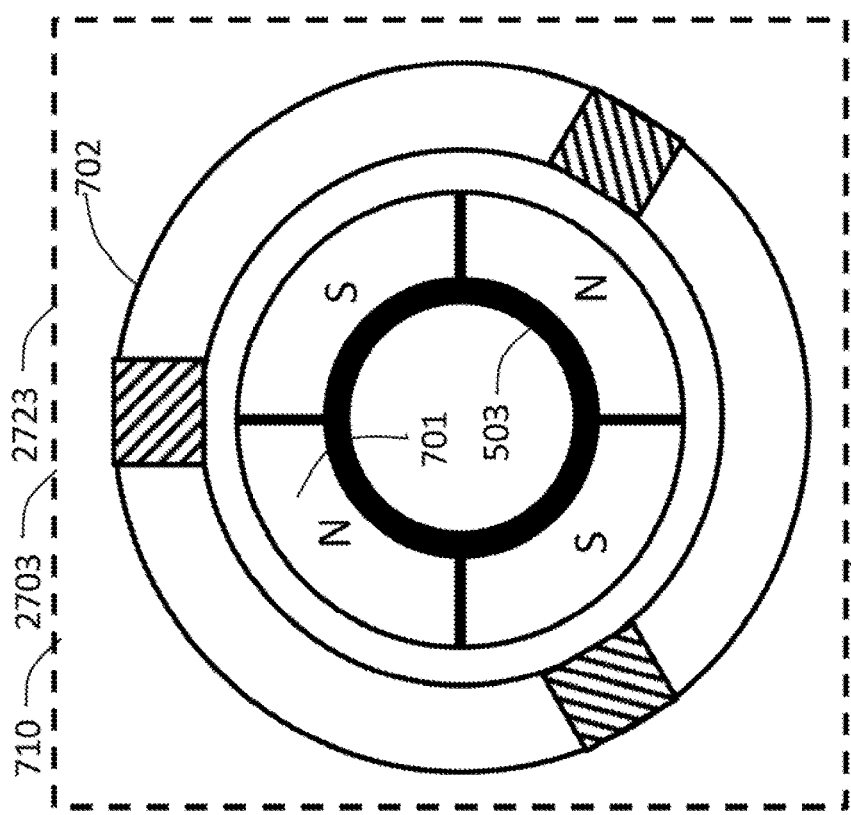
FIG. 7 shows an exemplary motor.

FIG. 7 shows an exemplary motor 710 that can be used as a polarization platform motor 411 or a beam steering motor 2703, 2723. Stator 702 provides a mechanism for switching the magnetic field such that rotor 701 with fixed magnets coupled to shaft 503 will rotate.

Figure 8:
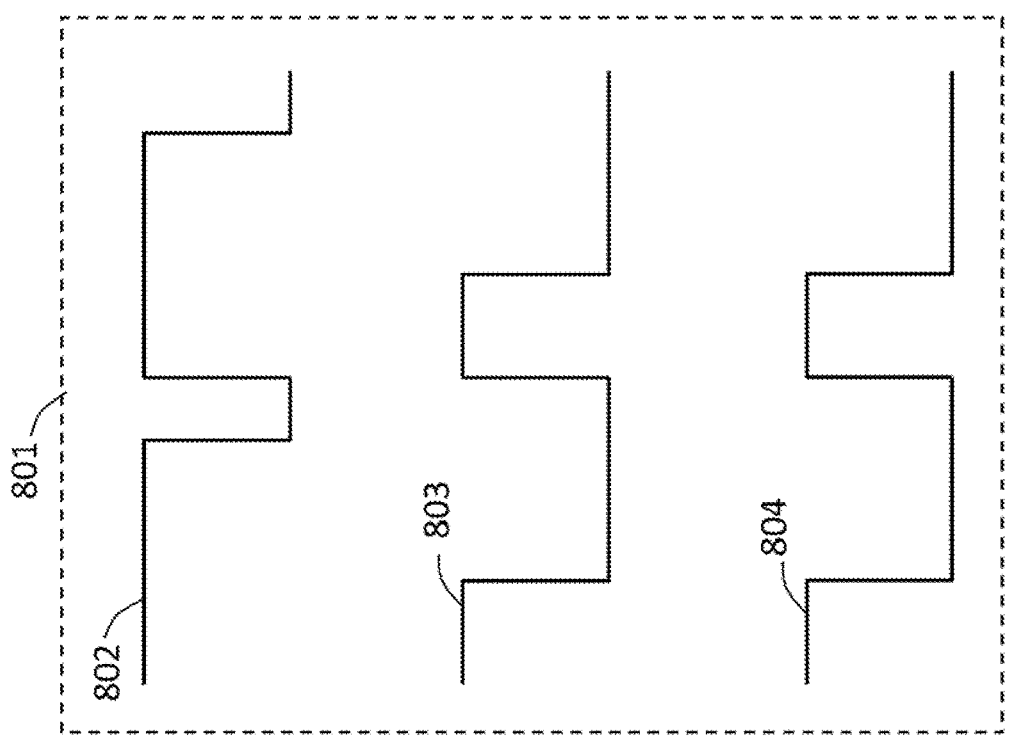
FIG. 8 shows exemplary motor input data.

FIG. 8 shows exemplary motor input data 801 comprising of motor signals 802, 803, and 804. Each motor signal is a pulse width modulated signal to create a magnetic field at a certain angle with respect to the fixed magnets on the rotor thus inducing it to rotate in a given direction.

Figure 9:
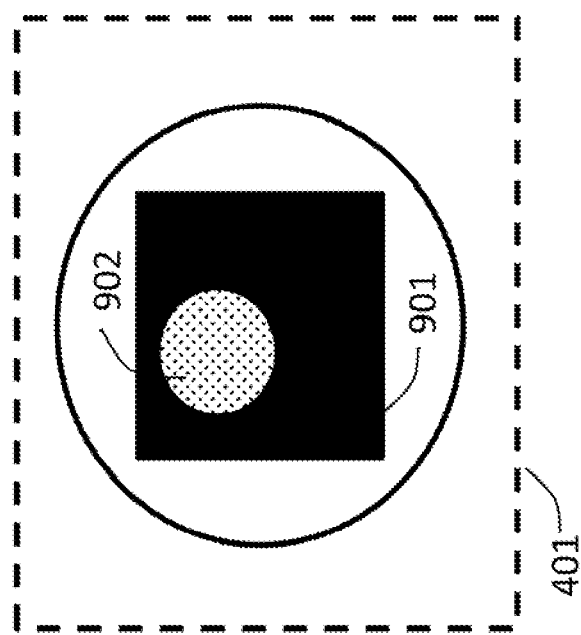
FIG. 9 shows an exemplary measurement position sensing device with a measurement beam spot impinging on PSD active area.

FIG. 9 shows an exemplary measurement position sensing device 401 with a measurement beam spot 902 impinging on PSD active area 901.

Figure 10:
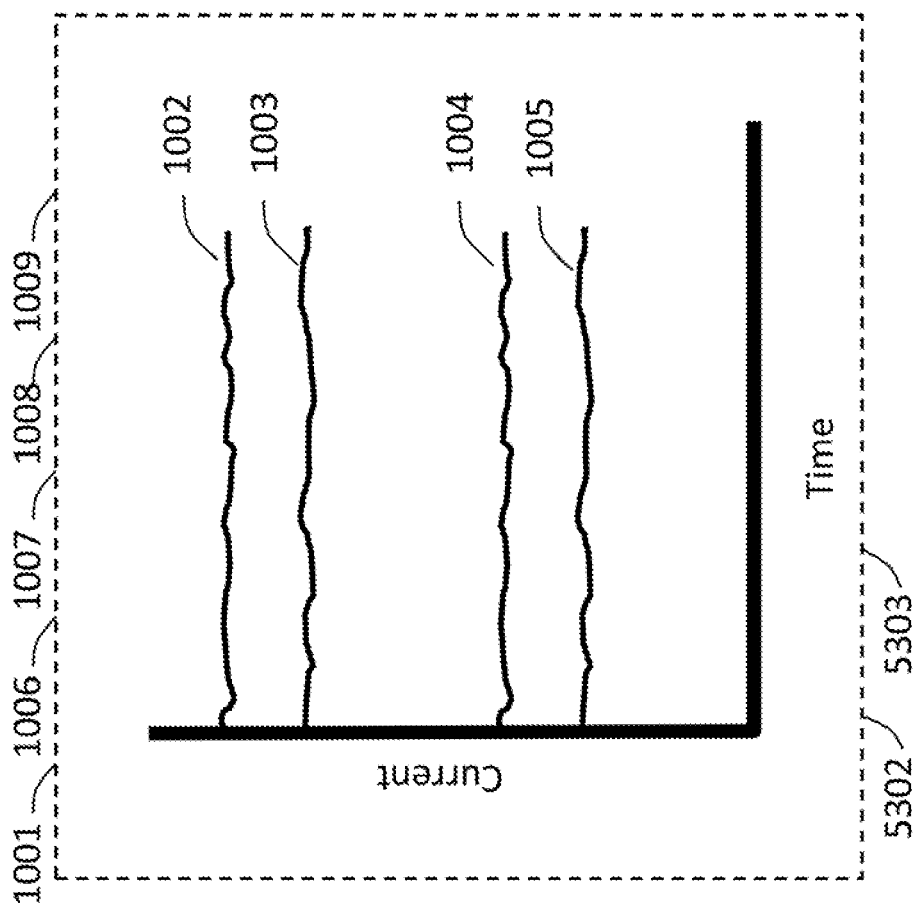
FIG. 10 shows exemplary beam measurement signals that have four outputs.

FIG. 10 shows exemplary beam measurement signals 1001 that have four outputs PSD Signal A 1002, PSD Signal B, 1003, PSD Signal C, 1004, and PSD Signal D 1005 that produce a current proportional to position of the spot on the cell. These signals can be digitized to produce various signals. Measurement intensity signal 1006, reference intensity signal 5302, and measurement intensity signal 5303 all are calculated as the sum of the four signals. Measurement position signal 1007, reference position data 1008 and measurement input position signal 1009 are derived by the difference of opposing legs of the cell by the sum of those same legs and then multiplying by a scale to convert to an angle.

FIG. 11 shows an exemplary polarization optic 409 mounted on a shaft 503.

FIG. 12 shows an exemplary rotating polarizing optical platform mounted on bearings 1201 such that it can rotate about the polarizing optical axis of rotation 1202.

Figure 13:
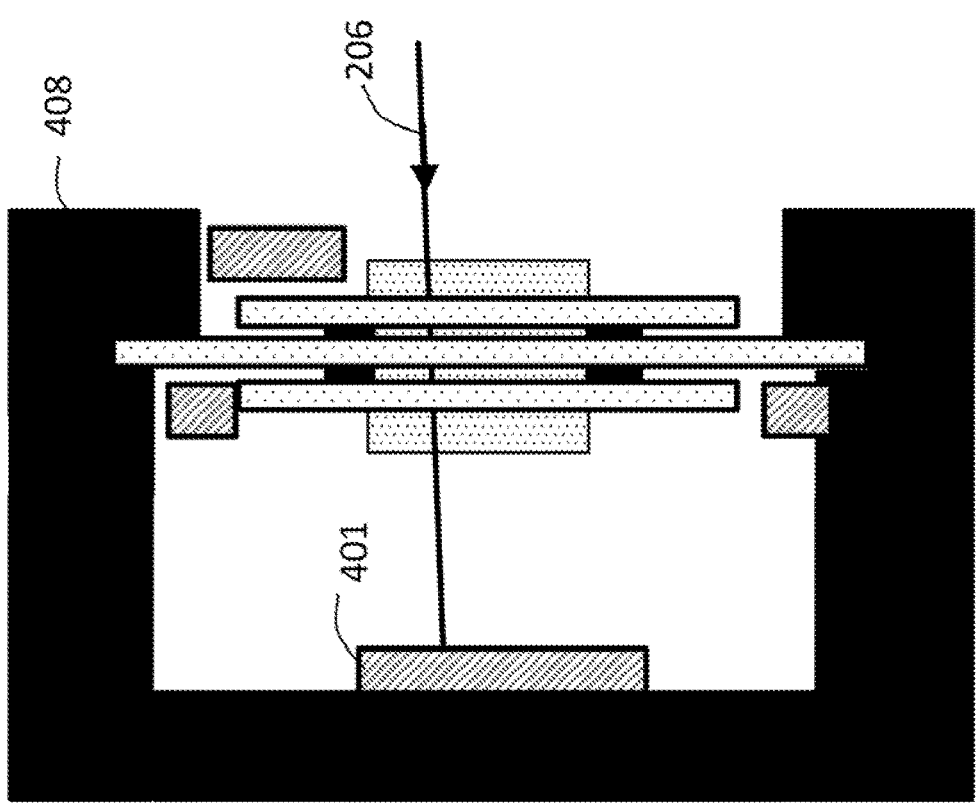
FIG. 13 shows an exemplary rotating polarizing optical platform 408 coupled with a measurement position sensing device.

FIG. 13 shows an exemplary rotating polarizing optical platform 408 coupled with a measurement position sensing device 401 such that the sensor is fixed while the polarizing optic can rotate independently.

Figure 14:
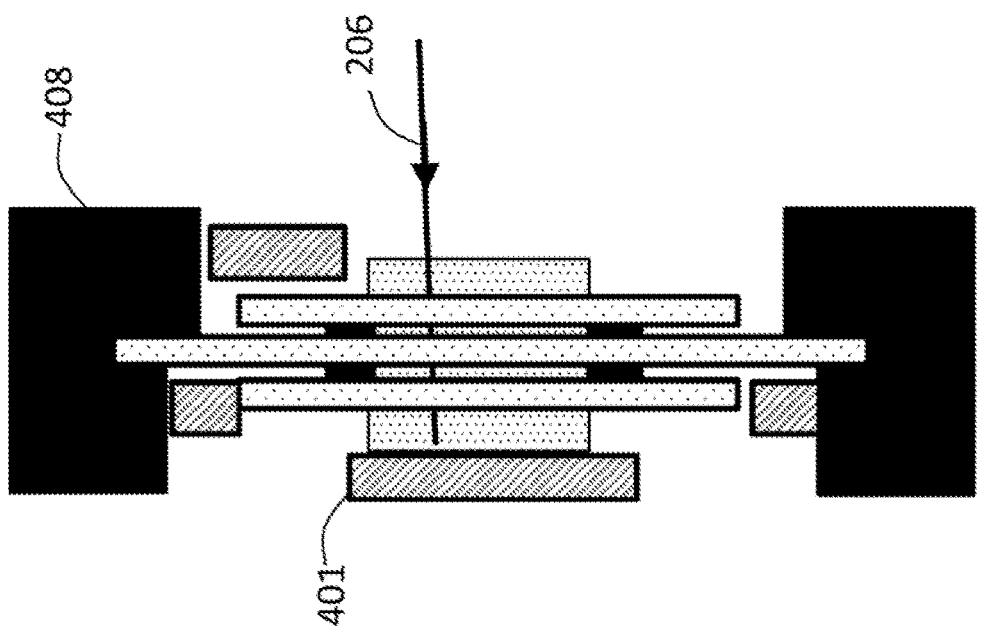
FIG. 14 shows an exemplary rotating polarizing optical platform coupled with a measurement position sensing device.

FIG. 14 shows an exemplary rotating polarizing optical platform coupled with a measurement position sensing device 401 such that the sensor rotates with the polarizing optic.

Figure 15:
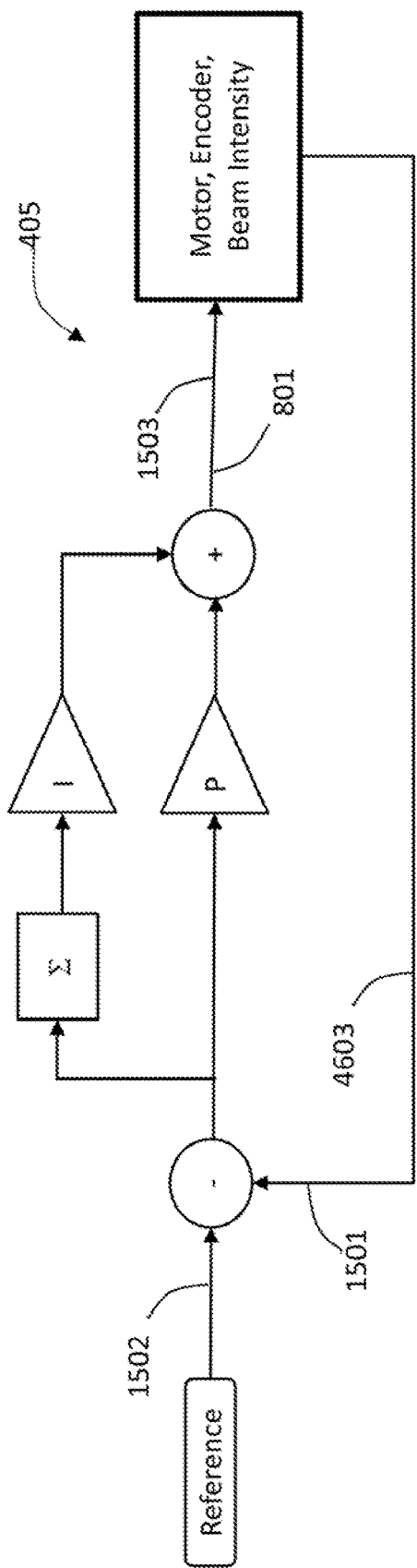
FIG. 15 shows an exemplary polarization control algorithm.

FIG. 15 shows an exemplary polarization control algorithm 405 such that a polarization control reference 1502 is compared to a polarization beam intensity feedback 1501 derived from polarization intensity output 4603. This comparison is processed to produce a polarization motor output signal 1503 from which motor input data 801 is derived.

Figure 16:
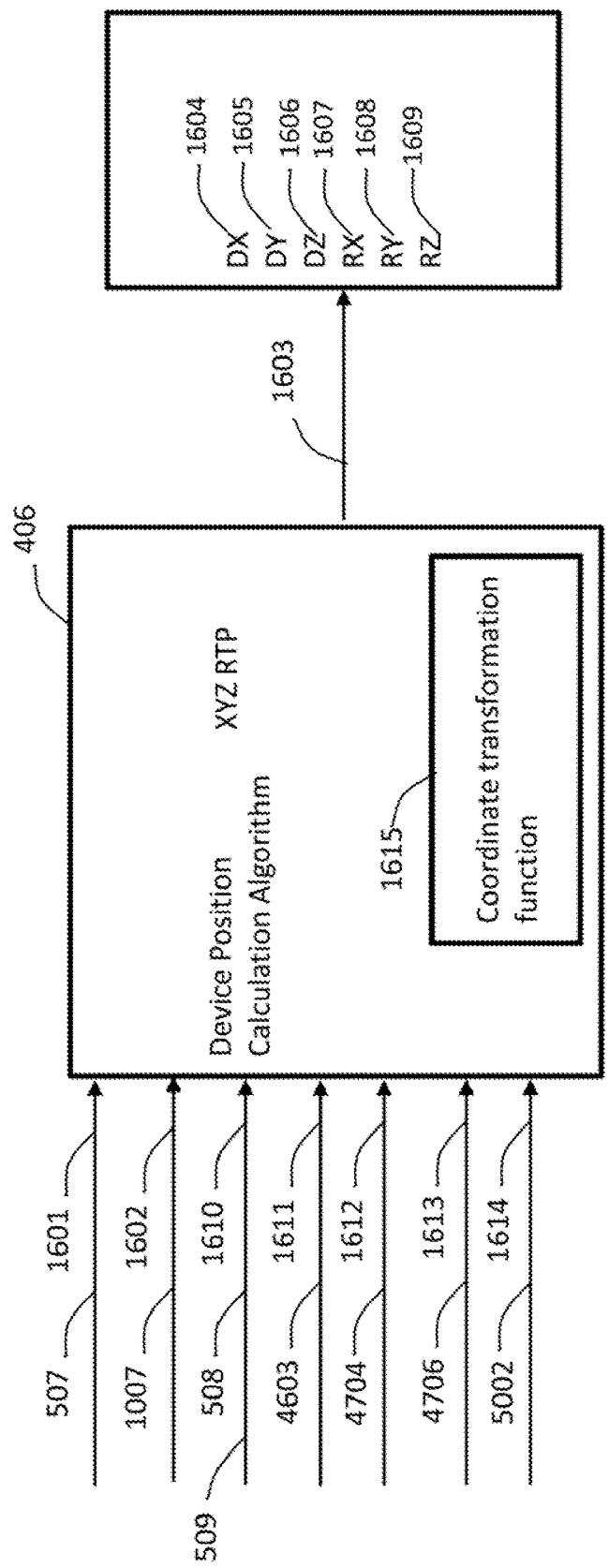
FIG. 16 shows an exemplary device position calculation algorithm.

FIG. 16 shows an exemplary device position calculation algorithm 406 that receives a polarization rotation measurement input 1601, a beam position input 1602, a beam steering position input 1610, a beam intensity input 1611, a reference beam position input 1612 a second measurement beam position input 1613, and a temperature compensation input 1614. The polarization rotation measurement input 1601 is derived from the polarization rotation measurement angle 507. The beam position input 1602 is derived from the measurement position signal 1007. The beam steering position input 1610 is derived from beam steering encoder rotation position 508, 509. The beam intensity input 1611 is derived from the polarization intensity output 4603. The reference beam position input 1612 is derived from reference beam position output 4704. The measurement beam position input 1613 is derived from the measure beam position output 4706. The temperature compensation input 1614 is derived from the temperature compensation output 5002. The algorithm receives all of this data and through a coordinate transformation function 1615 produces a position output 1603 that consists of one or more values. Translation values DX 1604, DY 1605, and DZ 1606 represent transverse positions with respect to a defined origin. Rotation values RX 1607, RY 1608, and RZ 1609 represent rotations about an axis in the coordinate system.

Figure 17:
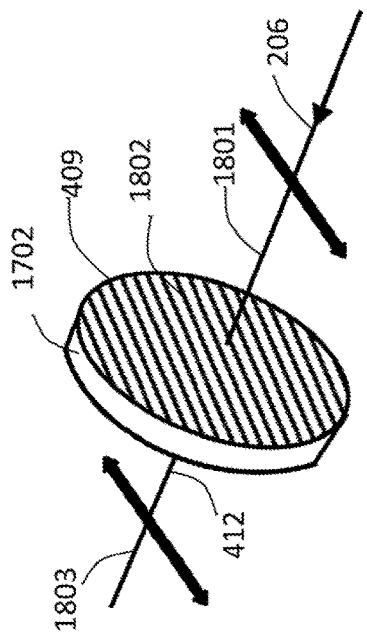
FIG. 17 shows a randomly polarized beam passing through a linear polarizer to produce linear polarized light oriented in the direction of the linear polarizer.

FIG. 17 shows a randomly polarized beam 1701 passing through a linear polarizer 1702 to produce linear polarized light oriented in the direction of the linear polarizer 1703. The intensity of this beam is half of the intensity of the input beam.

Figure 18:
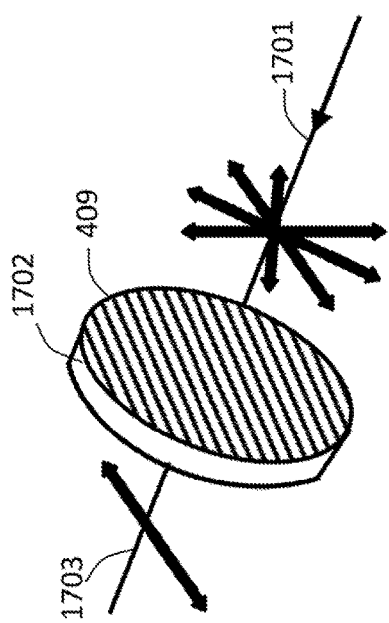
FIG. 18 shows a linear polarized beam passing through a linear polarizer with its polarization oriented 0 degrees to the beam.

FIG. 18 shows a linear polarized beam 1801 passing through a linear polarizer with its polarization oriented 0 degrees to the beam 1802. The effect is to transmit a beam of light of the same intensity and same polarization as the input beam 1803.

Figure 19:
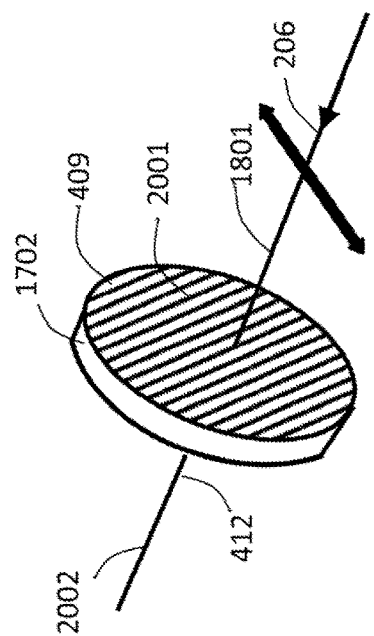
FIG. 19 shows a linear polarized beam passing through a linear polarizing optic with a 45 degree orientation.

FIG. 19 shows a linear polarized beam 1801 passing through a linear polarizing optic with a 45 degree orientation 1901. The result is a measurement beam with the linear polarization rotated 45 degrees with half the intensity 1902.

Figure 20:
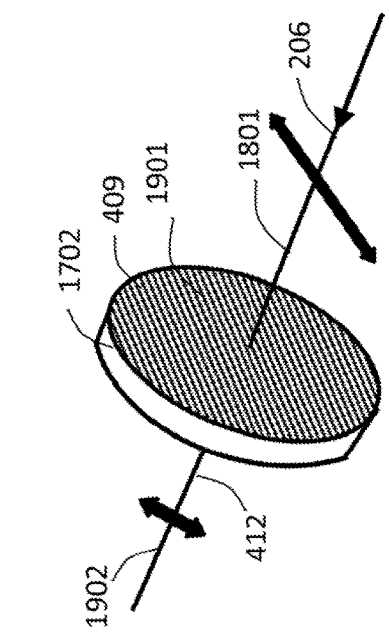
FIG. 20 shows a linear polarized beam passing through a linear polarizing optic with a 90 degree orientation.

FIG. 20 shows a linear polarized beam 1801 passing through a linear polarizing optic with a 90 degree orientation 2001. The result is a measurement beam with no intensity 2002.

Figure 21:
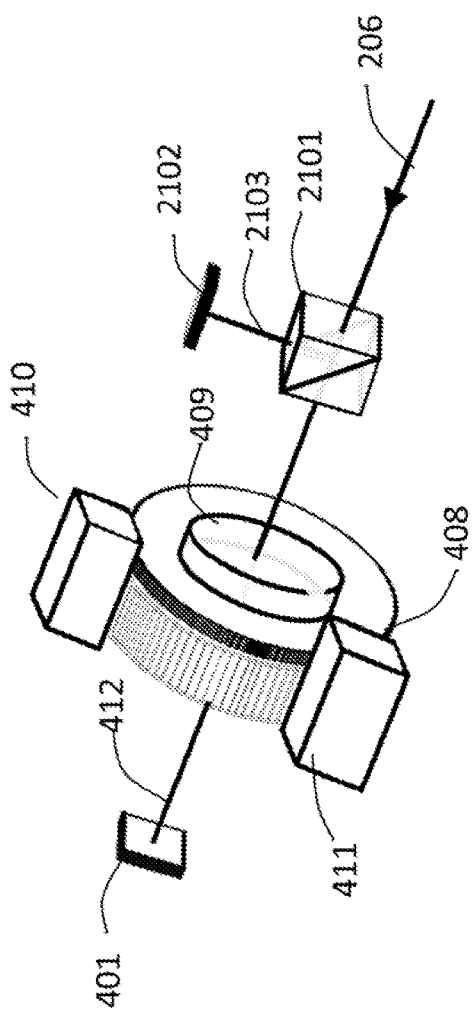
FIG. 21 shows an exemplary embodiment with an input reference beam created by a non-polarizing beam splitter.

FIG. 21 shows an exemplary embodiment with an input reference beam 2103 created by a non-polarizing beam splitter 2101 coupled with an input beam reference sensor 2102.

Figure 22:
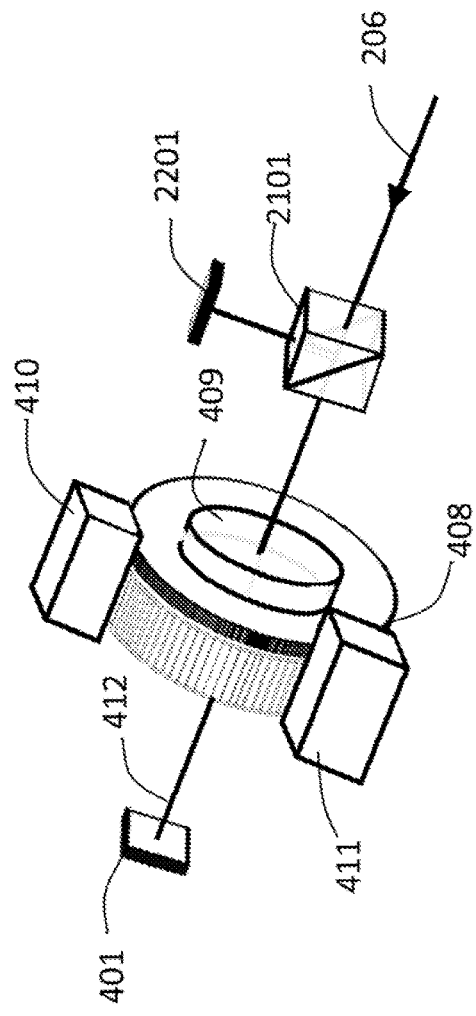
FIG. 22 shows an exemplary embodiment with a non-polarizing beam splitter and a reference position sensing device.

FIG. 22 shows an exemplary embodiment with a non-polarizing beam splitter 2101 and a reference position sensing device 2201.

Figure 23:
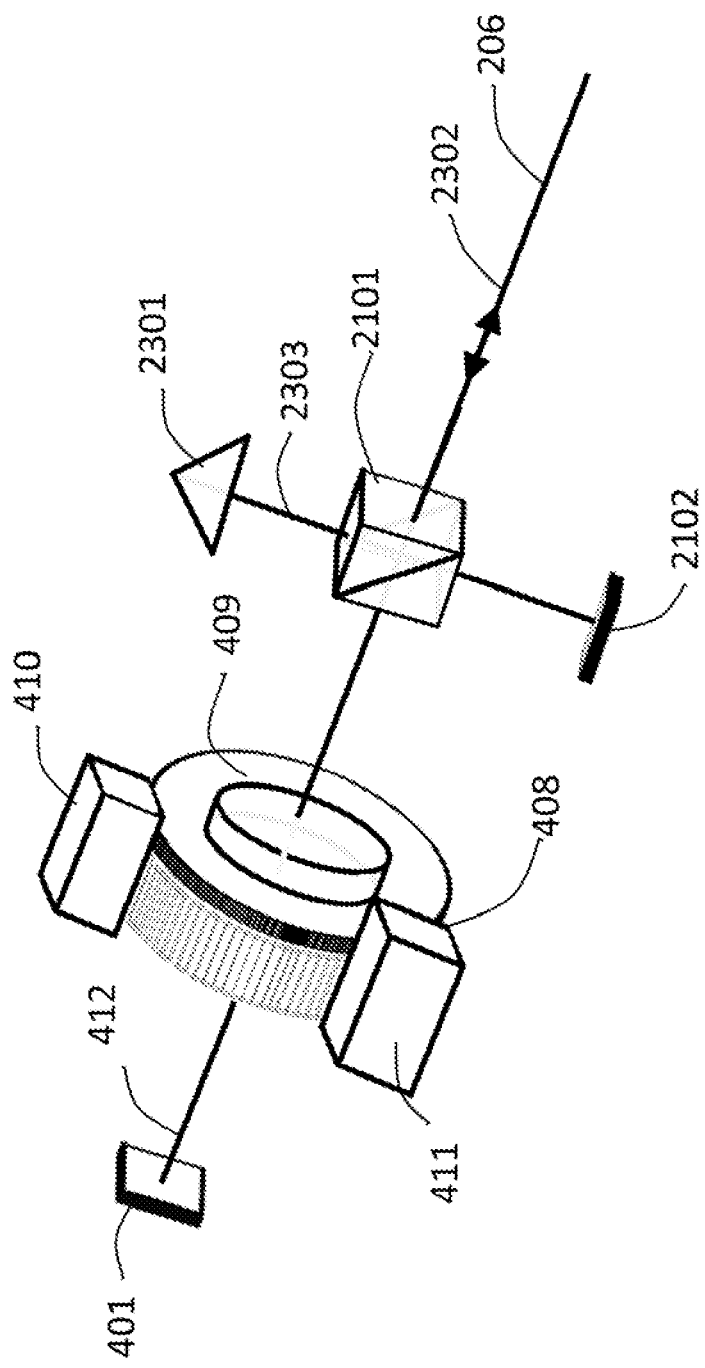
FIG. 23 shows an exemplary embodiment with an initial tracking beam 2303 created by non-polarizing beam splitter coupled with a reflector.

FIG. 23 shows an exemplary embodiment with an initial tracking beam 2303 created by non-polarizing beam splitter 2101 coupled with a reflector 2301 and an input beam reference sensor 2102, which allows for both measuring reference intensity and generating a reflected tracking beam 2302 back to the light transmitter.

Figure 24:
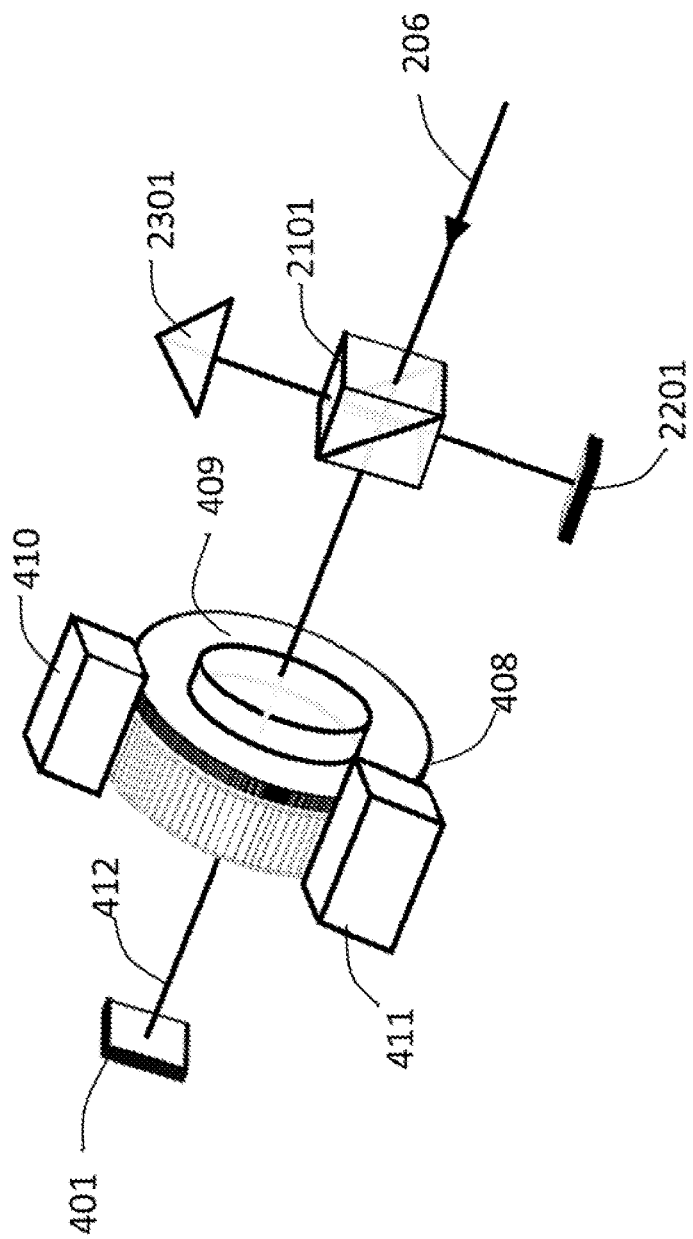
FIG. 24 shows an exemplary embodiment with a reflector used in combination with a reference position sensing device.

FIG. 24 shows an exemplary embodiment with a reflector 2301 used in combination with a reference position sensing device 2201.

Figure 25:
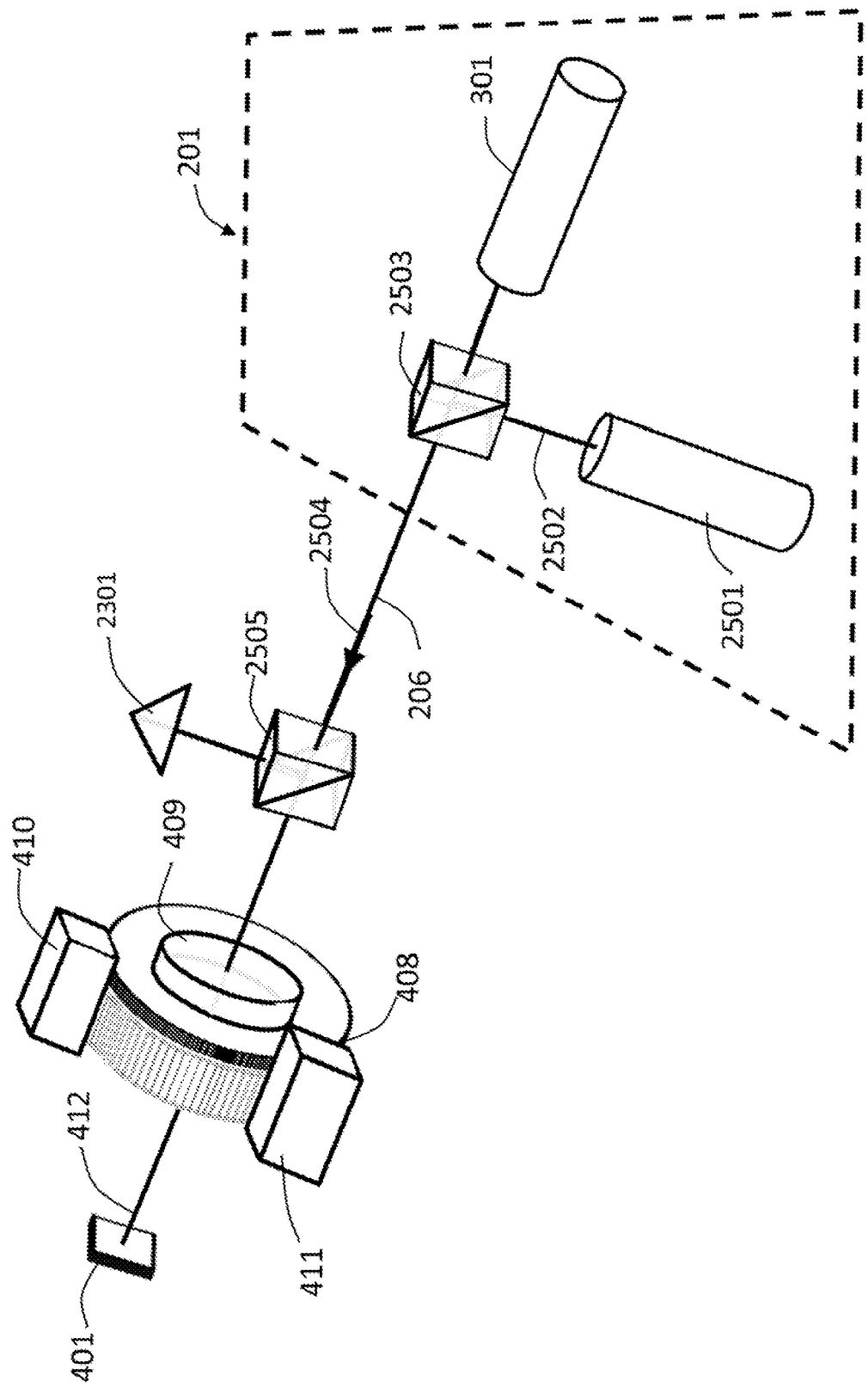
FIG. 25 shows an exemplary embodiment where the beam from a laser 301 is combined with a second light beam.

FIG. 25 shows an exemplary embodiment where the beam from a laser 301 is combined with a second light beam 2502 with a different wavelength emitted from light source 2501 using a dichroic beam splitter 2503. Two nominally collinear beams 2504 are emitted from the beam splitter and are received by an exemplary light receiver containing dichroic beam splitter 2505, which will direct one beam to reflector 2301 and the other toward measurement position sensing device 401.

Figure 26:
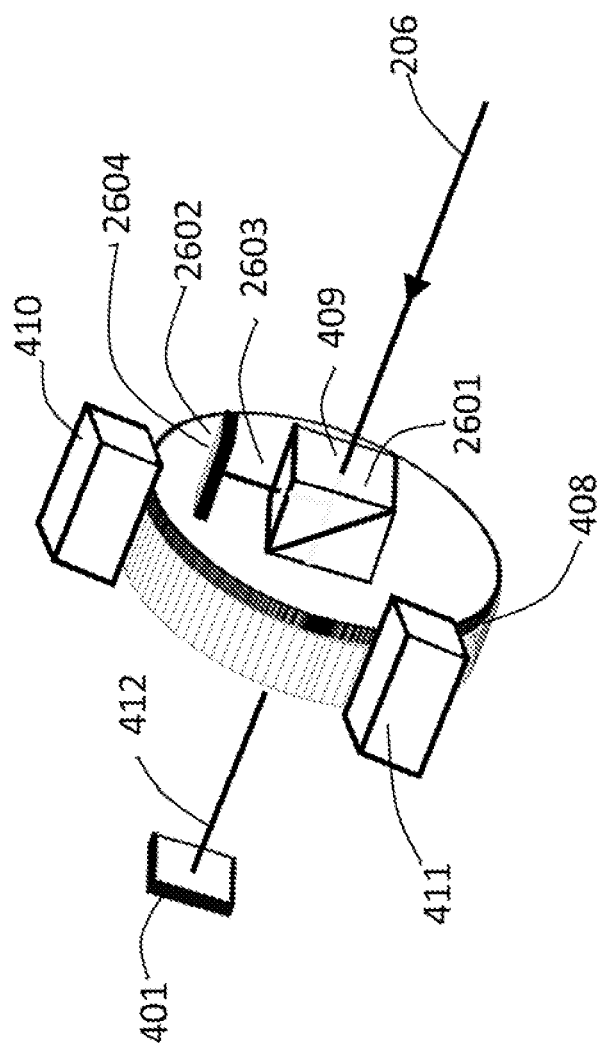
FIG. 26 shows an exemplary rotating polarizing optical platform with a polarizing beam splitter.

FIG. 26 shows an exemplary rotating polarizing optical platform 408 with a polarizing beam splitter 2601 producing a measurement beam 2603 that is measured by measurement photo sensor 2602, which can be a position sensing device 2604.

Figure 27:
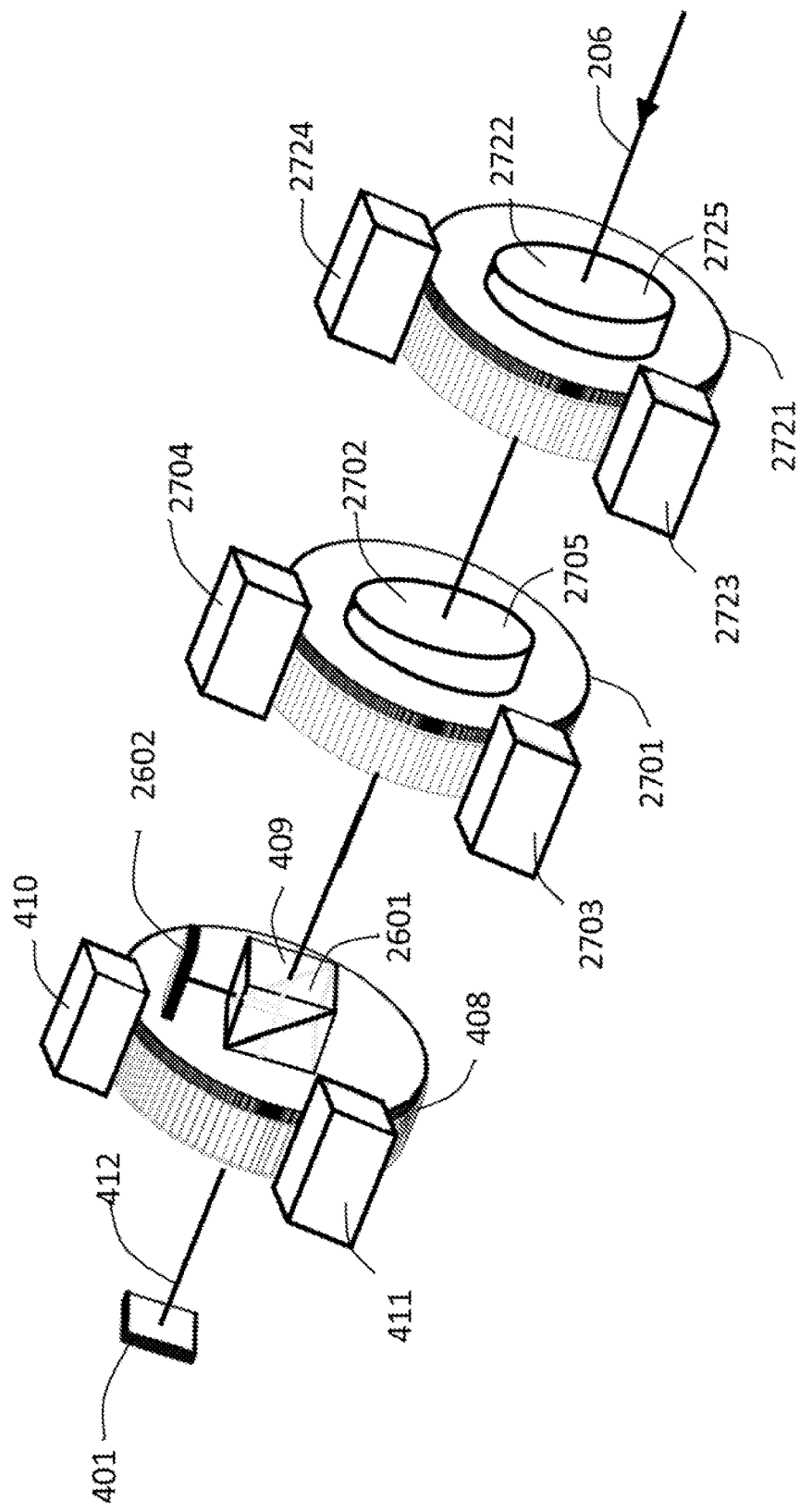
FIG. 27 shows additional exemplary beam steering platforms with a beam steering optic that is a wedge prism.

FIG. 27 shows additional exemplary beam steering platforms 2721 with a beam steering optic 2722 that is a wedge prism 2725 used in conjunction with a second beam steering platform 2701 with a beam steering optic 2702 that is a wedge prism 2705. These platforms are coupled with rotating polarizing optical platform 408 and polarizing beam splitter 2601 coupled with a measurement photo sensor 2602.

Figure 28:
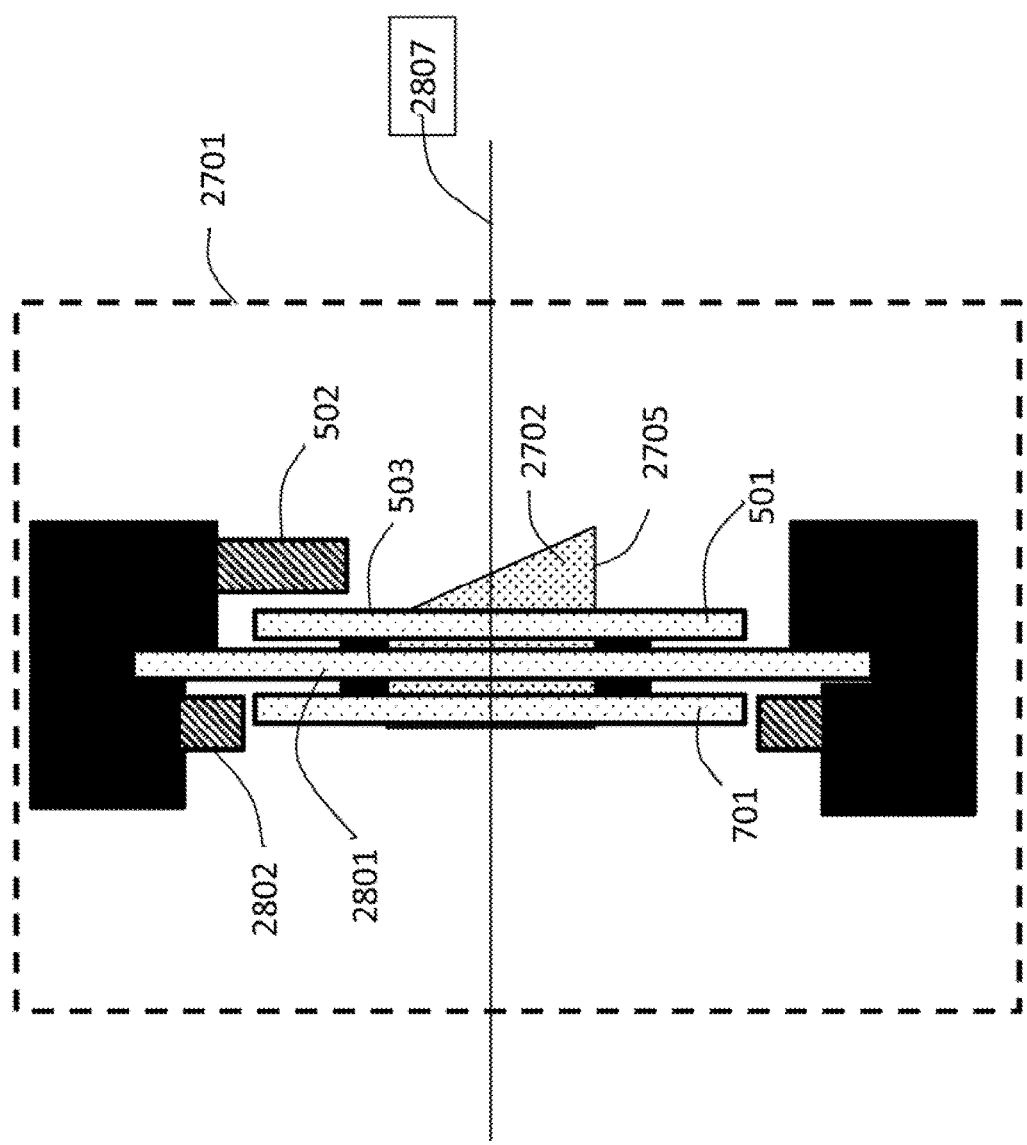
FIG. 28 shows an exemplary beam steering platform.

FIG. 28 shows an exemplary beam steering platform 2701 mounted on bearings 2801 such that wedge prism 2705 rotates about axis of rotation 2807.

FIG. 29 shows an exemplary refractive optic 2902, which is a wedge prism 2705 with a beam of light 206 impinging on the prism such that a light beam directed along an output path 2901 at an angle and direction determined by the design of wedge prism 2705 and its rotation about beam of light 206.

FIG. 30 shows an exemplary wedge prism rotated 180 degrees about beam of light 206 demonstrating how the path of the output beam is directed.

FIG. 31 shows an exemplary beam steering platform 2701 with wedge prism 2705 emitting a beam in a given direction.

FIG. 32 shows an exemplary beam steering platform 2701 with wedge prism 2705 in an alternate orientation emitting a beam in a given direction.

Figure 33:
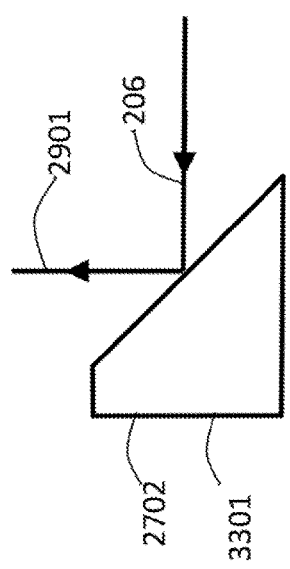
FIG. 33 shows an exemplary reflective optic.

FIG. 33 shows an exemplary reflective optic 3301 that reflects beam of light 206 as a light beam directed along an output path 2901.

Figure 34:
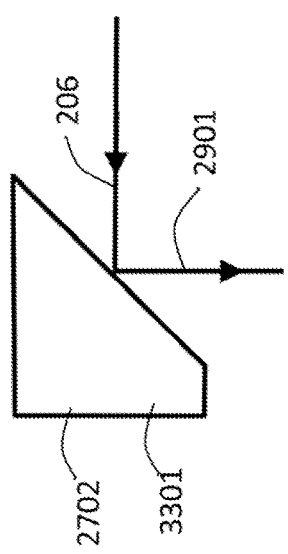
FIG. 34 shows an exemplary reflective optic.

FIG. 34 shows an exemplary reflective optic 3301 rotated 180 degrees about beam of light 206

Figure 35:
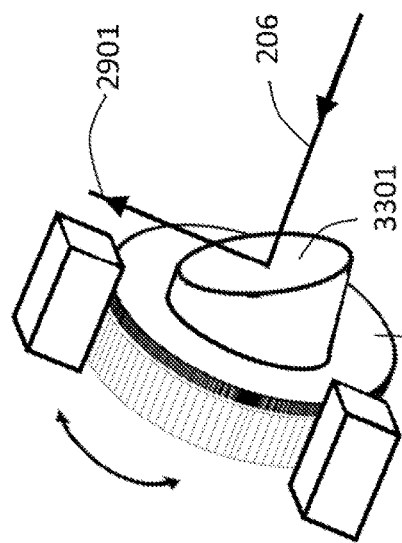
FIG. 35 shows an exemplary beam steering platform.

FIG. 35 shows an exemplary beam steering platform 2701 with a reflective optic 3301

Figure 36:
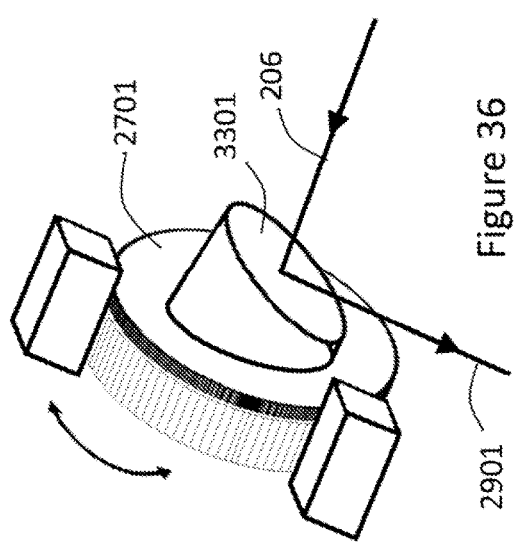
FIG. 36 shows an exemplary beam steering platform.

FIG. 36 shows an exemplary beam steering platform 2701 with a reflective optic 3301 in an alternate orientation.

Figure 37:
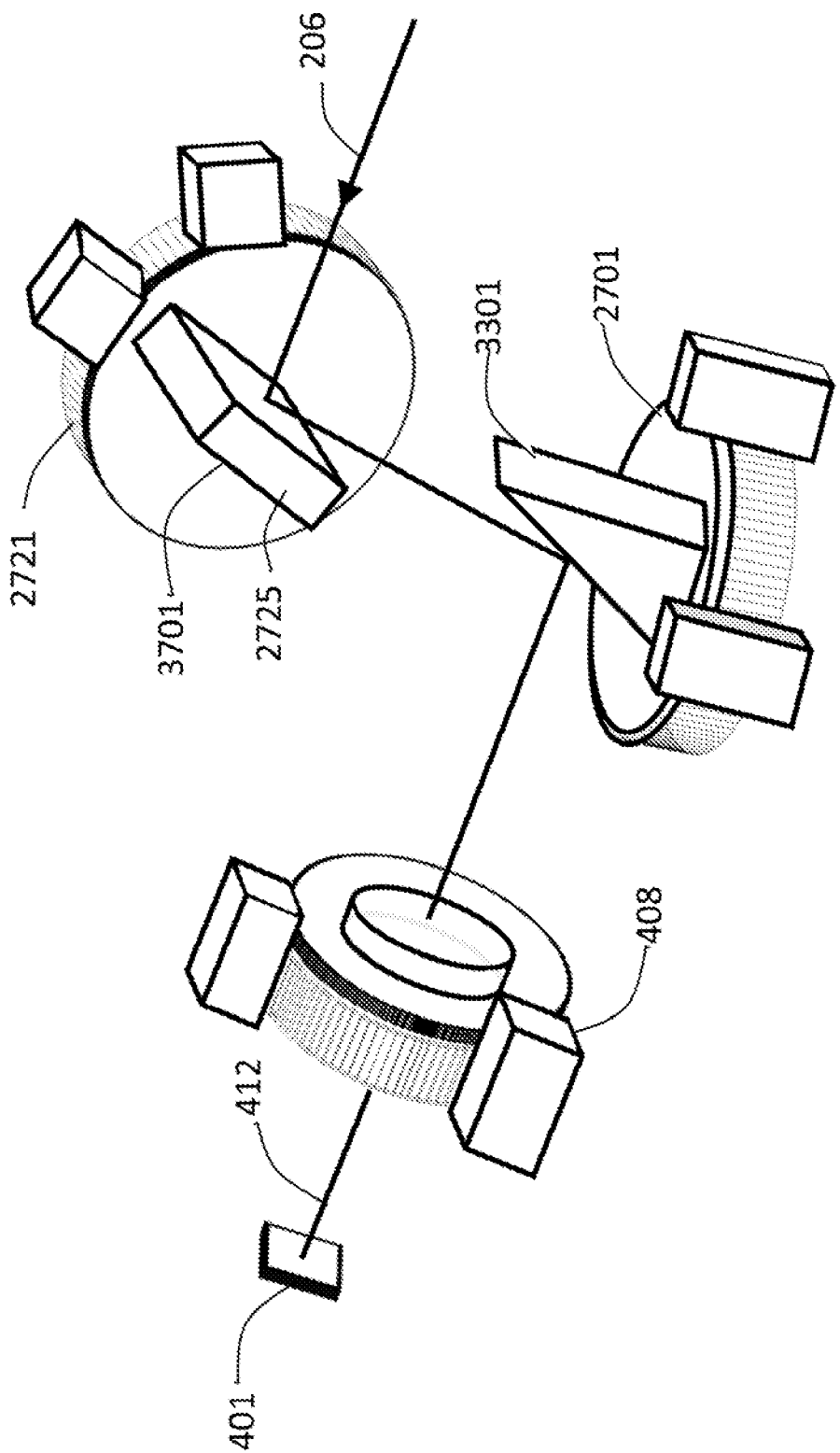
FIG. 37 show an exemplary beam steering assembly.

FIG. 37 show an exemplary beam steering assembly 2721 with a reflective optic 3701 and a beam steering platform 2701 with a reflective optic 3301 coupled so that their axes of rotation are perpendicular and can there steer the incoming beam of light 206 toward the measurement position sensing device 401.

Figure 38:
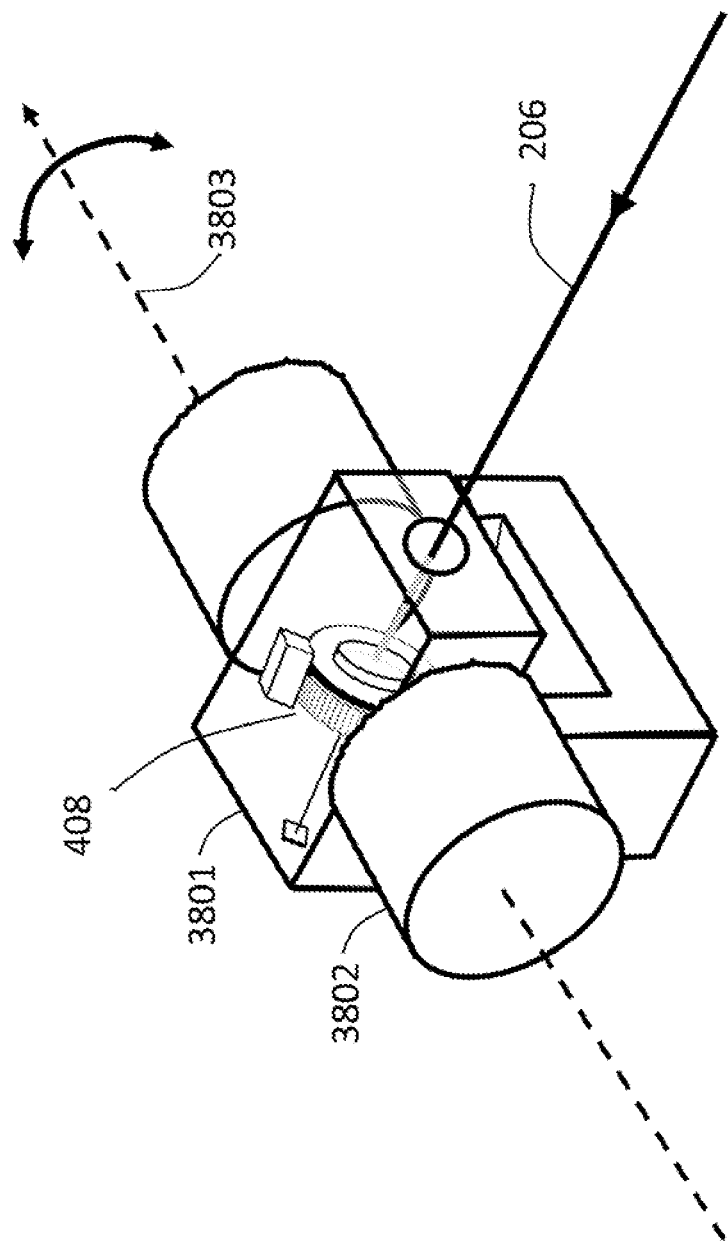
FIG. 38 shows an exemplary polarizing optic platform.

FIG. 38 shows an exemplary polarizing optic platform 408 mounted on a rotating platform 3801 with a single axis of rotation 3803 controlled by optical platform positioner 3802.

Figure 39:
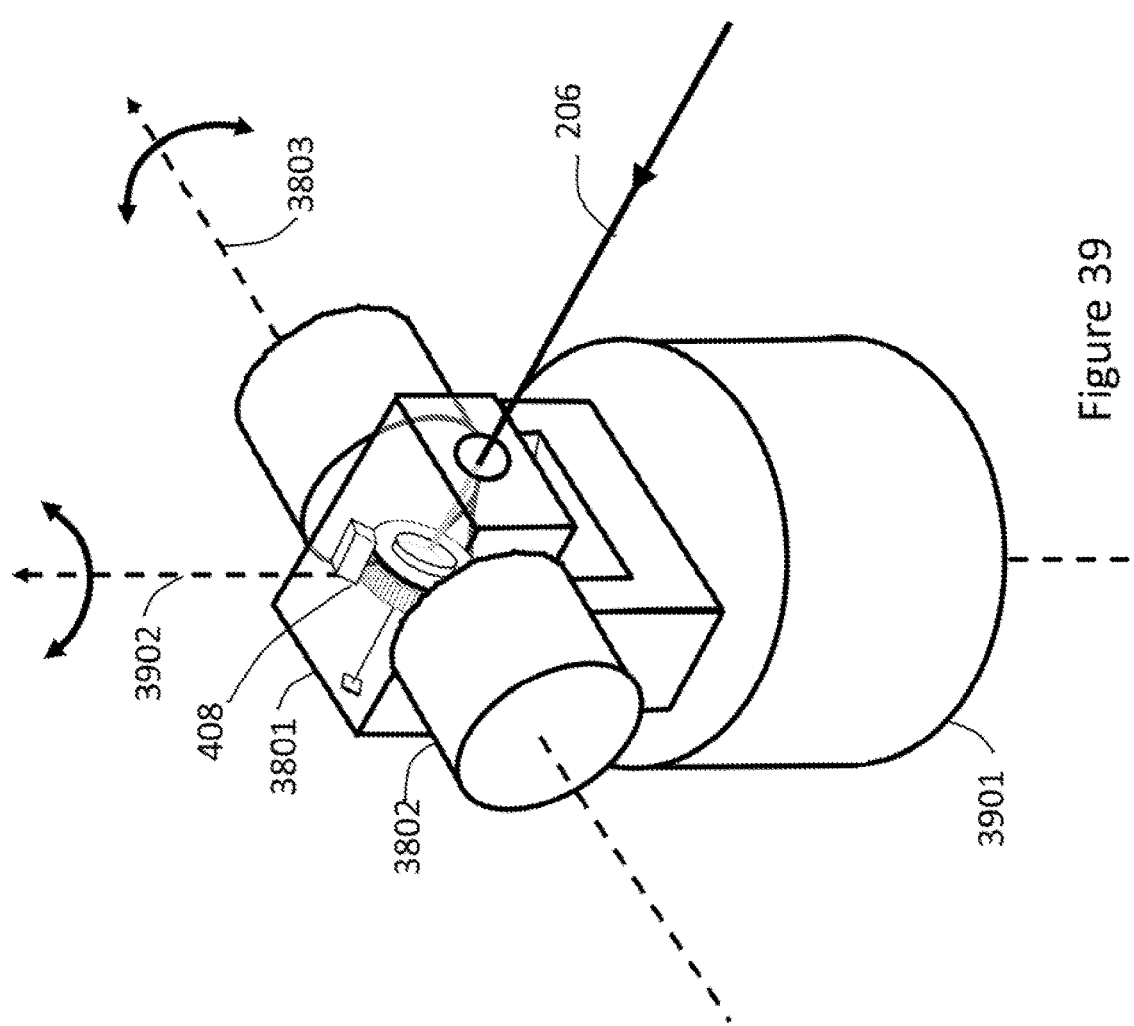
FIG. 39 shows an exemplary polarizing optic platform.

FIG. 39 shows an exemplary polarizing optic platform 408 mounted on a rotating platform 3801 with a second axis of rotation 3902 controlled by an optical platform positioner 3901.

Figure 40:
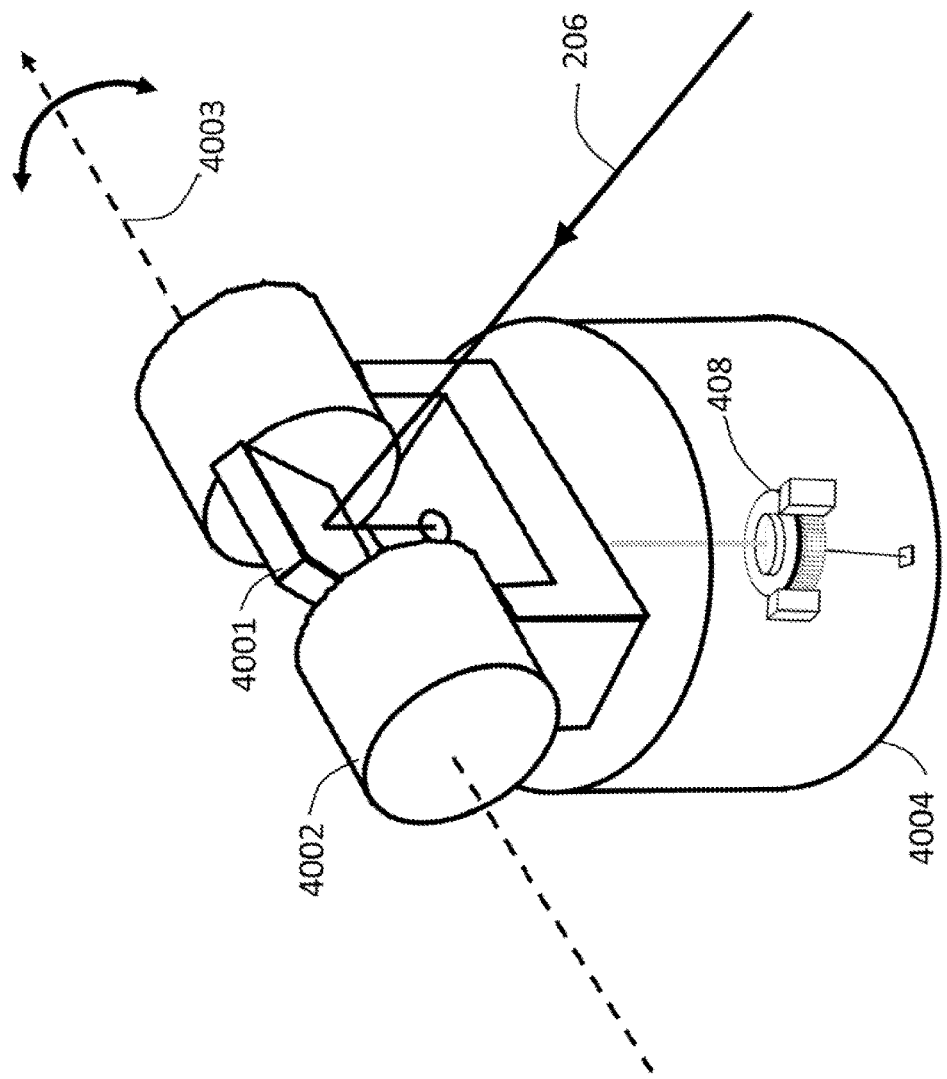
FIG. 40 shows an exemplary polarizing optical platform.

FIG. 40 shows an exemplary polarizing optical platform 408 mounted on a beam steering positioner base 4004 with a single beam steering positioner 4002 to rotate a beam steering reflector 4001 about an axis of rotation 4003.

Figure 41:
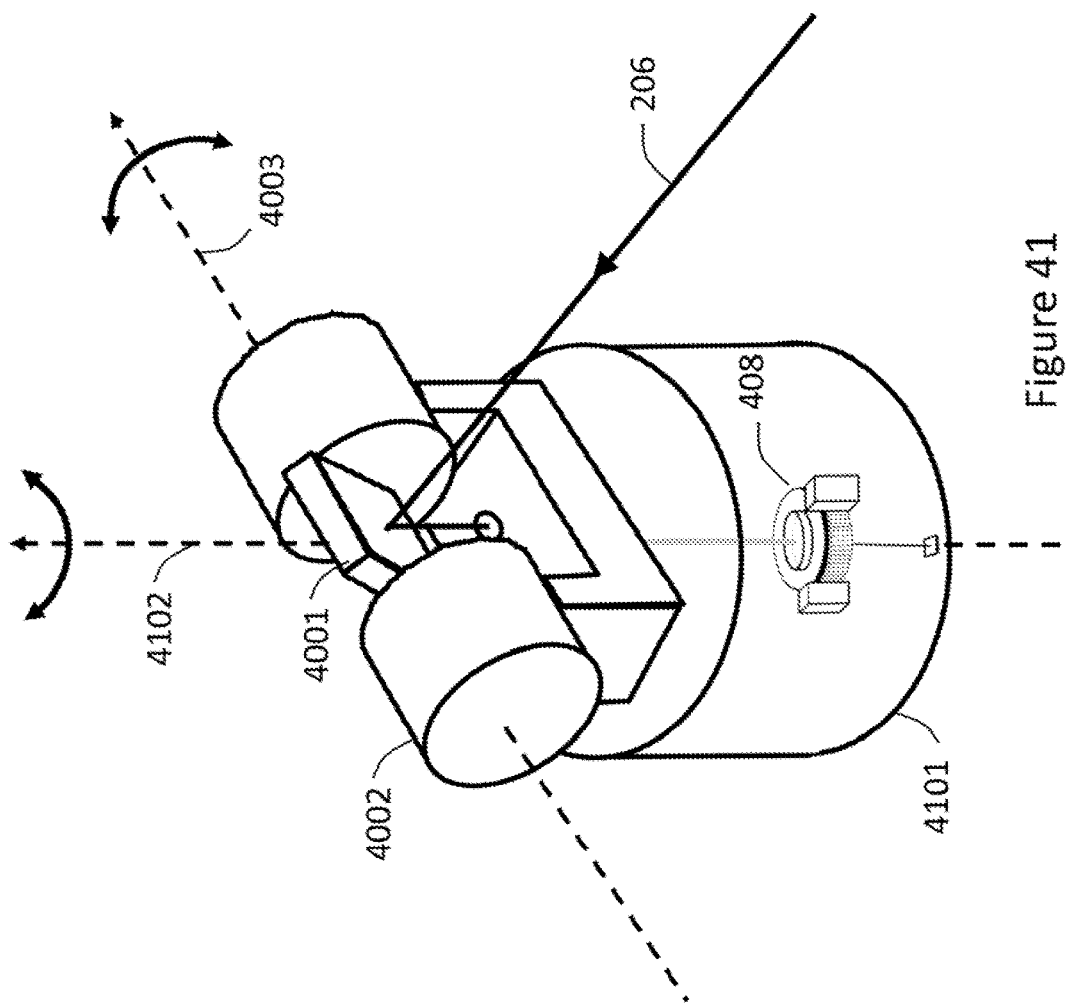
FIG. 41 shows an exemplary polarizing optical platform.

FIG. 41 shows an exemplary polarizing optical platform 408 mounted on a beam steering positioner 4101 with an additional axis of rotation 4102.

Figure 42:
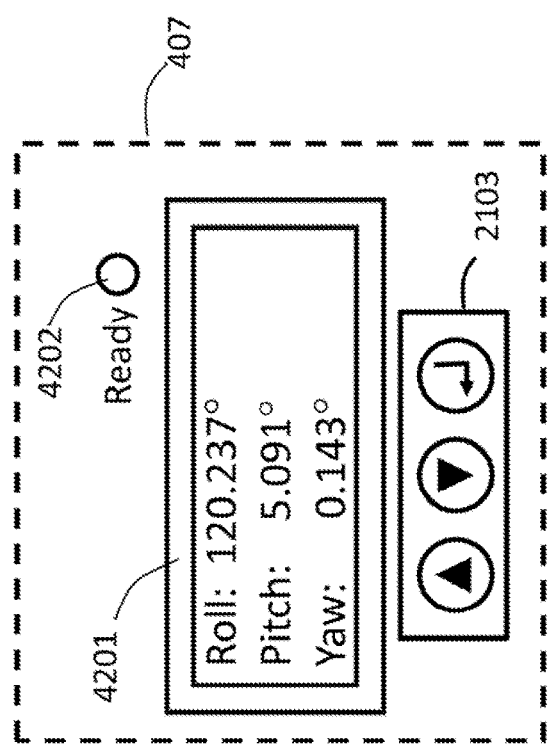
FIG. 42 shows an exemplary communication interface.

FIG. 42 shows an exemplary communication interface 407 with an information display 4201, an indicators light 4202, and user buttons 4203.

Figure 43:
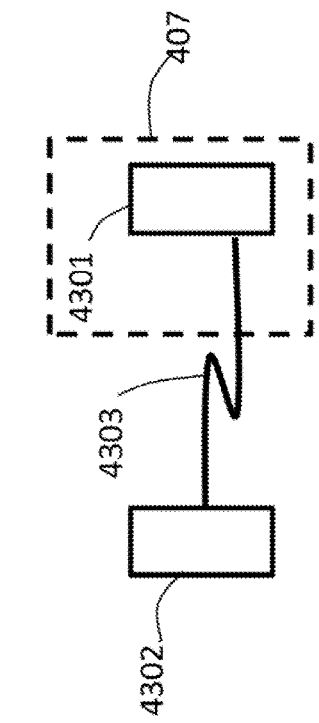
FIG. 43 shows an exemplary communication interface.

FIG. 43 shows an exemplary communication interface 407 with wired transceiver that is part of the communication interface 4301 with a wire 4303 connecting it to the wired transceiver that is outside the light receiver 4302.

Figure 44:
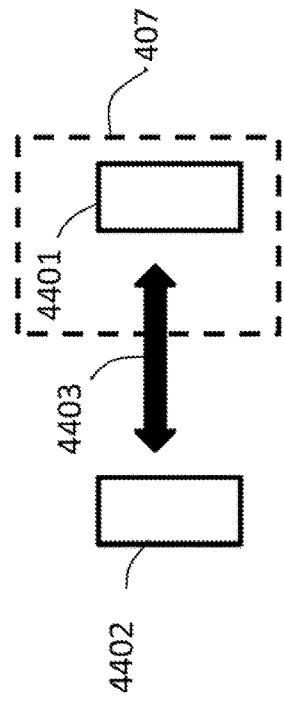
FIG. 44 shows an exemplary communication interface.

FIG. 44 shows an exemplary communication interface 407 with wireless transceiver that is part of the communication interface 4401 with wireless data 4403 communicated to and from the wireless transceiver that is outside the light receiver 4402.

Figure 45:
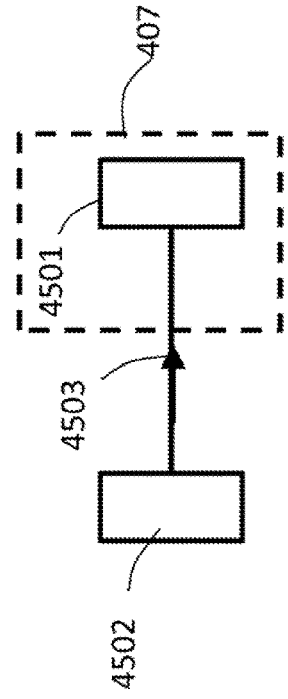
FIG. 45 shows an exemplary communication interface.

FIG. 45 shows an exemplary communication interface 407 with an optical transceiver that is part of the communication interface 4501 with data represented by light 4503 communicated to and from the optical transceiver that is outside the light receiver 4502.

Figure 46:
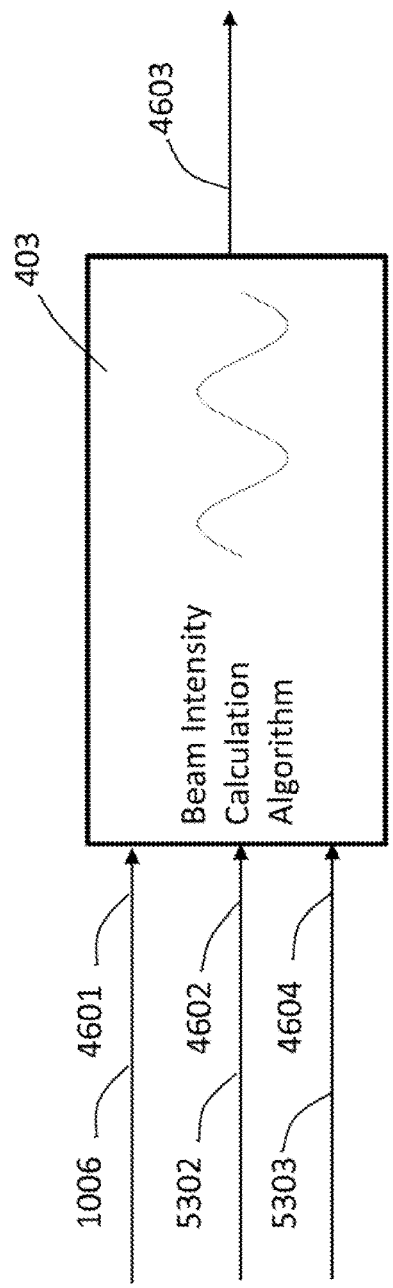
FIG. 46 shows an exemplary beam intensity calculation algorithm.

FIG. 46 shows an exemplary beam intensity calculation algorithm 403, with a measurement intensity input 4601 derived from an intensity measurement signal 1006, a reference intensity input 4602 derived from a reference intensity signal 5302, and a measurement intensity input 4604 derived from a measurement intensity signal 5303. The output is a polarization intensity output 4603.

Figure 47:
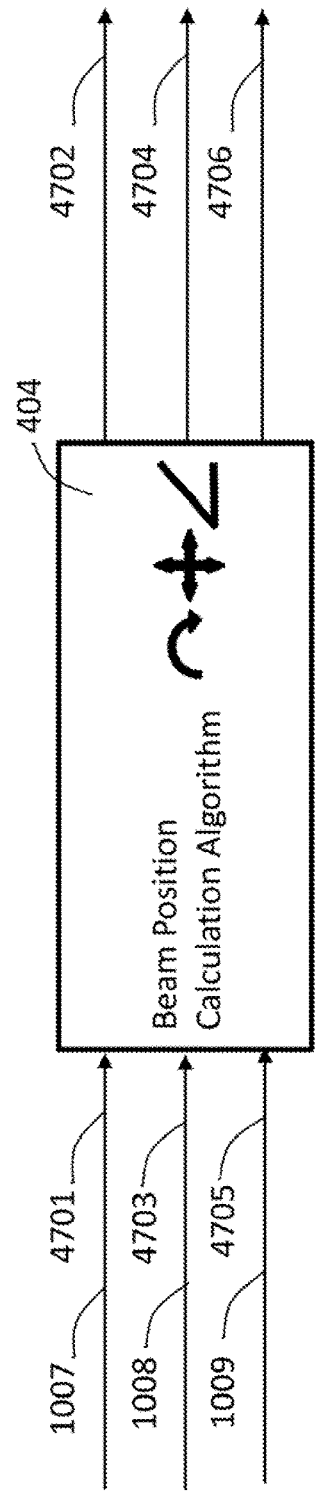
FIG. 47 shows an exemplary beam position calculation algorithm.

FIG. 47 shows an exemplary beam position calculation algorithm 404 with a measure beam position data input 4701 derived from a measurement position signal 1007, a reference beam position data input 4703 derived from the reference position data 1008, and a measure beam position data input 4705 derived from a measurement input position signal 1009. The output of the algorithm is a measure beam position output 4702, a reference beam position output 4704, and a measure beam position output 4706.

Figure 48:
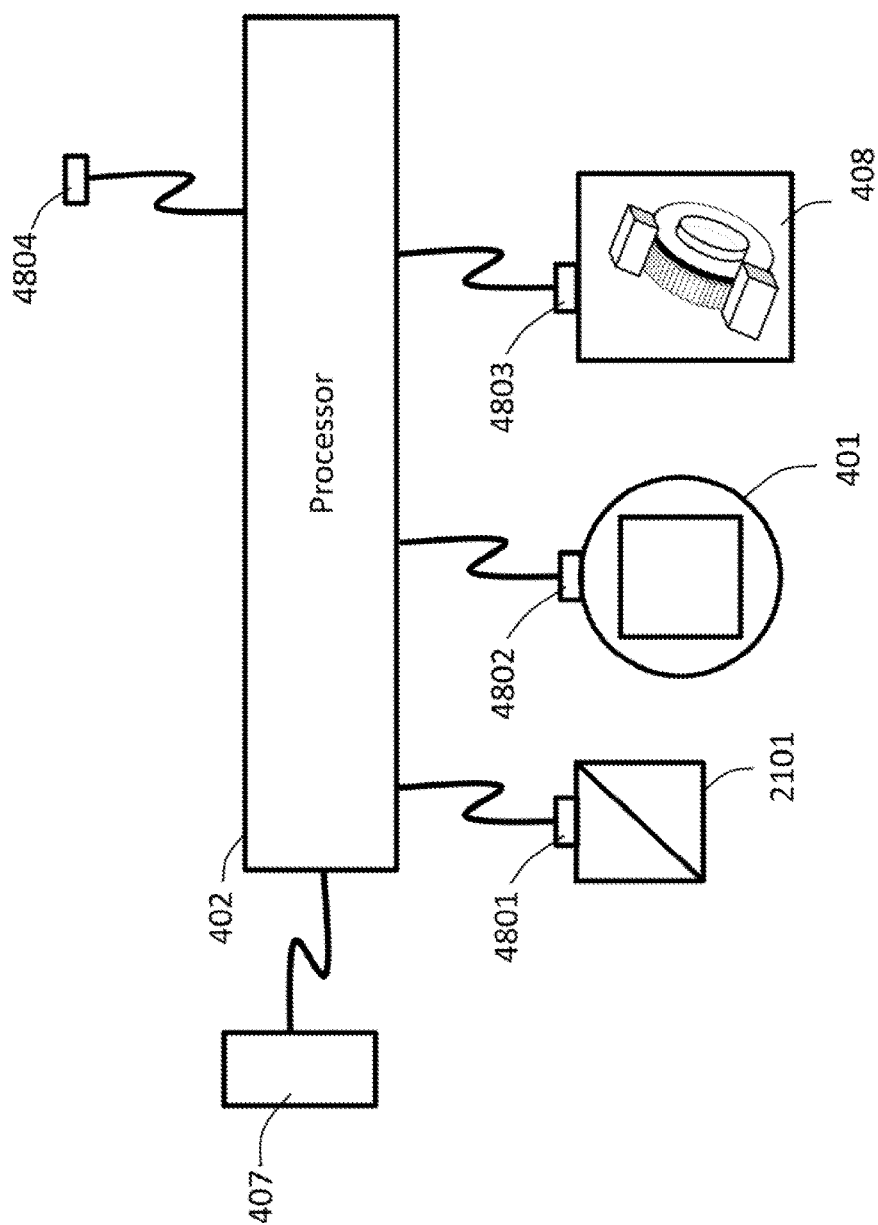
FIG. 48 shows an exemplary processor and temperature sensors.

FIG. 48 shows an exemplary processor 402 temperature sensors. Temperature sensor 4801 measure the temperature of no-polarizing beam splitter 2101. Temperature sensor 4802 measures the temperature of the measurement position sensing device 401, and temperature sensor 4803 measures the temperature of the rotating polarizing optical platform 408. Temperature sensor 4804 measures the ambient air temperature.

Figure 49:
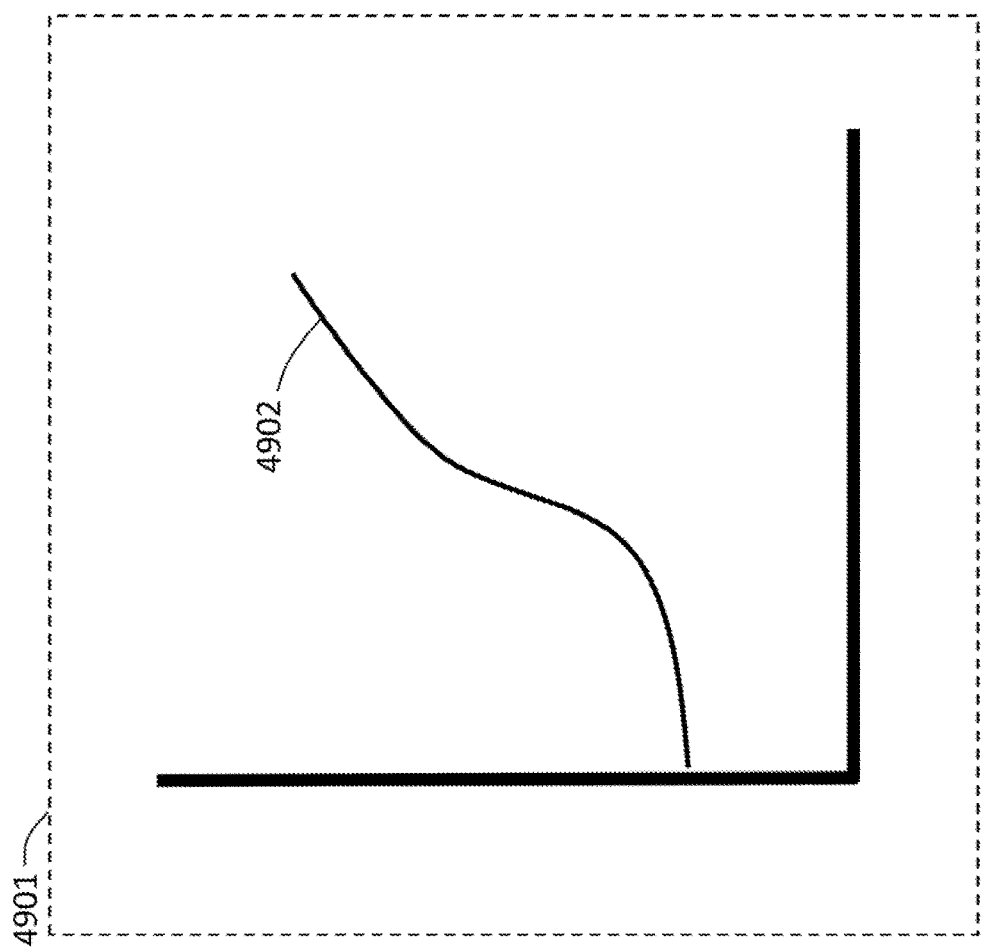
FIG. 49 shows exemplary temperature data.

FIG. 49 shows exemplary temperature data 4901 where the temperature signal 4902 from sensor varies with temperature and can be digitized to calculate a temperature.

Figure 50:
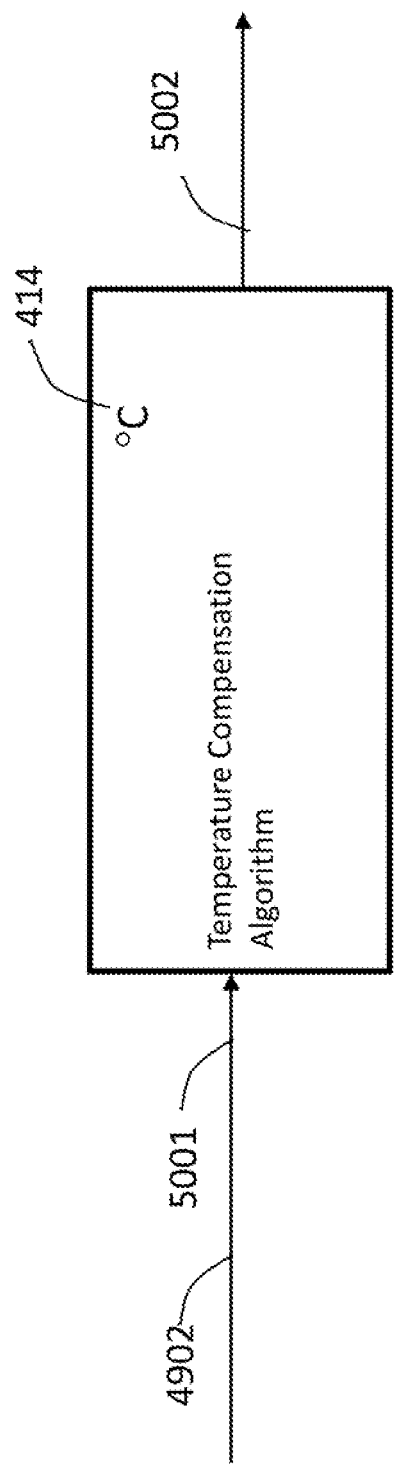
FIG. 50 shows a temperature compensation algorithm.

FIG. 50 shows a temperature compensation algorithm 414 takes a temperature measurement input 5001 derived from the temperature signal 4902. The output is the temperature compensation output 5002.

Figure 51:
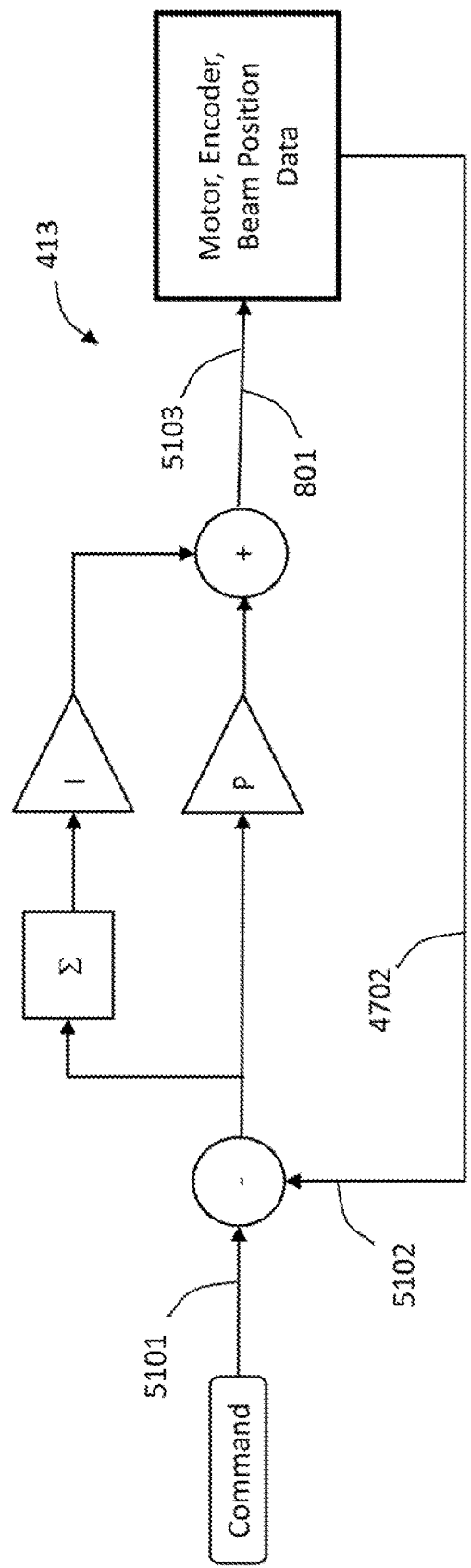
FIG. 51 shows an exemplary beam steering control algorithm.

FIG. 51 shows an exemplary beam steering control algorithm 413 such that a beam steering command 5101 is compared to a beam steering position feedback 5102 derived from measurement beam position output 4702. This comparison is processed to produce a beam steering motor output signal 5103 from which motor input data 801 is derived.

Figure 52:
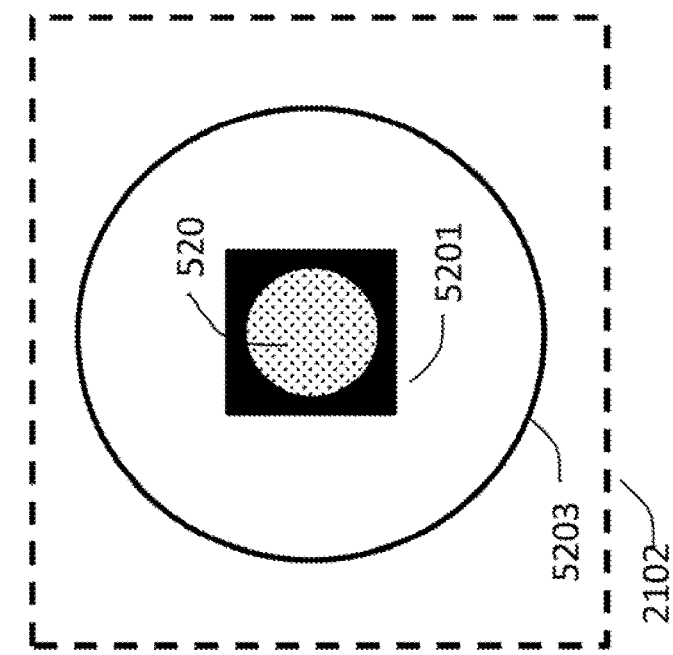
FIG. 52 shows an exemplary input beam reference sensor.

FIG. 52 shows an exemplary input beam reference sensor 2102, which is a photo sensor 5203, with a reference beam spot 5202 impinging on the photo sensor active area 5201.

Figure 53:
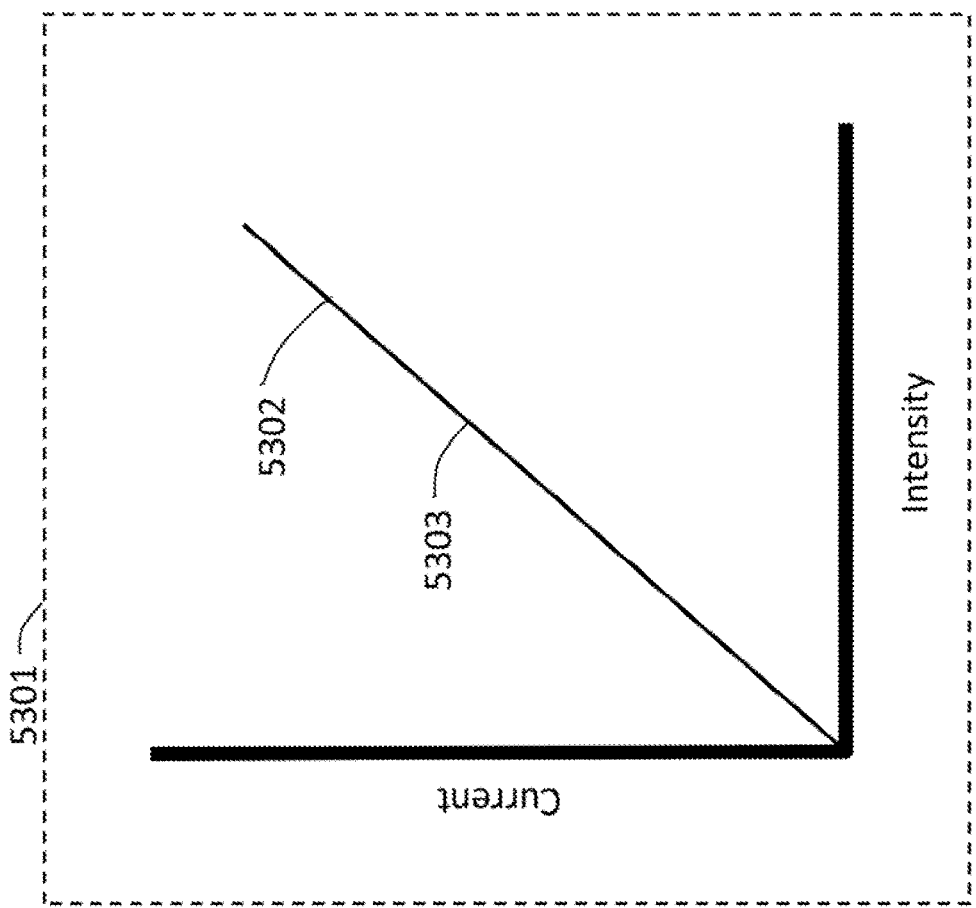
FIG. 53 shows exemplary photo sensor intensity data.

FIG. 53 shows exemplary photo sensor intensity data 5301. The reference intensity signal 5302 and measurement intensity signal 5303 are current that varies with intensity. The signal can be digitized.

Figure 54:
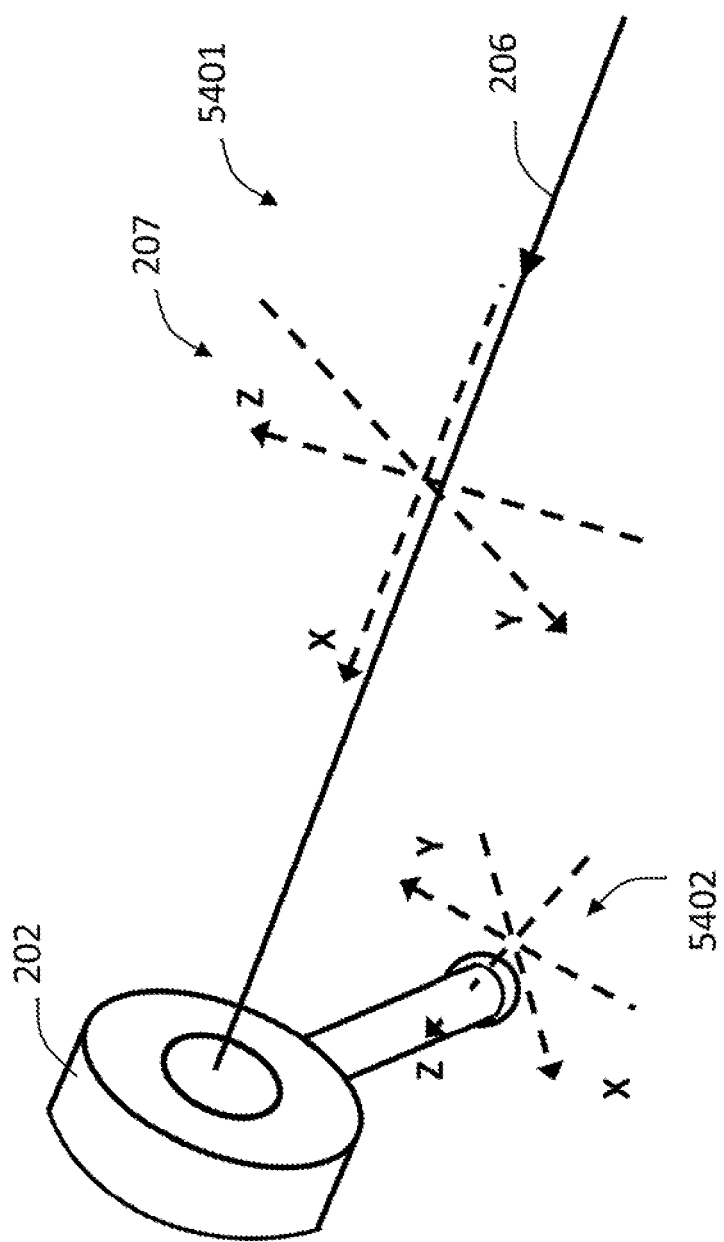
FIG. 54 shows an exemplary reference coordinate system.

FIG. 54 shows an exemplary reference coordinate system 207, which is a right-handed Cartesian coordinate system 5401 that is transformed from a left-handed Cartesian coordinate system that has been rotated and translated 5402.

Figure 55:
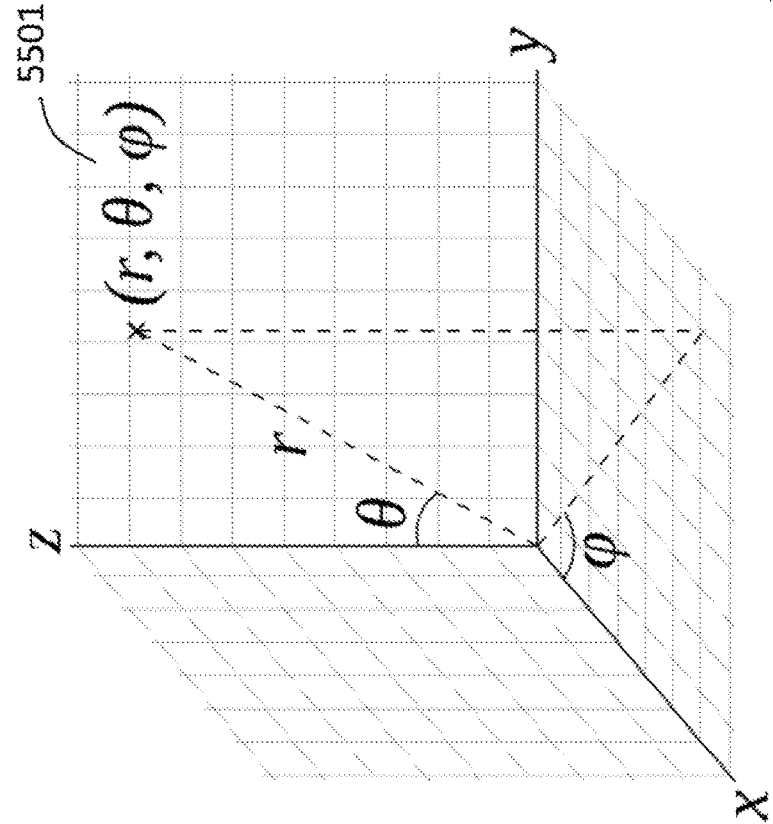
FIG. 55 shows an exemplary spherical coordinate.

FIG. 55 shows an exemplary spherical coordinate 5501.

Figure 56:
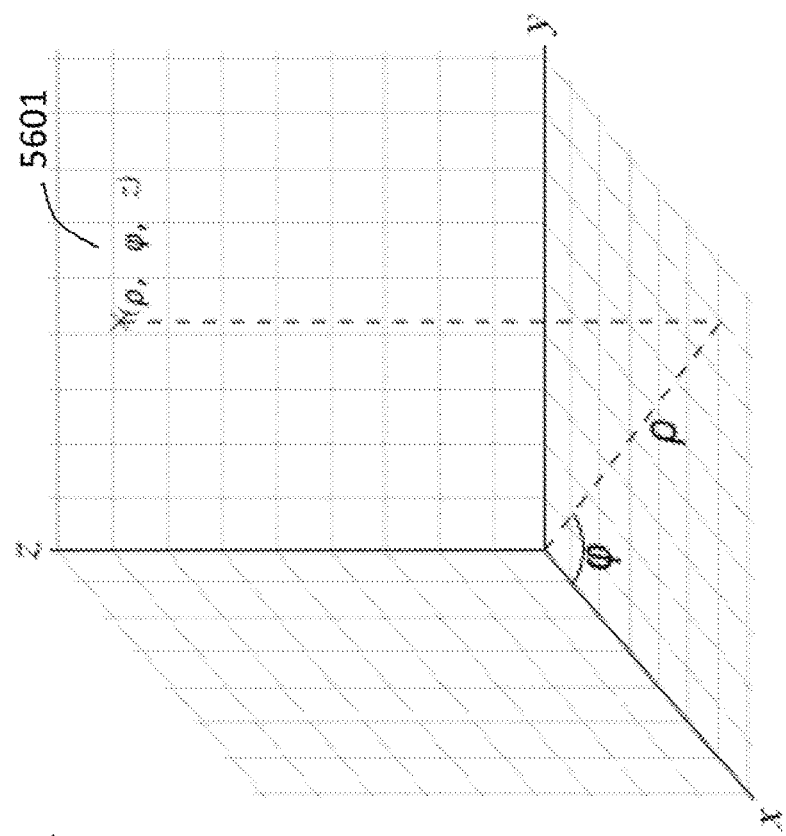
FIG. 56 shows an exemplary cylindrical coordinate.

FIG. 56 shows an exemplary cylindrical coordinate 5601.

Figure 57:
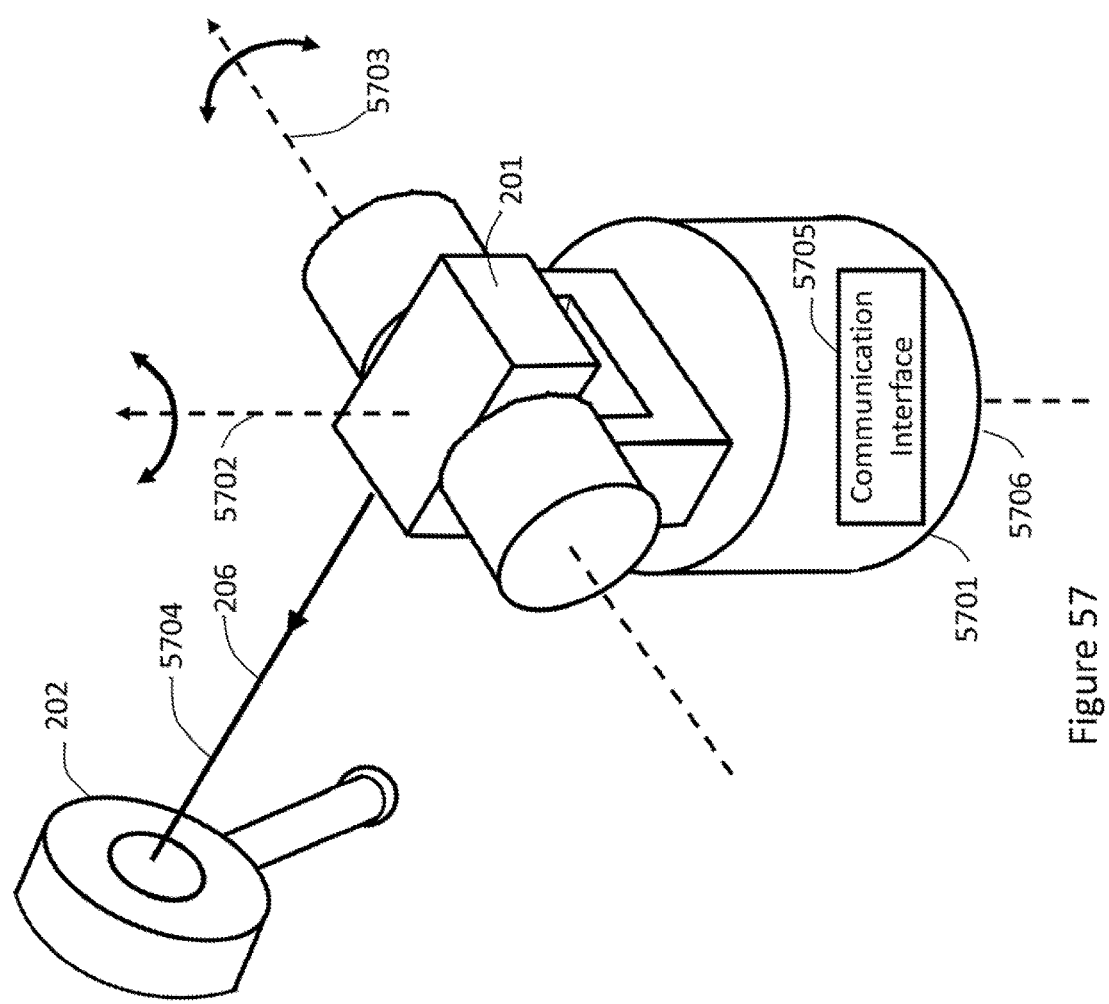
FIG. 57 shows an exemplary beam pointing device.

FIG. 57 shows an exemplary beam pointing device 5701 such as a laser tracker 5706 and light receiver 202. The laser tracker axis of rotation 5702 and laser tracker axis of rotation 5703 transmits a directed beam of light 5704 toward the light receiver 202. A beam pointer device communication interface 5705 is able to combine information about the direction the beam is pointed with measurement data from the light probe to calculate a measurement with six degrees of freedom.

Figure 58:
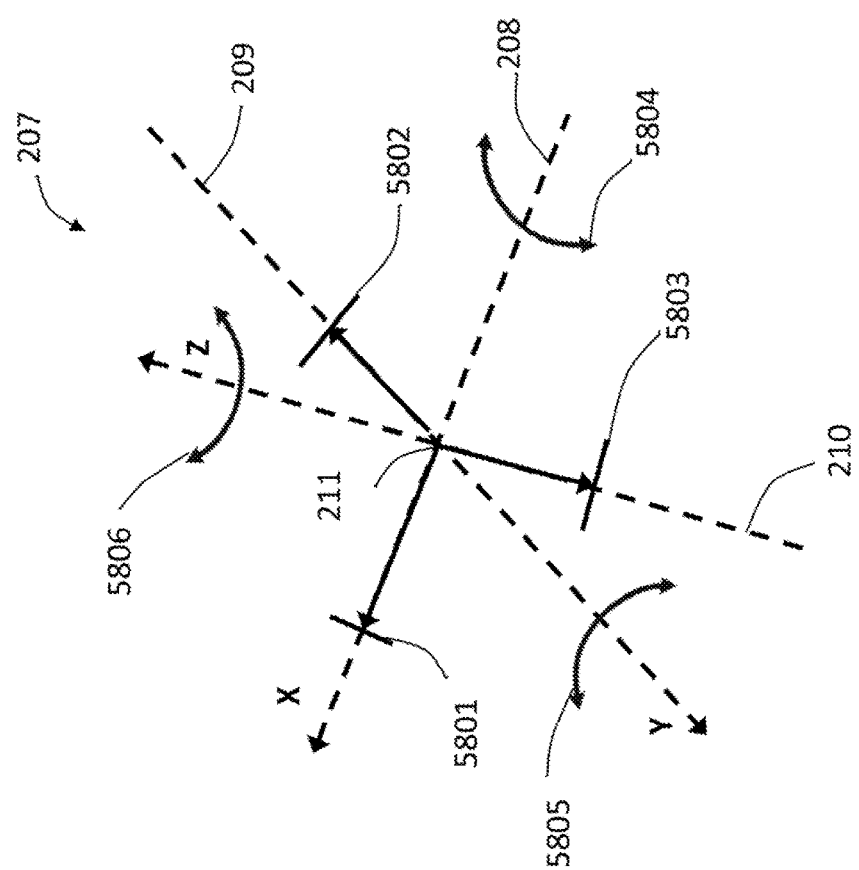
FIG. 58 shows an exemplary reference coordinate system.

FIG. 58 shows an exemplary reference coordinate system 207 with a radial measurement axis 208, transverse measurement axis 209, and a transverse measurement axis 210. All 3 axes are mutually perpendicular and intersect at the measurement origin 211. Measurements in this coordinate system consist of a distance from the measurement origin along radial measurement axis 5801, which may also be referred to as DX, distance from measurement origin along transverse measurement axis 5802, which may be referred to as DY, distance from measurement origin along transverse measurement axis 5803, which may also be referred to az DZ, rotation about radial measurement axis 5804, which may be referred to as RX, rotation about transverse measurement axis 5805, which may be referred to as RY, and rotation about transverse measurement axis 5806, which may be referred to as RZ.

Figure 59:
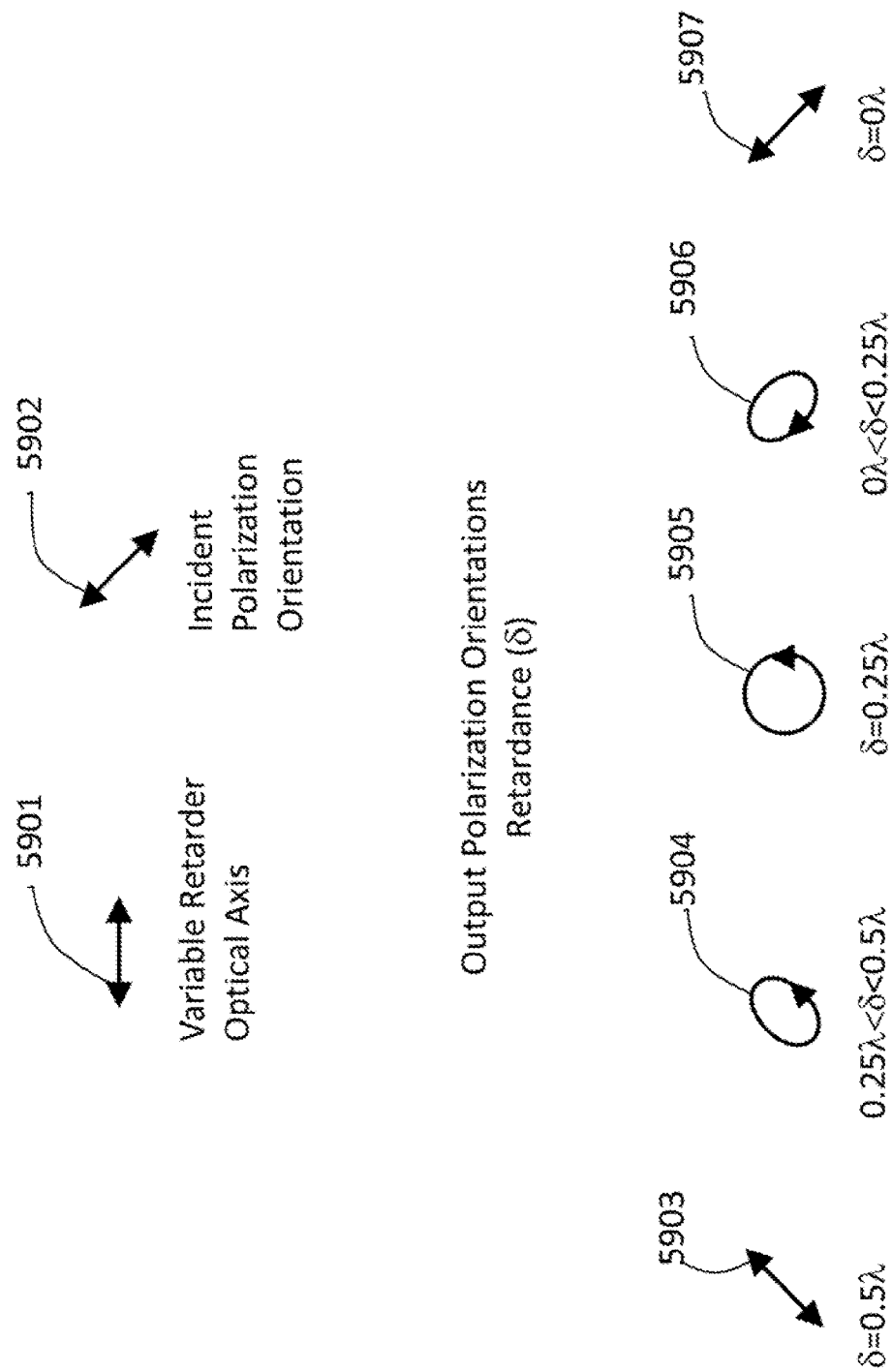
FIG. 59 shows an exemplary polarization modulation.

FIG. 59 shows an exemplary polarization modulation. The variable retarder optical axis 5901 is horizontal while the incident polarization orientation 5902 is rotated 45 degrees. The output polarization is the based on the retardance ($\delta$) of the variable retarder. When $\delta$ is 0.5 wave, the output is linear polarization rotated 90 degrees 5903. When $\delta$ is greater than 0.25 waves but less than 0.5 waves, the output is counter clockwise elliptical polarization 5904. When $\delta$ is equal to 0.25 waves, the output is counter clockwise circular polarization 5905. When $\delta$ is greater than 0 waves but less than 0.25 waves, the output is clockwise elliptical polarization 5906. When $\delta$ is equal to 0 waves, the output is linear polarization that is not rotated 5907. The various polarization states will pass through a linear polarizer with different intensities based on the orientation of the polarizer. This property is what is used to determine the orientation of the light source rotated about the radial measurement axis.

Figure 60A:
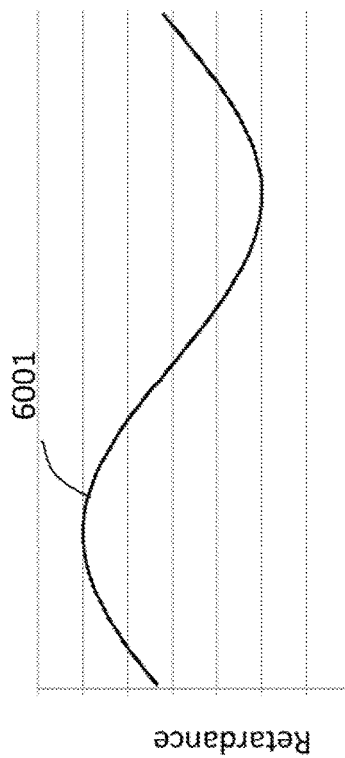
FIG. 60A shows an exemplary retardance modulation signal.

FIG. 60A shows an exemplary retardance modulation signal. Often a voltage is varied to modify the retardance of the variable retarder. Varying the voltage at a single frequency would produce a retardance modulated at a single frequency 6001.

Figure 60B:
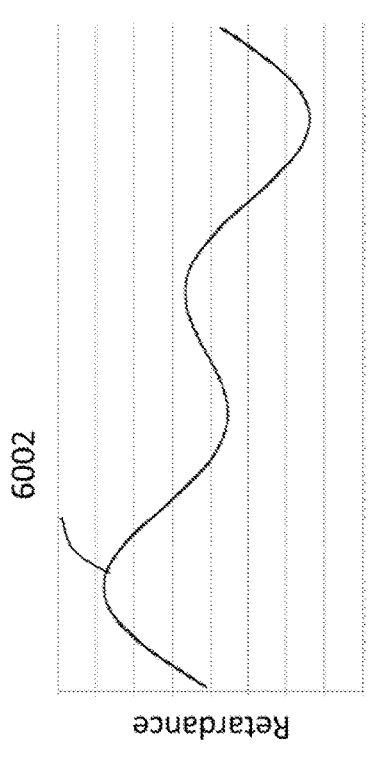
FIG. 60B shows an exemplary retardance modulation signal

FIG. 60B shows an exemplary retardance modulation signal. Often a voltage is varied to modify the retardance of the variable retarder. Varying the voltage at with two mixed frequencies of equal amplitude would produce a retardance modulated at two frequencies 6002.

FIG. 61A shows an exemplary intensity as measured at a photo sensor when the difference in angles between the linear polarizer in the receiver and the linear polarized light indecent on the variable retarder is greater than 45 degrees 6101. Variable retarder is modulated at a single frequency.

FIG. 61B shows an exemplary stem plot of the magnitudes of interest 6102, which is based on the signal in FIG. 61A. The magnitude for the frequency of interest 6103 is shown.

FIG. 61C shows an exemplary stem plot of the phases of interest 6104, which is based on the signal in FIG. 61A. The phase for the frequency of interest 6015 is shown.

FIG. 62A shows an exemplary intensity as measured at a photo sensor 6201 that is inverted from the signal shown in 61A. This inversion may be due to the difference in angles between the linear polarizer in the receiver and the linear polarized light indecent on the variable retarder is less than 45 degrees or it may be due to the start of the first sample has shifted by ½ of the modulation period. Variable retarder is modulated at a single frequency.

FIG. 62B shows an exemplary stem plot of the magnitudes of interest 6102, which is based on the signal in FIG. 62A. The magnitude for the frequency of interest 6202 is shown. Note that the plot in FIG. 61B is identical.

FIG. 62C shows an exemplary stem plot of the phases of interest 6104, which is based on the signal in FIG. 62A. The phase for the frequency of interest 6203 is shown. Note that the phase is negative as opposed to what is shown in FIG. 61C.

Figures 63A, 63B:
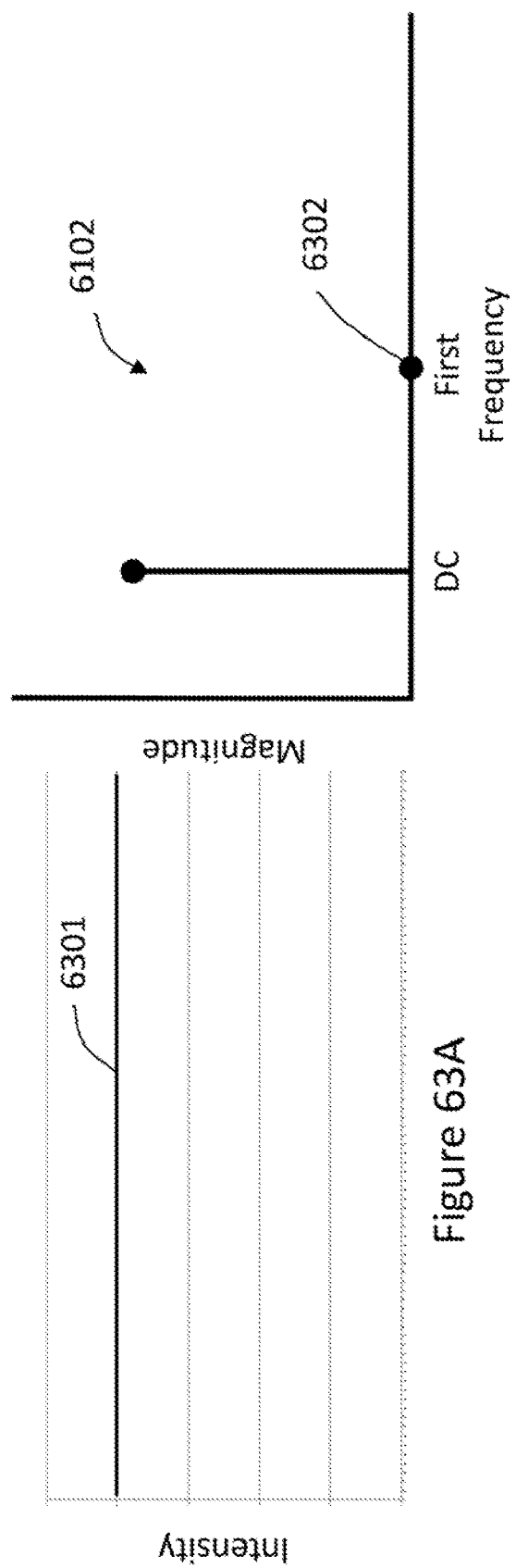
FIG. 63A shows an exemplary plot of intensity data.
FIG. 63B shows an exemplary stem plot of the magnitudes of interest

FIG. 63a shows an exemplary plot of intensity data as measured at a photo sensor when the difference in angles between the linear polarizer in the receiver and the linear polarized light indecent on the variable retarder is equal to 45 degrees 6301. Variable retarder is modulated at a single frequency.

FIG. 63B shows an exemplary stem plot of the magnitudes of interest 6102, which is based on the signal in FIG. 63A. The magnitude for the frequency of interest 6302 is shown. The magnitude is now 0 meaning that the phase calculation of this bin is now irrelevant.

FIG. 64A shows an exemplary plot of intensity data as measured at a photo sensor when the difference in angles between the linear polarizer in the receiver and the linear polarized light indecent on the variable retarder is greater than 45 degrees 6401. Variable retarder is modulated at two frequencies.

FIG. 64B shows an exemplary stem plot of the magnitudes of interest 6102, which is based on the signal in FIG. 64A. The first magnitude for the frequency of interest 6402 and the second magnitude for the frequency of interest 6403 are shown. The magnitudes are both positive.

FIG. 64C shows an exemplary stem plot of the phases of interest 6104, which is based on the signal in FIG. 64A. The phase for the first frequency of interest 6404 and the phase for the second frequency of interest 6405 are shown. The phases are both positive.

Figure 65A:
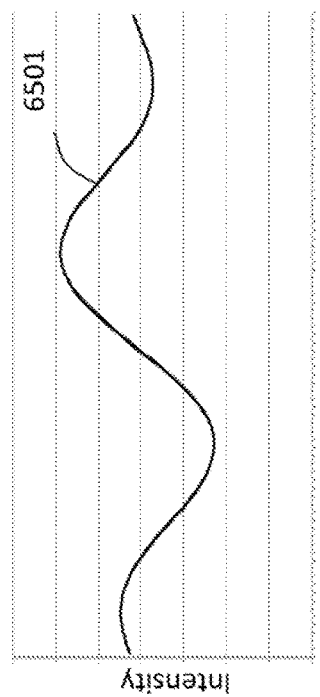
FIG. 65A shows an exemplary plot of intensity data.

FIG. 65A shows an exemplary plot of intensity data as measured at a photo sensor when the difference in angles between the linear polarizer in the receiver and the linear polarized light indecent on the variable retarder is greater than 45 degrees 6501. Variable retarder is modulated at two frequencies. The signal is equivalent to that shown in FIG. 64a except the first sample is shifted in time by ½ period of the lowest frequency.

Figure 65B:
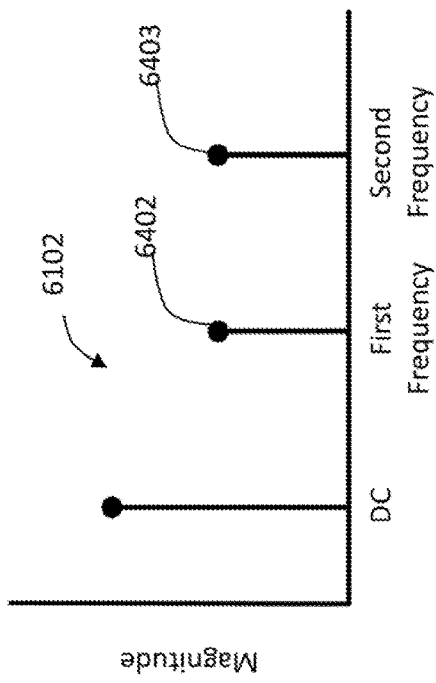
FIG. 65B shows an exemplary stem plot of the magnitudes of interest.

FIG. 65B shows an exemplary stem plot of the magnitudes of interest 6102, which is based on the signal in FIG. 65A. The first magnitude for the frequency of interest 6402 and the second magnitude for the frequency of interest 6403 are shown. The magnitudes are both positive and identical to those shown in FIG. 64B.

Figure 65C:
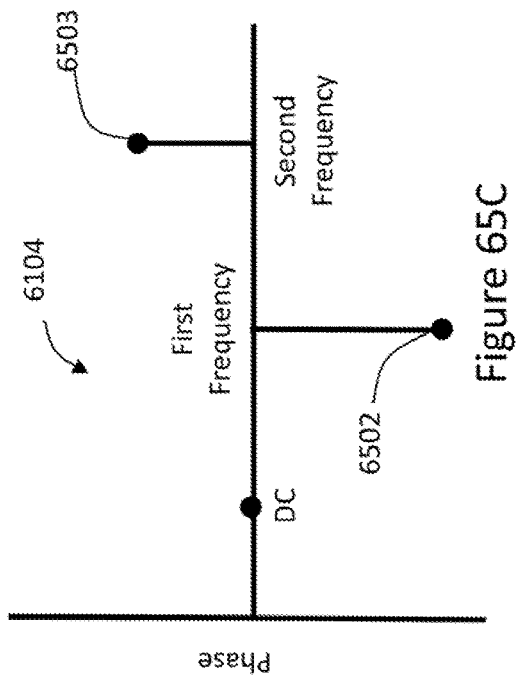
FIG. 65C shows an exemplary stem plot of the phases of interest.

FIG. 65C shows an exemplary stem plot of the phases of interest 6104, which is based on the signal in FIG. 65A. The phase for the first frequency of interest 6502 and the phase for the second frequency of interest 6503 are shown. Notice that the phase of the first frequency of interest is negative but the phase of the second frequency of interests is still positive.

Figure 66A:
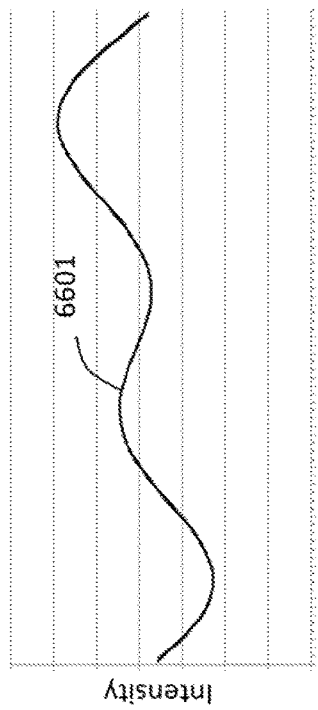
FIG. 66A shows an exemplary plot of intensity data.

FIG. 66A shows an exemplary plot of intensity data as measured at a photo sensor when the difference in angles between the linear polarizer in the receiver and the linear polarized light indecent on the variable retarder is less than 45 degrees 6601. Variable retarder is modulated at two frequencies. Notice that this signal is inverted with respect to the signal shown in 64A.

Figure 66B:
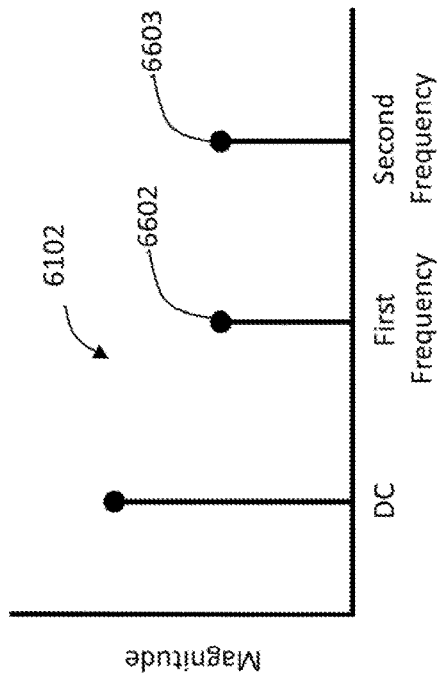
FIG. 66B shows an exemplary stem plot of the magnitudes of interest.

FIG. 66B shows an exemplary stem plot of the magnitudes of interest 6102, which is based on the signal in FIG. 66A. The magnitudes for the first frequency of interest 6602 and the second frequency of interest 6603 are shown. The magnitudes are both positive and identical to those shown in FIG. 64B.

Figure 66C:
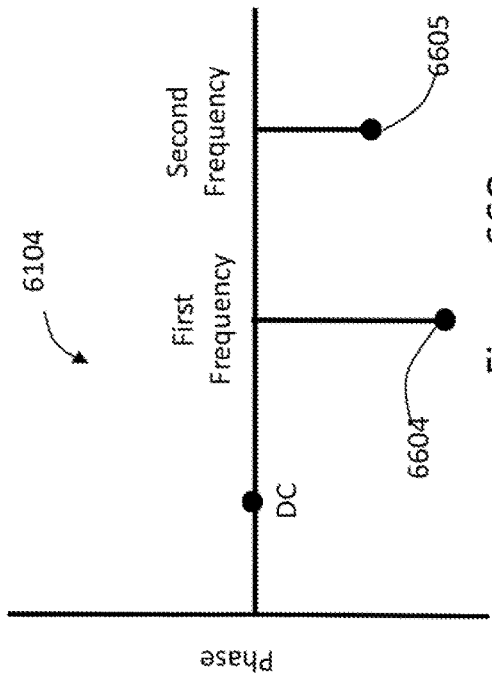
FIG. 66C shows an exemplary stem plot of the phases of interest.

FIG. 66C shows an exemplary stem plot of the phases of interest 6104, which is based on the signal in FIG. 66A. The phase for the first frequency of interest 6604 and the phase for the second frequency of interest 6605 are shown. Notice that both phases are negative. Since the phases in FIG. 66C are different from those in FIG. 65C, it demonstrates the ability to differentiate between an inverted signal and one shifted in time.

Figure 67B:
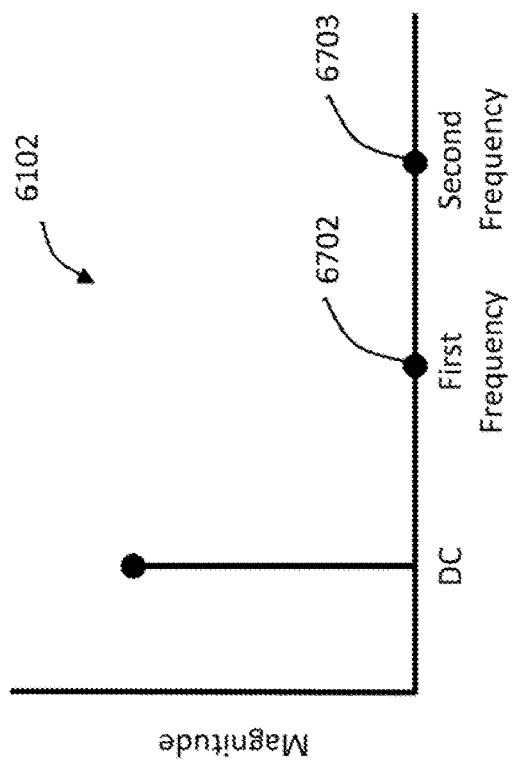
FIG. 67B shows the magnitude of the first frequency of interest.
Figure 67A:
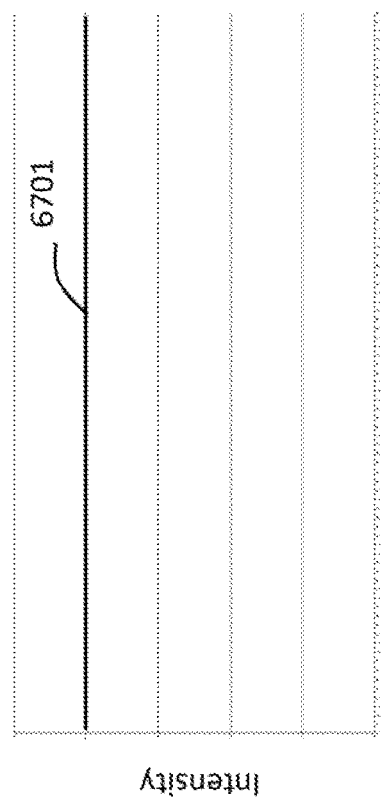
FIG. 67A shows an exemplary plot of intensity data as measured at a photo sensor.

FIG. 67A shows an exemplary plot of intensity data as measured at a photo sensor when the difference in angles between the linear polarizer in the receiver and the linear polarized light indecent on the variable retarder is equal to 45 degrees 6701. Variable retarder is modulated at to frequencies.

FIG. 67B shows the magnitude of the first frequency of interest 6702 and the second frequency of interest 6703 calculated from the measured intensity.

Figure 68A:
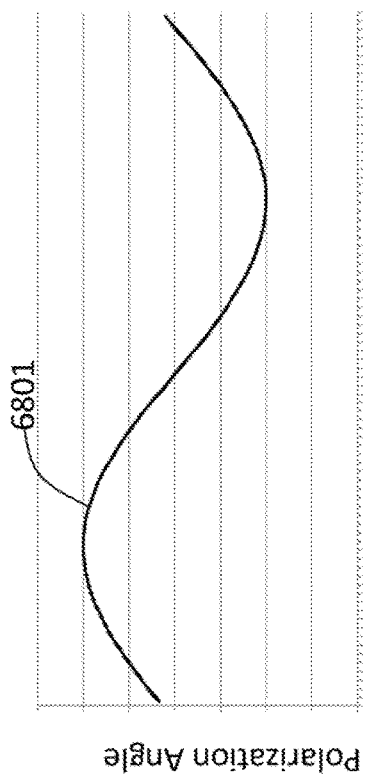
FIG. 68A shows the linear polarization modulated at a single frequency.

FIG. 68A shows the linear polarization modulated at a single frequency 6801.

Figure 68B:
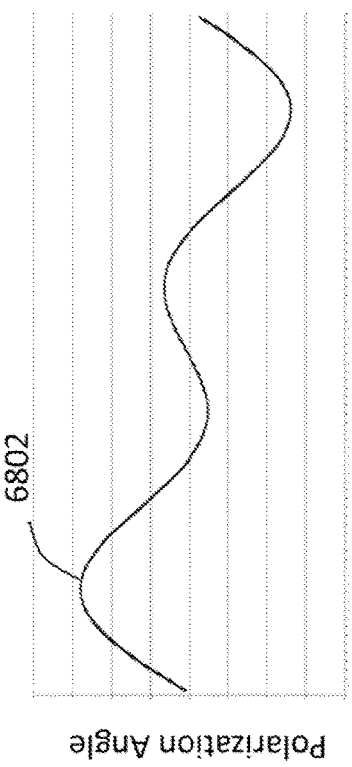
FIG. 68B shows the linear polarization modulated at a two mixed frequencies.

FIG. 68B shows the linear polarization modulated at a two mixed frequencies 6802.

FIG. 69A shows an exemplary plot of intensity data as measured at a photo sensor with a given orientation of the linear polarizer with respect to the linear polarization from the light transmitter 6901. Polarization is modulated at a single frequency.

FIG. 69B shows an exemplary stem plot of the phases of interest 6104, which is based on FIG. 69A. The phase of the frequency of interest 6902 is shown.

FIG. 70A shows an exemplary plot of intensity data as measured at a photo sensor with a given orientation of the linear polarizer with respect to the linear polarization from the light transmitter 6901. Polarization is modulated at a single frequency and the orientation is at a different angle.

FIG. 70B shows an exemplary stem plot of the phases of interest 6104, which is based on FIG. 70A. The phase of the frequency of interest 7002 is shown. Note that the calculated phase is different from that as shown in FIG. 69B.

FIG. 71A shows an exemplary plot of intensity data as measured at a photo sensor with a given orientation of the linear polarizer with respect to the linear polarization from the light transmitter 7101. Polarization is modulated at two mixed frequencies.

FIG. 71B shows an exemplary stem plot of the phases of interest 6104, which is based on FIG. 71A. The phase of the first frequency of interest 7102 is shown and the phase of the second frequency of interest 7103 is shown.

FIG. 72A shows an exemplary plot of intensity data as measured at a photo sensor with a given orientation of the linear polarizer with respect to the linear polarization from the light transmitter 7201. Polarization is modulated at two mixed frequencies and that the orientation is at a different angle.

FIG. 72B shows an exemplary stem plot of the phases of interest 6104, which is based on FIG. 72A. The phase of the first frequency of interest 7202 is shown and the phase of the second frequency of interest 7203 is shown. Note that the phases are different than shown in FIG. 71B.

Figure 73:
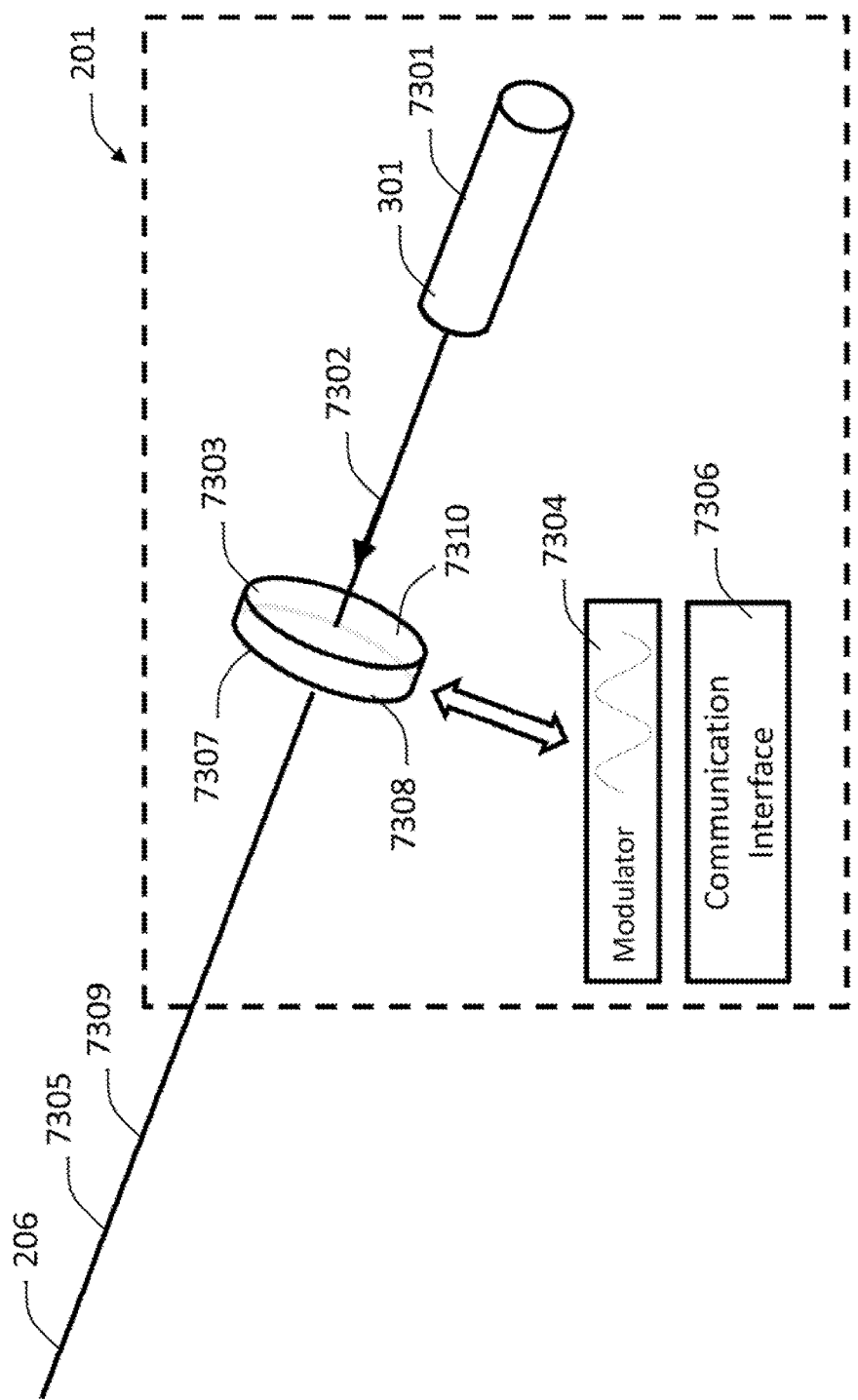
FIG. 73 shows an exemplary light source with modulated polarization states.

FIG. 73 shows an exemplary light source with modulated polarization states. A light source emitting linear polarized light 7301 emits a beam with linear polarization 7302 that is rotated 45 degrees with respect to the optical axis of a polarization varying optic 7310, which is a variable retarder 7303. Modulator electronics 7304 modulate the polarization state with a variable retarder 7303 such that a polarization modulated beam 7305 is emitted. The beam may be a polarization state modulated beam 7309. The variable retarder 7303 can be a liquid crystal variable retarder 7307 or a Pockels Cell 7308. Communication interface 7306 allows the modulation to be controlled from an external computer.

Figure 74:
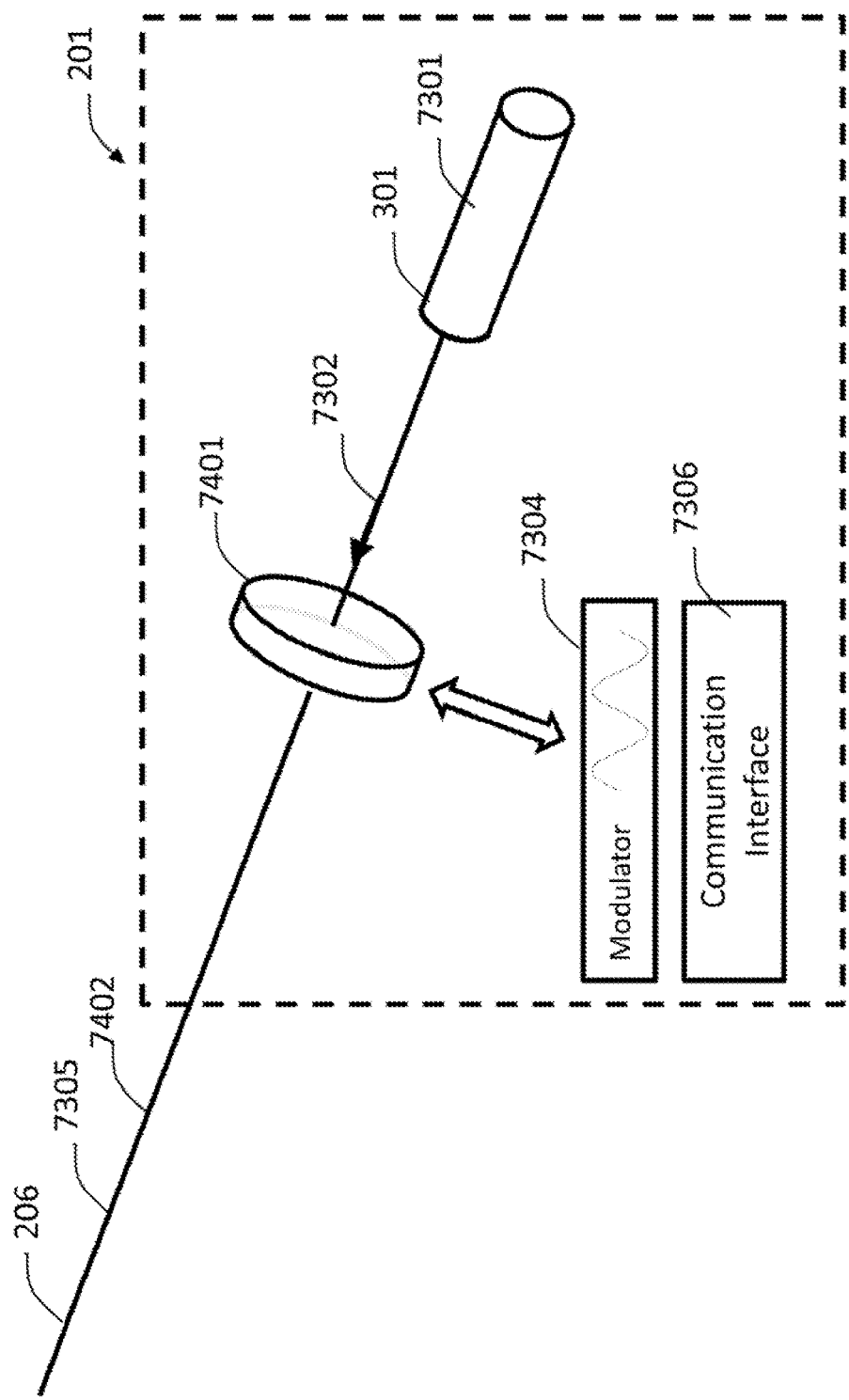
FIG. 74 shows an exemplary light source with modulated polarization rotation.

FIG. 74 shows an exemplary light source with modulated polarization rotation. A light source emitting linear polarized light 7301 emits a beam with linear polarization 7302. Modulator electronics 7304 modulate the polarization rotation with a variable polarization rotator 7401 such that a modulated linear polarization beam 7402 is emitted.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Definitions

The following definitions are provided for clarity of terms used herein.

Motor: An electro-mechanical device capable of changing the physical position of an object.

Rotary Motor: A motor that rotates an object around an axis.

Linear Motor: A motor that translates an object along an axis.

Optics, as used herein, refers to components that change a property of light including, but not limited to, direction, phase, polarity, intensity and splits and/or combines a beam of light. An optic may comprise one or a plurality of individual optical components.

Axis of Propagation: The primary axis of travel of a light beam

Polarization Optic: An optic that modifies an input light to an output light of a certain polarization. This includes but is not limited to: Modifying a non-polarized input light to a polarized output light, modifying a polarized input light to a non-polarized output light, rotating the orientation of a linear polarized input light, converting a linear polarized input light to a circular polarized output light, and converting a circular polarized output light to a linear polarized input light.

Linear Polarizing Optic: A polarization optic that will take a input light and transmit or reflect light of a specific linear polarization. These include but are not limited to linear film, wire grid, beam splitter, Glan-Taylor, Glan-Thompson, beam displacer, and Brewster Window type polarizing optics.

Retarder A polarization optic that slows one polarization component with respect to its orthogonal component in order to change polarization. These can perform actions such as converting an input linear polarization to an output circular polarization, converting an input circular polarization to an output linear polarization, rotating a input linear polarization to an output linear polarization of a different orientation, converting the handedness of a circular polarized input light to the opposite handedness in the output light. The action performed is defined by the configured retardation of the optic.

Wave Plate: A retarder.

Polarization Modulatio: Varying the polarization of a light over time. This includes but is not limited to varying the type of polarization (linear S, elliptical, left-handed circular, right-handed circular, linear P), which can be accomplished with devices such as a variable retarder. Another type of modulation would be to rotate the plane of linear polarization, which can be accomplished by such methods as rotating a linear polarizing optic.

Rotation about the beam: The axis of rotation of the object is not perpendicular to the direction of propagation of the light.

Beam of light: Light that has a defined direction of travel. The light beam may expand or shrink over the range in which it travels. A beam of light may be a virtual beam in that it has no intensity but has a defined direction of travel such as the output of a filter that absorbs the input intensity.

Photo sensor: A device that converts light energy to electrical signals. The electrical signals may represent the intensity of the light and/or position of the light on the detector. A photo sensor may contain one or more light sensing areas that each convert light to electrical signals.

Signal: defined as electrical or digitized.

Processor: Includes circuitry to process signals and ability to run programs (analog and digital)

Position sensing device: A specific type of photo sensor that provides intensity and position information. It may consist of one or more sensing areas.

Data: A collection of signals and/or digitized values.

Wire: A physical device for transporting information between two components. The medium can be electrical based such as copper or may be optical based such as fiber optics.

Indicator light: A light source intended to communicate information to a user. Information is communicated in several ways including but not limited to the following: light on, light off, blinking, rate of blinking, pattern of blinking, color, or intensity.

Button: A device requiring some type of physical contact to actuate.

Display: A device intended to communicate information through words, numbers, pictures, or symbols.

Wireless communication: Data communicated through free space via electromagnetic signals.

Optical communication: Data communicated through free space of fiber optics using any property of light including but not limited to the following: intensity, frequency, or polarization.

Splitter: An optic that splits a beam into two or more individual light beams.

Isolator: An optic component that allows light to pass through in only one direction.

Opto-electronic component: A component that converts a component of light into an electrical signal, including intensity, for example.

Polarization varying optic: A polarizing optic that changes its polarization properties based on an electrical input. The polarization property can be an amount of retardation or the rotation of linear polarization.

Variable polarization rotator: A polarization varying optic that rotates the plane of polarization.

Variable Retarder A polarization varying optic retarder that can change the amount of retardation and therefore vary the polarization of the output beam. Examples include a Soleil-Babinet Compensator, Pockels Cells, and Liquid Crystal Variable retarders.

Photodiode: An opto-electronic device that converts light intensity to an electrical signal.

The phrase, "from source": A beam that is emitted from the light source that may or may not be modified by any upstream optics and will ultimately be directed to a measure target.

The phrase, "to source": A beam that is has been reflected and will travel back to the source if not obstructed.

The phrase, "from target": A beam that has been reflected back from a measured target, which may or may not pass through optics before traveling back to the source.

The phrase, "to target": A beam that may or may not pass through optics before traveling to a measured target.

A processor coupled to said digitizing electronics feature and said single measurement light producing device may be coupled in any suitable way whereby data from the digitizing electronic feature may be received by the processor and said processor can control the single measurement light, such as by instructing a change of frequency of light.

Digitizing electronic feature: A device that converts an electrical signal into a value, such as a numerical value.

Single outgoing light beam: A beam of light produced by the single measurement light producing device that travels to a moveable reflective target and may pass through one or more optical components. An outgoing frequency measurement device may be configured in the path of the single outgoing light beam to measure the frequency of the beam. An outgoing frequency measurement device may be configured before or after the primary beam splitter.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

REFERENCES

The reference listed below are herein incorporated by reference in their entirety:

U.S. Pat. No. 4,790,651 Tracking Laser Interferometer, Brown et al.;
U.S. Pat. No. 4,714,339 Three and Five Axis Laser Tracking Systems, Lau, et al.;
U.S. Pat. No. 5,305,091 Optical Coordinate Measuring System for Large Objects, Gelbart et al.;
U.S. Pat. No. 5,530,549 Probing Retroreflectors and Methods of Measuring Surfaces Therewith, Brown;
U.S. Pat. No. 6,049,377 Five-Axis/Six-Axis Laser Measuring System, Lau, et al.;
U.S. Pat. No. 6,675,122 Indirect Position Determination with the Aid of A Tracker;
U.S. Pat. No. 7,230,689 Multi-Dimensional Measuring System, Lau;
U.S. Pat. No. 7,312,862 Measurement System for Determining Six Degrees of Freedom of an Object;
U.S. Pat. No. 7,576,836 Camera Based Six Degree-of-Freedom Target Measuring and Target Tracking Device, Bridges;
U.S. Pat. No. 8,670,114 Device and Method for Measuring Six Degrees of Freedom, Bridges, et al.;
U.S. Pat. No. 8,773,667 Sphere Bar Probe, Edmonds, et al.
European Patent 0880674 A System for Point-By-Point Measuring of Spatial Coordinates, Pettersen;
U.S. patent application Ser. No. 14/494,862, to John M Hoffer Jr., filed on Sep. 24, 2014 and entitled Position Measurement Device;
U.S. patent application Ser. No. 14/494,878, to John M Hoffer Jr., filed on Sep. 24, 2014 and entitled Multi-Mode Frequency Sweeping Interferometer and Method of Using Same; and
U.S. provisional patent application No. 61/881,560, to John M Hoffer Jr., filed on Sep. 24, 2013 and entitled Multi-Mode Frequency Sweeping Interferometer and Method of Using Same.

What is claimed is:
1. A position measurement device comprising:
   a) a light transmitter comprising:
      i) a first light source that transmits a beam of light, which is a polarized beam of light;
   b) a light receiver comprising:
      i) an aperture for receiving light;
      ii) a rotating polarizing optical platform comprising:
         1) a polarizing optic;
         2) a polarization platform rotation measurement device; and
         3) a polarization platform motor;
         wherein said polarizing optic, said polarization platform rotation measurement device and said polarization platform motor are coupled such that said polarization platform motor rotates said polarizing optic nominally around a polarizing optical axis of rotation;
         whereby said polarization platform rotation measurement device provides feedback on a measured rotation position for said polarization platform rotation measurement device, which is a polarization rotation measurement angle;
      iii) a reference coordinate system comprising:
         1) a first radial measurement axis defined with respect to said polarizing optical axis of rotation;
         2) a first transverse measurement axis that intersects and is perpendicular to said first radial measurement axis;

3) a second transverse measurement axis that intersects with and is perpendicular to both said first transverse measurement axis and said first radial measurement axis; and
4) a defined first measurement origin where said first radial measurement axis, said first transverse measurement axis, and said second transverse axis intersect;
iv) a first measurement photo sensor, which is a first measurement position sensing device comprising:
1) a first measurement intensity signal; and
2) a first measurement position signal;
v) a processor comprising:
1) a beam intensity calculation algorithm comprising:
a. a measurement intensity input; and
b. a polarization intensity output;
2) a beam position calculation algorithm comprising:
a. a measure beam position data input; and
b. a measure beam position output;
3) a polarization control algorithm comprising:
a. a polarization control reference;
b. a polarization beam intensity feedback; and
c. a polarization motor output signal;
4) a device position calculation algorithm comprising:
a. a polarization rotation measurement input;
b. a beam position input; and
c. a position output comprising a measurement selected from the group consisting of:
i. distance from said first measurement origin along said first radial measurement axis;
ii. distance from said first measurement origin along said first transverse measurement axis;
iii. distance from said first measurement origin along said second transverse measurement axis;
iv. rotation about said radial measurement axis;
v. rotation about said first transverse measurement axis; and
vi. rotation about said second transverse measurement axis;
vi) a communication interface;
wherein said polarized beam of light impinges on said polarizing optic which will transmit a first measurement beam of an intensity that is a function of said polarization rotation measurement angle;
wherein said first measurement beam impinges on said first measurement position sensing device producing said first measurement intensity signal and said first measurement position signal;
wherein said first measurement intensity signal is coupled to said measurement intensity input whereby said beam intensity calculation algorithm produces said polarization intensity output;
wherein said polarization intensity output is coupled to said polarization beam intensity feedback, which is coupled to said polarization control reference, whereby said polarization control algorithm generate said polarization motor output signal
wherein said polarization motor output signal is coupled to a motor input data of said polarization platform motor thus rotating said polarizing optic thereby changing the relationship of said polarizing optic to said polarized beam of light;
wherein said polarization platform rotation measurement device produces a first rotation signal that corresponds to the position of said polarizing optic; and wherein said first rotation signal is coupled to said polarization rotation measurement input and said first measurement position signal is coupled to said beam position input whereby said device position calculation algorithm generates said position output.

2. The position measurement device of claim 1, wherein said polarized beam of light is a linear polarized beam.

3. The position measurement device of claim 2, wherein said polarizing optic is a linear polarizer.

4. The position measurement device of claim 2, wherein said polarizing optic is a polarizing beam splitter.

5. The position measurement device of claim 1, wherein said first light source is a laser.

6. The position measurement device of claim 1, further comprising
a) a non-polarizing beam splitter
b) an input beam reference sensor, which is a photo sensor
wherein said non-polarizing beam splitter is positioned before the said polarizing optic such that said polarized beam of light first impinges on said non-polarizing beam splitter thus transmitting a portion of said polarized beam of light as an input reference beam to said input beam reference sensor;
whereby said input reference beam impinges on said input beam reference sensor creates a corresponding reference intensity signal;
wherein said beam intensity calculation algorithm further comprises a reference intensity input;
wherein said corresponding reference intensity signal is coupled with said reference intensity input; and
whereby said beam intensity calculation algorithm applies said reference intensity input to said polarization intensity output.

7. The invention of claim 6, where said input beam reference sensor is a reference position sensing device;
wherein said input beam reference sensor produces a reference position data;
wherein said beam position calculation algorithm further comprises
a) a reference beam position data input;
b) a reference beam position output;
wherein said reference position data is coupled with said reference beam position data input;
wherein said device position calculation algorithm further comprises a reference beam position input;
wherein said reference beam position output is coupled to said reference beam position input whereby said device position calculation algorithm applies said reference beam position input to said position output.

8. The invention of claim 1, wherein said light receiver further comprises:
a) a non-polarizing beam splitter; and
b) a reflector;
wherein said non-polarizing beam splitter is positioned before the said polarizing optic such that said polarized beam of light first impinges on said non-polarizing beam splitter thus transmitting a portion of said polarized beam of light to said reflector as an initial tracking beam;
wherein said reflector is configured to reflect said initial tracking beam back toward the source through said beam splitter as a reflected tracking beam.

9. The invention of claim 8, where said non-polarizing beam splitter is a first dichroic beam splitter and said light transmitter further comprises a second dichroic beam splitter that combines a second light beam from a second light source with said first light source whereby said reflected tracking beam was emitted from said second light source.

10. The invention of claim 4, where said polarizing beam splitter is coupled with a second measurement photo sensor;
   wherein said linear polarized beam impinges on said polarizing beam splitter and a portion of said linear polarized beam is transmitted as said first measurement beam and another portion is reflected as a second measurement beam based on said polarization rotation measurement angle;
   wherein said second measurement beam impinges said second measurement photo sensor creating a corresponding second measurement intensity signal;
   wherein said beam intensity calculation algorithm further comprises a second measurement intensity input;
   wherein said second measurement intensity signal is coupled with said second measurement intensity input; and
   whereby said intensity calculation algorithm applies said second measurement intensity input to said polarization intensity output.

11. The invention of claim 10, wherein said second measurement photo sensor is a position sensing device comprising:
   a) a second measurement position signal;
   wherein said beam position calculation algorithm further comprises
   b) a second measurement beam position data input; and
   c) a second measure beam position output;
   wherein said second measurement position signal is coupled with said second measurement beam position data input;
   wherein said device position calculation algorithm further comprises a second measure beam position input; and
   wherein said second measurement beam output is coupled to said second measurement beam position data input whereby said device position calculation algorithm applies said second measurement beam input to said position output.

12. The invention of claim 1, wherein said light receiver further comprises:
   a) one or more beam steering platforms each comprising:
      i) a beam steering optic;
      ii) a beam steering position measurement device; and
      iii) a beam steering motor;
   b) wherein said processor further comprises a beam steering control algorithm comprising:
      i) a beam steering command;
      ii) a beam steering position feedback; and
      iii) a beam steering motor output signal;
   wherein said beam steering position feedback is coupled to said measure beam position output;
   wherein said beam steering motor output signal is coupled to motor input data of said beam steering motor;
   wherein said beam of light impinges on said beam steering optic emitting a light beam directed along an output path;
   wherein said device position calculation algorithm further comprises a beam steering position input;
   wherein said beam steering position measurement device is coupled to said beam steering position input;
   wherein said beam steering control algorithm drives said beam steering motor to control the orientation of direct said light beam directed along an output path toward said polarizing optic; and
   wherein said beam steering position measurement device is coupled to said beam steering position input whereby said device position calculation algorithm applies said beam steering position input to said position output.

13. The invention of claim 1, wherein the light receiver further comprises
   a) one or more temperature sensors that measure the temperature of components in said receiver whereby said temperature sensors produce one or more temperature signals; and
   b) wherein said process further comprising a temperature compensation algorithm comprising:
      i) a temperature measurement input; and
      ii) a temperature compensation output
   wherein said temperature signals are coupled with said temperature measurement input whereby said temperature compensation algorithm produces said temperature compensation output;
   wherein said device position calculation algorithm further comprises a temperature compensation input;
   wherein said temperature compensation output is coupled to said temperature compensation input; and
   whereby said device position calculation algorithm includes said temperature compensation input to calculate said beam position output.

14. The invention of claim 1, wherein said device position calculation algorithm further comprises coordinate transformation function whereby said position output in said reference coordinate system can be transformed to another coordinate system.

15. The invention of claim 1, wherein said light transmitter is coupled with a beam pointing device comprising one or more degrees from freedom whereby said beam pointing device can direct said beam of light along a beam path.

16. The invention of claim 15, wherein said beam pointing device further comprises a beam pointing device communication interface wherein said beam pointing device communication interface is coupled with said communication interface in said light receiver whereby said beam pointer device receivers said position output and directs beam along said beam path.

17. The invention of claim 16, wherein said beam pointing device is a laser tracker.

18. The invention of claim 12, wherein said beam steering optic is a reflective optic.

19. The invention of claim 12, wherein said beam steering optic is a refractive optic.

20. The invention of claim 19, wherein said refractive optic is a wedge prism.

21. The invention of claim 1, wherein said light transmitter further comprises:
   a) said light source, which is a light source emitting linear polarized light
   b) a polarization varying optic; and
   c) a modulator that provides one or more electrical signals to the polarization varying optic;
   wherein said electrical signals from said modulator are couple with said polarization varying optic;
   wherein said light source emitting linear polarized light emits a beam with linear polarization;
   wherein said beam with linear polarization impinges on said polarization varying optic;
   wherein said polarization varying optic emits a polarization modulated beam.

22. The position measurement device of claim 21, wherein said polarization varying optic is a liquid crystal variable retarder.

23. The position measurement device of claim 21, wherein said polarization varying optic is a Pockels Cell.

24. The position measurement device of claim 21, wherein said polarization varying optic is a variable polarization rotator.

25. A position measurement device comprising:
a) a light transmitter comprising:
  i) a first light source, which is a light source emitting linear polarized light beam of light wherein said first light source is a laser;
  ii) a polarization varying optic; and
  iii) a modulator that provides one or more electrical signals to the polarization varying optic;
  wherein said electrical signals from said modulator are couple with said polarization varying optic;
  wherein said light source emitting linear polarized light emits a beam with linear polarization;
  wherein said beam with linear polarization impinges on said polarization varying optic; and
  wherein said polarization varying optic emits a polarization modulated beam;
b) a light receiver comprising:
  i) an aperture for receiving light;
  ii) a rotating polarizing optical platform comprising:
    1) a polarizing optic wherein said polarizing optic is a linear polarizer;
    2) a polarization platform rotation measurement device; and
    3) a polarization platform motor;
    wherein said polarizing optic, said polarization platform rotation measurement device and said polarization platform motor are coupled such that said polarization platform motor rotates said polarizing optic nominally around a polarizing optical axis of rotation;
    whereby said polarization platform rotation measurement device provides feedback on a measured rotation position for said polarization platform rotation measurement device, which is a polarization rotation measurement angle;
  iii) a reference coordinate system comprising:
    1) a first radial measurement axis defined with respect to said polarizing optical axis of rotation
    2) a first transverse measurement axis that intersects and is perpendicular to said first radial measurement axis
    3) a second transverse measurement axis that intersects with and is perpendicular to both said first transverse measurement axis and said first radial measurement axis; and
    4) a defined first measurement origin where said first radial measurement axis, said first transverse measurement axis, and said second transverse axis intersect
  iv) a first measurement photo sensor, which is a first measurement position sensing device comprising:
    1) a first measurement intensity signal; and
    2) a first measurement position signal;
  v) a processor comprising:
    1) a beam intensity calculation algorithm comprising:
      a. a measurement intensity input; and
      b. a polarization intensity output;
    2) a beam position calculation algorithm comprising:
      a. a measure beam position data input; and
      b. a measure beam position output;
    3) a polarization control algorithm comprising:
      a. a polarization control reference;
      b. a polarization beam intensity feedback; and
      c. a polarization motor output signal;
    4) a device position calculation algorithm comprising:
      a. a polarization rotation measurement input;
      b. a beam position input; and
      c. position output comprising of one or more of the following measurements:
        i. distance from said first measurement origin along said first radial measurement axis;
        ii. distance from said first measurement origin along said first transverse measurement axis;
        iii. distance from said first measurement origin along said second transverse measurement axis;
        iv. rotation about said radial measurement axis;
        v. rotation about said first transverse measurement axis; and
        vi. rotation about said second transverse measurement axis;
  vi) a communication interface;
  wherein said polarized beam of light impinges on said polarizing optic which will transmit a first measurement beam of an intensity that is a function of said polarization rotation measurement angle;
  wherein said first measurement beam impinges on said first measurement position sensing device producing said first measurement intensity signal and said first measurement position signal;
  wherein said first measurement intensity signal is coupled to said measurement intensity input whereby said beam intensity calculation algorithm produces said polarization intensity output;
  wherein said polarization intensity output is coupled to said polarization beam intensity feedback, which is coupled to said polarization control reference, whereby said polarization control algorithm generate said polarization motor output signal;
  wherein said polarization motor output signal is coupled to motor input data of said polarization platform motor thus rotating said polarizing optic thereby changing the relationship of said polarizing optic to said polarized beam of light;
  wherein said first polarization platform rotation measurement device produces a first rotation signal that corresponds to the position of said polarizing optic; and
  wherein said first rotation signal is coupled to said polarization rotation measurement input and said first measurement position signal is coupled to said beam position input whereby said device position calculation algorithm generates said position output.

26. A position measurement device comprising:
a) a light transmitter comprising:
  i) a first light source, which is a light source emitting linear polarized light beam of light wherein said first light source is a laser;
  ii) a polarization varying optic; and
  iii) a modulator that provides one or more electrical signals to the polarization varying optic;
  wherein said electrical signals from said modulator are couple with said polarization varying optic;
  wherein said light source emitting linear polarized light emits a beam with linear polarization;
  wherein said beam with linear polarization impinges on said polarization varying optic;

wherein said polarization varying optic emits a polarization modulated beam;
b) a light receiver comprising:
  i) an aperture for receiving light;
  ii) a rotating polarizing optical platform comprising:
    1) a polarizing optic wherein said polarizing optic is a linear polarizer;
    2) a polarization platform rotation measurement device; and
    3) a polarization platform motor;
    wherein said polarizing optic, said polarization platform rotation measurement device and said polarization platform motor are coupled such that said polarization platform motor rotates said polarizing optic nominally around a polarizing optical axis of rotation;
    wherein said polarization platform rotation measurement device provides feedback on a measured rotation position for said polarization platform rotation measurement device, which is a polarization rotation measurement angle;
  iii) a reference coordinate system comprising:
    1) a first radial measurement axis defined with respect to said polarizing optical axis of rotation;
    2) a first transverse measurement axis that intersects and is perpendicular to said first radial measurement axis;
    3) a second transverse measurement axis that intersects with and is perpendicular to both said first transverse measurement axis and said first radial measurement axis; and
    4) a defined first measurement origin where said first radial measurement axis, said first transverse measurement axis, and said second transverse axis intersect;
  iv) a first measurement photo sensor, which is a first measurement position sensing device comprising:
    1) a first measurement intensity signal; and
    2) a first measurement position signal;
  v) a processor comprising:
    1) a beam intensity calculation algorithm comprising:
      a. a measurement intensity input; and
      b. a polarization intensity output;
    2) a beam position calculation algorithm comprising:
      a. a measure beam position data input; and
      b. a measure beam position output;
    3) a polarization control algorithm comprising:
      a. a polarization control reference;
      b. a polarization beam intensity feedback; and
      c. a polarization motor output signal;
    4) a device position calculation algorithm comprising:
      a. a polarization rotation measurement input;
      b. a beam position input;
      c. position output comprising of one or more of the following measurements:
        i. distance from said first measurement origin along said first radial measurement axis;
        ii. distance from said first measurement origin along said first transverse measurement axis;
        iii. distance from said first measurement origin along said second transverse measurement axis;
        iv. rotation about said radial measurement axis;
        v. rotation about said first transverse measurement axis; and
        vi. rotation about said second transverse measurement axis;
  vi) a communication interface;
  vii) one or more beam steering platforms each comprising:
    1) a beam steering optic;
    2) a beam steering position measurement device; and
    3) a beam steering motor;
  viii) wherein said processor further comprises a beam steering control algorithm comprising:
    1) a beam steering command;
    2) a beam steering position feedback; and
    3) a beam steering motor output signal;
    wherein said beam steering position feedback is coupled to said measure beam position output;
    wherein said beam steering motor output signal is coupled to motor input data of said beam steering motor;
    wherein said beam of light impinges on said beam steering optic emitting a light beam directed along an output path;
    wherein said device position calculation algorithm further comprises a beam steering position input;
    wherein said beam steering position measurement device is coupled to said beam steering position input;
    wherein said beam steering control algorithm drives said beam steering motor to control the orientation of direct said light beam directed along an output path toward said polarizing optic;
    wherein said beam steering position measurement device is coupled to said beam steering position input whereby said device position calculation algorithm applies said beam steering position input to said position output;
  wherein said polarized beam of light impinges on said polarizing optic which will transmit a first measurement beam of an intensity that is a function of said polarization rotation measurement angle;
  wherein said first measurement beam impinges on said first measurement position sensing device producing said first measurement intensity signal and said first measurement position signal;
  wherein said first measurement intensity signal is coupled to said measurement intensity input whereby said beam intensity calculation algorithm produces said polarization intensity output;
  wherein said polarization intensity output is coupled to said polarization beam intensity feedback, which is coupled to said polarization control reference, whereby said polarization control algorithm generate said polarization motor output signal;
  wherein said polarization motor output signal is coupled to motor input data of said polarization platform motor thus rotating said polarizing optic thereby changing the relationship of said polarizing optic to said polarized beam of light;
  wherein said first polarization platform rotation measurement device produces a first rotation signal that corresponds to the position of said polarizing optic; and
  wherein said first rotation signal is coupled to said polarization rotation measurement input and said first measurement position signal is coupled to said beam position input whereby said device position calculation algorithm generates said position output.

\* \* \* \* \*